United States Patent
Wahab et al.

(10) Patent No.: US 12,256,022 B2
(45) Date of Patent: Mar. 18, 2025

(54) BLOCKCHAIN TRANSACTION COMPRISING RUNNABLE CODE FOR HASH-BASED VERIFICATION

(71) Applicant: nChain Licensing AG, Zug (CH)

(72) Inventors: Jad Wahab, London (GB); Wei Zhang, London (GB); Brock Doiron, London (GB); Craig Wright, London (GB)

(73) Assignee: nChain Licensing AG, Zug (CH)

( * ) Notice: Subject to any disclaimer, the term of this patent is extended or adjusted under 35 U.S.C. 154(b) by 456 days.

(21) Appl. No.: 17/613,404

(22) PCT Filed: Apr. 22, 2020

(86) PCT No.: PCT/IB2020/053800
§ 371 (c)(1),
(2) Date: Nov. 22, 2021

(87) PCT Pub. No.: WO2020/240293
PCT Pub. Date: Dec. 3, 2020

(65) Prior Publication Data
US 2022/0263664 A1   Aug. 18, 2022

(30) Foreign Application Priority Data
May 24, 2019 (GB) .................................... 1907392

(51) Int. Cl.
*H04L 9/32* (2006.01)
*H04L 9/00* (2022.01)

(52) U.S. Cl.
CPC .......... *H04L 9/3252* (2013.01); *H04L 9/3239* (2013.01); *H04L 9/50* (2022.05)

(58) Field of Classification Search
CPC ........ H04L 9/3252; H04L 9/50; H04L 9/3239
See application file for complete search history.

(56) References Cited

U.S. PATENT DOCUMENTS

| 7,142,668 B1 | 11/2006 | Kogure |
| 8,412,952 B1 | 4/2013 | Ramzan et al. |

(Continued)

FOREIGN PATENT DOCUMENTS

| CN | 108900585 A | 11/2018 |
| EP | 17708586.7 | 1/2018 |

(Continued)

OTHER PUBLICATIONS

Combined Search and Examination Report under Sections 17 and 18(3) for Application No. GB1907393.1, mailed on Nov. 22, 2019, 6 pages.

(Continued)

*Primary Examiner* — Shahriar Zarrineh
*Assistant Examiner* — Gita Faramarzi
(74) *Attorney, Agent, or Firm* — Messner Reeves LLP

(57) ABSTRACT

A computer-implemented method comprising, at a verifying nodes of a blockchain network: obtaining a first transaction which comprises runnable code; receiving a second transaction which includes information comprising at least a submitted instance of an r-part and an s-part of a first ECDSA signature, and further comprising a nonce; and miming the code from the first transaction. The code is configured to verify that $H_{PoW}(f(r, d))$ meets a predetermined condition defined in the code, and to return a result of true on condition thereof, where r is the submitted instance of the r-part, d is the nonce, $H_{PoW}$ is a hash function, and f is a function combining q and d.

24 Claims, 16 Drawing Sheets

(56) References Cited

U.S. PATENT DOCUMENTS

| | | | |
|---|---|---|---|
| 10,373,158 B1 | 8/2019 | James et al. | |
| 10,504,179 B1* | 12/2019 | McGuire | G06Q 40/04 |
| 10,630,477 B1 | 4/2020 | Ju et al. | |
| 10,761,877 B2* | 9/2020 | Peffers | G06F 9/466 |
| 10,855,473 B1 | 12/2020 | Griffin | |
| 11,139,955 B1 | 10/2021 | So et al. | |
| 11,184,157 B1 | 11/2021 | Gueron et al. | |
| 11,297,459 B2 | 4/2022 | Raduchel et al. | |
| 11,310,060 B1 | 4/2022 | Poelstra et al. | |
| 11,444,779 B2 | 9/2022 | Yadlin et al. | |
| 11,488,147 B2* | 11/2022 | Sheng | G06Q 20/403 |
| 11,509,478 B2 | 11/2022 | Mohassel et al. | |
| 11,514,448 B1 | 11/2022 | Liberman | |
| 11,522,700 B1 | 12/2022 | Auerbach et al. | |
| 11,842,339 B2* | 12/2023 | Trevethan | H04L 9/3236 |
| 2004/0174570 A1 | 9/2004 | Plunkett et al. | |
| 2005/0201561 A1 | 9/2005 | Komano et al. | |
| 2005/0216736 A1 | 9/2005 | Smith | |
| 2006/0153366 A1 | 7/2006 | Beeson et al. | |
| 2006/0285682 A1 | 12/2006 | Sarangarajan et al. | |
| 2010/0235588 A1 | 9/2010 | Maeda et al. | |
| 2010/0308978 A1 | 12/2010 | Brown | |
| 2011/0055585 A1 | 3/2011 | Lee | |
| 2013/0024936 A1 | 1/2013 | Jakobsson et al. | |
| 2014/0032906 A1 | 1/2014 | Corella et al. | |
| 2014/0089670 A1* | 3/2014 | Maletsky | H04L 9/3226 |
| | | | 713/176 |
| 2016/0028552 A1 | 1/2016 | Spanos et al. | |
| 2016/0085955 A1 | 3/2016 | Lerner | |
| 2016/0105414 A1 | 4/2016 | Bringer et al. | |
| 2016/0269393 A1 | 9/2016 | Corella et al. | |
| 2016/0275461 A1* | 9/2016 | Sprague | G06Q 20/3829 |
| 2017/0141926 A1 | 5/2017 | Xu et al. | |
| 2017/0169735 A1 | 6/2017 | Lablans | |
| 2017/0339138 A1 | 11/2017 | Lewison et al. | |
| 2017/0345011 A1 | 11/2017 | Salami et al. | |
| 2017/0358161 A1 | 12/2017 | Hao et al. | |
| 2018/0041505 A1 | 2/2018 | Chabanne et al. | |
| 2018/0191503 A1* | 7/2018 | Alwar | H04L 9/3242 |
| 2018/0270065 A1 | 9/2018 | Brown et al. | |
| 2018/0285866 A1 | 10/2018 | Bederov et al. | |
| 2018/0300693 A1 | 10/2018 | Gopinath et al. | |
| 2018/0359097 A1 | 12/2018 | Lindell | |
| 2019/0026146 A1 | 1/2019 | Peffers et al. | |
| 2019/0044734 A1 | 2/2019 | Lancashire et al. | |
| 2019/0068382 A1 | 2/2019 | Theodore et al. | |
| 2019/0149337 A1 | 5/2019 | Savanah et al. | |
| 2019/0313246 A1 | 10/2019 | Nix | |
| 2019/0319798 A1 | 10/2019 | Chalkias | |
| 2019/0327086 A1 | 10/2019 | Slowik | |
| 2019/0354969 A1* | 11/2019 | Spector | G06Q 20/38215 |
| 2019/0385162 A1 | 12/2019 | Zhang et al. | |
| 2020/0058022 A1* | 2/2020 | Ma | G06Q 20/3674 |
| 2020/0064783 A1 | 2/2020 | Tran et al. | |
| 2020/0193425 A1 | 6/2020 | Ferenczi et al. | |
| 2020/0211003 A1* | 7/2020 | Fletcher | H04L 9/30 |
| 2021/0075600 A1 | 3/2021 | Trevethan | |
| 2021/0090072 A1 | 3/2021 | Sewell et al. | |
| 2021/0152371 A1 | 5/2021 | Fletcher et al. | |
| 2021/0167964 A1 | 6/2021 | Fuerstner | |
| 2021/0266167 A1* | 8/2021 | Lohe | G06Q 20/10 |
| 2021/0271982 A1 | 9/2021 | Lee et al. | |
| 2022/0045867 A1* | 2/2022 | Beery | H04L 9/0891 |
| 2022/0084013 A1* | 3/2022 | Kulkarni | G06Q 20/3825 |
| 2022/0342973 A1* | 10/2022 | Ebrahimi | G06K 19/06028 |
| 2023/0162182 A1 | 5/2023 | Bartolucci et al. | |
| 2023/0163948 A1* | 5/2023 | Trevethan | H04L 9/085 |
| | | | 380/255 |

FOREIGN PATENT DOCUMENTS

| | | |
|---|---|---|
| GB | 1816936.7 | 10/2018 |
| JP | 2016220062 A | 12/2016 |
| JP | 2018093434 A | 6/2018 |
| WO | 2018185724 A1 | 10/2018 |
| WO | 2018189657 A1 | 10/2018 |
| WO | 2018203186 A1 | 11/2018 |
| WO | WO-2018215876 A1 * | 11/2018 ......... G06F 16/2379 |
| WO | 2018225053 A1 | 12/2018 |
| WO | 2018234922 A1 | 12/2018 |
| WO | 2019003071 A1 | 1/2019 |
| WO | 2019034951 A1 | 2/2019 |
| WO | 2019034984 A1 | 2/2019 |
| WO | 2019034986 A1 | 2/2019 |
| WO | 2019072261 A2 | 4/2019 |
| WO | 2019072262 A2 | 4/2019 |
| WO | 2019076020 A1 | 4/2019 |
| WO | 2019092545 A1 | 5/2019 |
| WO | 2019092552 A1 | 5/2019 |
| WO | PCT/IB2019/052184 | 9/2019 |
| WO | 2020065460 | 4/2020 |

OTHER PUBLICATIONS

Combined Search and Examination Report under Sections 17 and 18(3) for Application No. GB1907394.9, mailed on Nov. 25, 2019, 6 pages.
Combined Search and Examination Report under Sections 17 and 18(3) for Application No. GB1907395.6, mailed on Nov. 22, 2019, 6 pages.
Combined Search and Examination Report under Sections 17 and 18(3) for Application No. GB1907396.4, mailed on Nov. 21, 2019, 7 pages.
Combined Search and Examination Report under Sections 17 and 18(3) for Application No. GB1907397.2, mailed on Nov. 25, 2019, 7 pages.
Sotirov A., et al., "MD5 Considered Harmful Today," Creating a rouge CA certificate, Dec. 30, 2008, 20 pages.
Blum, Manuel et al., Non-Interactive Zero-Knowledge and Its Applications, Proceedings of the Twentieth Annual ACM Symposium on Theory of Computing, 1988, pp. 103-112.
RFC 6979—Deterministic Usage of the Digital Signature Algorithm (DSA) and Elliptic Curve Digital Signature Algorithm (ECDSA), Tools.ietf.org, 2019, https://tools.ietf.org/html/rfc6979.
Menezes, A, The Elliptic Curve Discrete Logarithm Problem: State of the Art, Advances in Information and Computer Security, 2008, pp. 218-218.
Transaction—Bitcoin Wiki, En.bitcoin.it, 2019, https://en.bitcoin.it/wiki/Transaction.
Cryptographic hash function, En.wikipedia.org, 2019, https://en.wikipedia.org/wiki/Cryptographic_hash_function.
Perez-Sola, C. et al., Double-spending prevention for Bitcoin zero-confirmation transactions, International Journal of Information Security, 2018.
Antonopoulos, A., Mastering Bitcoin, GitHub, 2019, https://github.com/bitcoinbook/bitcoinbook/blob/develop/ch04.asciidoc#comp_pub.
Secp256k1—Bitcoin Wiki, En.bitcoin.it, 2019, https://en.bitcoin.it/wiki/Secp256k1.
Quisquater et al., How to Explain Zero-Knowledge Proofs to your Children, Advances in Cryptology, 1990, pp. 628-631 Springer-Verlag Berlin Heidelberg https://link.springer.com/content/pdf/10.1007%2F0-387-34805-0_60.pdf.
Wright, Craig, "The Puzzle of the Double Hash", Medium Post, Apr. 30, 2019 https://medium.com/@craig_10243/the-puzzle-of-the-double-hash-968196edb06d.
GB Application No. 1907392.3 Search and Examination Report dated Nov. 21, 2019.
Barber S., et al., "Bitter to Better—How to Make Bitcoin a Better Currency," Feb. 18, 2012, 16 pages, XP055367949, DOI: 10.1007/978-3-642-32946-3.
Bootle J., et al., "Efficient Zero-Knowledge Proof Systems," Foundations of Security Analysis and Design VIII, Sep. 3, 2016, 31 pages.
Chang T-Y., et al., "A Threshold Signature Scheme for Group Communications without a Shared Distribution Center," Future Generations Computer Systems, Aug. 1, 2004, vol. 20, No. 6, pp. 1013-1021.

(56) References Cited

OTHER PUBLICATIONS

European Search Report for European Application No. 23151264.1 dated Feb. 16, 2023, 5 pages.
Ganesh C., "Zero-knowledge Proofs: Efficient Techniques for Combination Statements and their Applications," Sep. 1, 2017, 128 pages, Retrieved from the Internet: URL: file:///C:/Users/DD53140/Documents/ganesh_chaya.pdf.
International Preliminary Report on Patentability for International Application No. PCT/IB2020/053762, mailed Dec. 2, 2021, 8 pages.
International Preliminary Report on Patentability for International Application No. PCT/IB2020/053800, mailed Dec. 2, 2021, 8 pages.
International Preliminary Report on Patentability for International Application No. PCT/IB2020/053807, mailed Dec. 2, 2021, 8 pages.
International Preliminary Report on Patentability for International Application No. PCT/IB2020/054514, mailed Dec. 2, 2021, 10 pages.
International Preliminary Report on Patentability for International Application No. PCT/IB2020/054515, mailed Dec. 2, 2021, 9 pages.
International Preliminary Report on Patentability for International Application No. PCT/IB2020/054516, mailed Dec. 2, 2021, 9 pages.
International Search Report and Written Opinion issued for the International Application No. PCT/IB2020/053762, mailed on Aug. 21, 2020, 10 pages.
International Search Report and Written Opinion issued for the International Application No. PCT/IB2020/053800, mailed on Jun. 12, 2020, 11 pages.
International Search Report and Written Opinion issued for the International Application No. PCT/IB2020/053807, mailed on Jun. 16, 2020, 11 pages.
International Search Report and Written Opinion issued for the International Application No. PCT/IB2020/054514, mailed on Jul. 17, 2020, 13 pages.
International Search Report and Written Opinion issued for the International Application No. PCT/IB2020/054515, mailed on Jul. 17, 2020, 11 pages.
International Search Report and Written Opinion issued for the International Application No. PCT/IB2020/054516, mailed on Jul. 23, 2020, 11 pages.
Mercer R., "Privacy on the Blockchain: Unique Ring Signatures," Arxiv.org, Dec. 4, 2016, 43 pages.
Nakamoto S, "Bitcoin: A Peer-to-Peer Electronic Cash System," Oct. 31, 2008, 6 pages, Retrieved from the Internet: URL: https://nakamotoinstitute.org/bitcoin/, on Feb. 18, 2020.
Pornin T., "Deterministic Usage of the Digital Signature Algorithm (DSA) and Elliptic Curve Digital Signature Algorithm (ECDSA)," RFC6979.TXT, Aug. 8, 2013, 79 pages.
Rajput U., et al., "A Solution towards Eliminating Transaction Malleability in Bitcoin", Journal of Information Processing Systems, Aug. 1, 2018, vol. 14, No. 4, pp. 837-850, Retrieved from the Internet: URL: http://jips-k.org/journals/jips/digital-library/manuscript/file/22921/JIPS-2018-14-4-837.pdf.
Stavroulakis P., et al., "Handbook of Information and Communication Security," Springer, Apr. 8, 2010, pp. C, Ch02-Ch04,Ch07.
Wikipedia Contributors, Elliptic Curve Digital Signature Algorithm; Wikipedia, The Free Encyclopedia, May 13, 2019, https://en.wikipedia.org/w/index.php?title=Elliptic_Curve_Digital_Signature_Algorithm&oldid=896945959.
Androulaki E., et al., "Hyperledger Fabric : A Distributed Operating System for Permissioned Blockchains," EuroSys'18: Proceedings of the Thirteenth EuroSys Conference, Apr. 23, 2018, pp. 1-15.
Doerner J., et al., "Secure Two-party Threshold ECDSA from ECDSA Assumptions," IEEE: 2019; pp. 980-997.
Baldimtsi F., et al., "Indistinguishable Proofs of Work or Knowledge," Lecture Notes in Computer Science, vol. 10032, 2016, pp. 902-933.
Fuchita Y., "Special Feature: Innovation and Finance—Blockchain and Financial Transaction innovation," Nomura Capital Markets Quarterly, Japan, Nomura Institute of Capital Markets Research, Nov. 1, 2015, vol. 19, No. 2, 30Pages.

\* cited by examiner

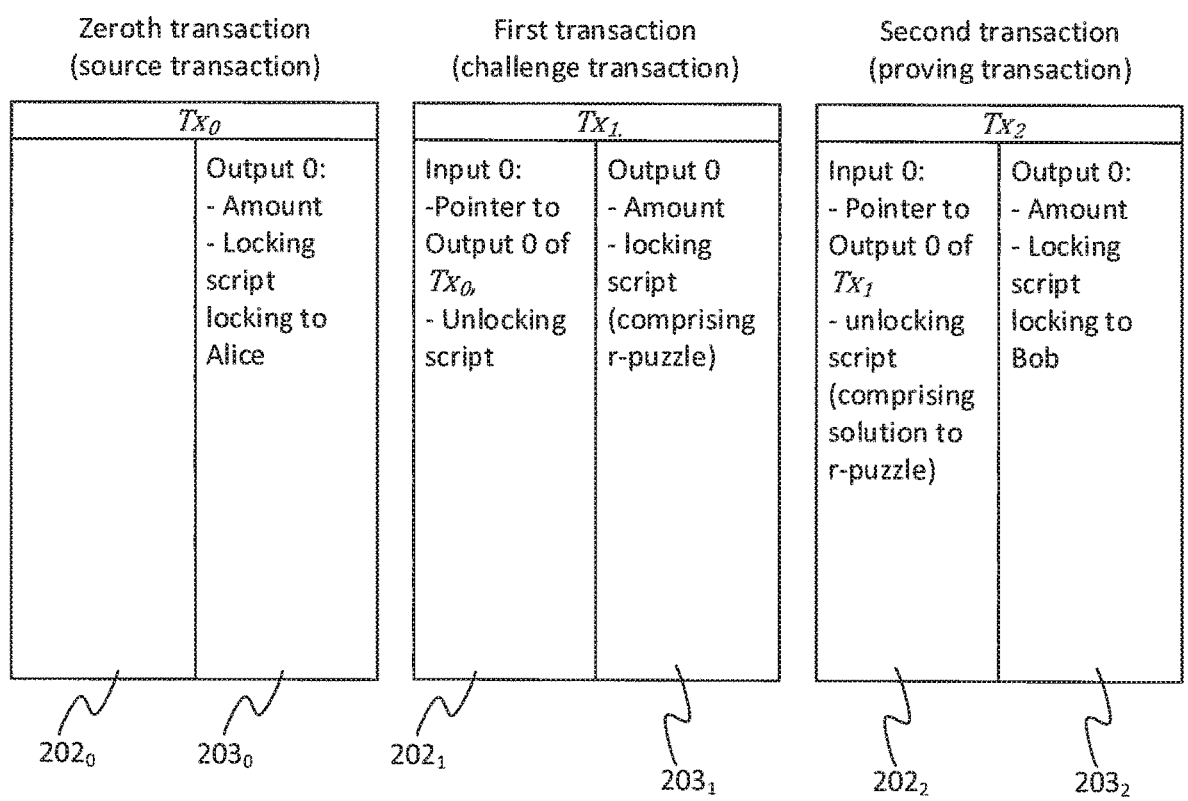

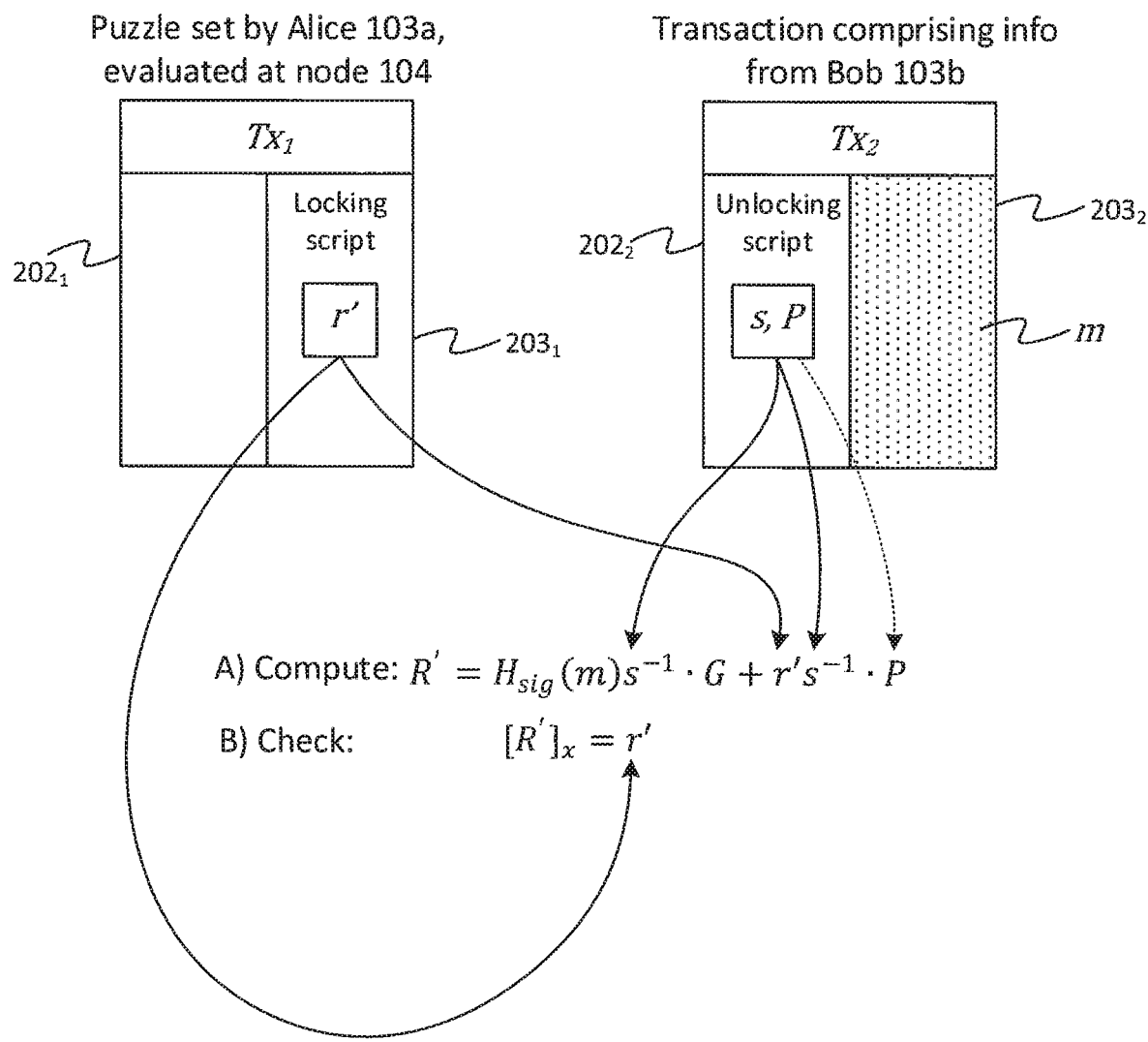

Figure 9
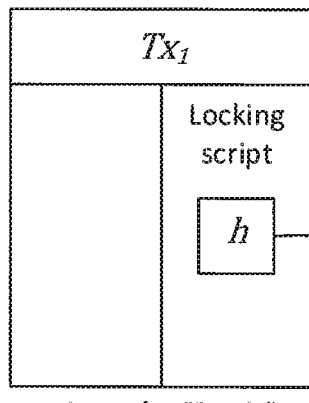
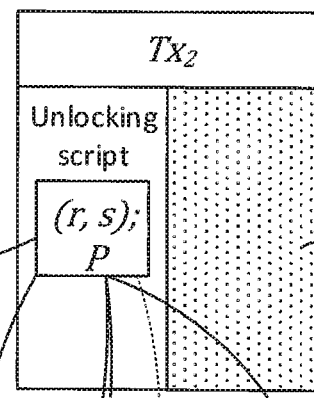
Puzzle set by Alice 103a, evaluated at node 104
Transaction comprising info from Bob 103b
$Tx_1$ — Locking script: $h$; where $h=H_{puz}(r')$
$Tx_2$ — Unlocking script: $(r, s); P$ ; $m$
I) Check: $h = H_{puz}(r)$
II) Compute: $R' = H_{sig}(m)s^{-1} \cdot G + rs^{-1} \cdot P$
III) Check: $[R']_x = r$

Figure 10
Puzzle set by Alice 103a, evaluated at node 104
Transaction comprising info from Bob 103b
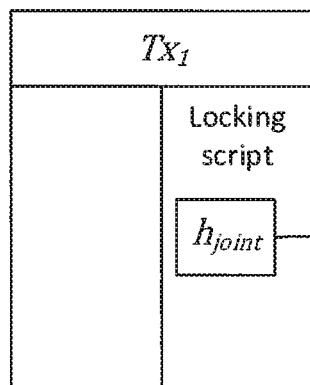
$Tx_1$
Locking script
$h_{joint}$
where $h_{joint}=H_{puz}(r'||d')$
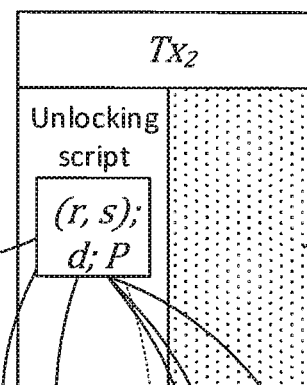
$Tx_2$
Unlocking script
$(r, s);$
$d; P$
$m$
I) Check: $h_{joint}=H_{puz}(r||d)$
II) Compute: $R' = H_{sig}(m)s^{-1} \cdot G + rs^{-1} \cdot P$
III) Check: $[R']_x = r$

Figure 12

| 30 | len(z) | 02 | len(r) | r | 02 | len(s) | s | ht | hex value |
|---|---|---|---|---|---|---|---|---|---|
| 1 | 1 | 1 | 1 | 32—33 | 1 | 1 | 32—33 | 1 | byte length |

Figure 13

| Stack | Script | Description |
|---|---|---|
| empty | $\langle P_B \rangle \langle sig_r \rangle$ OP_DUP OP_3 OP_SPLIT OP_NIP OP_1 OP_SPLIT OP_SWAP OP_SPLIT OP_DROP $\langle r \rangle$ OP_EQUALVERIFY OP_SWAP OP_CHECKSIG | scriptSig and scriptPubkey are combined |
| $\langle P_B \rangle \langle sig_r \rangle$ | OP_DUP OP_3 OP_SPLIT OP_NIP OP_1 OP_SPLIT OP_SWAP OP_SPLIT OP_DROP $\langle r \rangle$ OP_EQUALVERIFY OP_SWAP OP_CHECKSIG | Unlocking script constants pushed to stack |
| $\langle P_B \rangle \langle sig_r \rangle \langle sig_r \rangle$ OP_3 | OP_SPLIT OP_NIP OP_1 OP_SPLIT OP_SWAP OP_SPLIT OP_DROP $\langle r \rangle$ OP_EQUALVERIFY OP_SWAP OP_CHECKSIG | ToS (sig) duplicated and constant (3) pushed to stack |
| $\langle P_B \rangle \langle sig_r \rangle \langle sig_r[:3] \rangle \langle sig_r[3:] \rangle$ | OP_NIP OP_1 OP_SPLIT OP_SWAP OP_SPLIT OP_DROP $\langle r \rangle$ OP_EQUALVERIFY OP_SWAP OP_CHECKSIG | ToS (sig) split at the third byte, right before len(r) |
| $\langle P_B \rangle \langle sig_r \rangle \langle sig_r[3:] \rangle$ OP_1 | OP_SPLIT OP_SWAP OP_SPLIT OP_DROP $\langle r \rangle$ OP_EQUALVERIFY OP_SWAP OP_CHECKSIG | Second to ToS item removed and constant (1) pushed to stack |
| $\langle P_B \rangle \langle sig_r \rangle \langle sig_r[4:] \rangle \langle sig_r[3:4] \rangle$ | OP_SPLIT OP_DROP $\langle r \rangle$ OP_EQUALVERIFY OP_SWAP OP_CHECKSIG | ToS split 1 byte in (at byte 4 of sig) and the top two items on the stack are swapped |
| $\langle P_B \rangle \langle sig_r \rangle \langle sig_r[4:36/37] \rangle \langle sig_r[36/37:] \rangle$ | OP_DROP $\langle r \rangle$ OP_EQUALVERIFY OP_SWAP OP_CHECKSIG | The second to ToS (sig starting at index 4) is split at len(r)=$\langle sig_r[3:4] \rangle$ bytes in which will be either 36 or 37 since r will either be 32 or 33 bytes |
| $\langle P_B \rangle \langle sig_r \rangle \langle sig_r[4:36/37] \rangle \langle r \rangle$ | OP_EQUALVERIFY OP_SWAP OP_CHECKSIG | Drop ToS (rest of sig) and push $\langle r \rangle$ to stack |
| $\langle sig_r \rangle \langle P_B \rangle$ | OP_CHECKSIG | Check if $\langle sig_r[4:36/37] \rangle = \langle r \rangle$ |
| True | empty | Signature is checked for top two stack items |

Figure 14A
Puzzle set by Alice 103a, evaluated at node 104
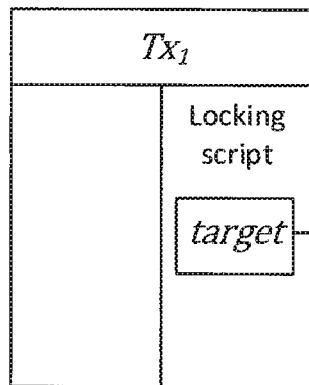
Transaction comprising info from Bob 103b
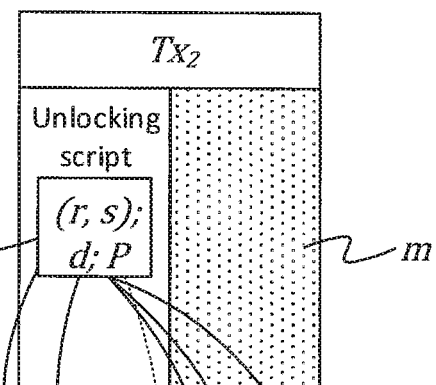
I) Check: $\quad target > H_{PoW}(r\|d)$
II) Compute: $R' = H_{sig}(m)s^{-1} \cdot G + rs^{-1} \cdot P$
III) Check: $\quad [R']_x = r$

Figure 14B
Puzzle set by Alice 103a, evaluated at node 104
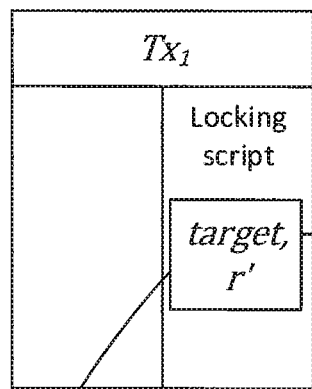
Transaction comprising info from Bob 103b
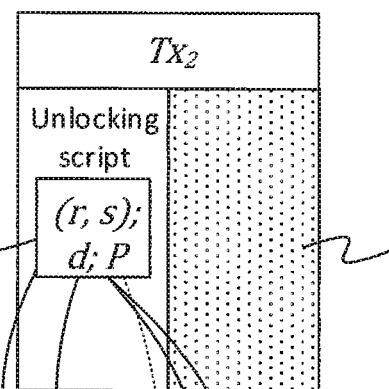
I) Check: $\quad target > H_{PoW}(r||d)$
II) Compute: $R' = H_{sig}(m)s^{-1} \cdot G + rs^{-1} \cdot P$
III) Check: $\quad [R']_x = r'$

BLOCKCHAIN TRANSACTION COMPRISING RUNNABLE CODE FOR HASH-BASED VERIFICATION

CROSS REFERENCE TO RELATED APPLICATIONS

This application is the U.S. National Stage of International Application No. PCT/IG2020/053800 filed on Apr. 22, 2020, which claims the benefit of United Kingdom Patent Application No. 1907392.3, filed on May 24, 2019, the contents of which are incorporated herein by reference in their entireties.

TECHNICAL FIELD

The present disclosure relates to the idea of proof-of-work (PoW) in the context of a blockchain.

BACKGROUND

A blockchain refers to a form of distributed data structure, wherein a duplicate copy of the blockchain is maintained at each of a plurality of nodes in a peer-to-peer (P2P) network. The blockchain comprises a chain of blocks of data, wherein each block comprises one or more transactions. Each transaction may point back to a preceding transaction in a sequence. Transactions can be submitted to the network to be included in new blocks. New blocks are created by a process known as "mining", which involves each of a plurality of mining nodes competing to perform "proof-of-work", i.e. solving a cryptographic puzzle based on a pool of the pending transactions waiting to be included in blocks.

Conventionally the transactions in the blockchain are used to convey a digital asset, i.e. data acting as a store of value. However, a blockchain can also be exploited in order to layer additional functionality on top of the blockchain. For instance, blockchain protocols may allow for storage of additional user data in an output of a transaction. Modern blockchains are increasing the maximum data capacity that can be stored within a single transaction, enabling more complex data to be incorporated. For instance this may be used to store an electronic document in the blockchain, or even audio or video data.

Each node in the network can have any one, two or all of three roles: forwarding, mining and storage. Forwarding nodes propagate transactions throughout the nodes of the network. Mining nodes perform the mining of transactions into blocks. Storage nodes each store their own copy of the mined blocks of the blockchain. In order to have a transaction recorded in the blockchain, a party sends the transaction to one of the nodes of the network to be propagated. Mining nodes which receive the transaction may race to mine the transaction into a new block. Each node is configured to respect the same node protocol, which will include one or more conditions for a transaction to be valid. Invalid transactions will not be propagated nor mined into blocks. Assuming the transaction is validated and thereby accepted onto the blockchain, then the transaction (including any user data) will thus remain stored at each of the nodes in the P2P network as an immutable public record.

The miner who successfully solved the proof-of-work puzzle to create the latest block is typically rewarded with a new transaction called a "generation transaction" which generates a new amount of the digital asset. The proof-of work incentivises miners not to cheat the system by including double-spending transactions in their blocks, since it requires a large amount of compute resource to mine a block, and a block that includes an attempt to double spend is likely not be accepted by other nodes.

In an "output-based" model (sometimes referred to as a UTXO-based model), the data structure of a given transaction comprises one or more inputs and one or more outputs. Any spendable output comprises an element specifying an amount of the digital asset, sometimes referred to as a UTXO ("unspent transaction output"). The output may further comprise a locking script specifying a condition for redeeming the output. Each input comprises a pointer to such an output in a preceding transaction, and may further comprise an unlocking script for unlocking the locking script of the pointed-to output. So consider a pair of transactions, call them a first and a second transaction. The first transaction comprises at least one output specifying an amount of the digital asset, and comprising a locking script defining one or more conditions of unlocking the output. The second transaction comprises at least one input, comprising a pointer to the output of the first transaction, and an unlocking script for unlocking the output of the first transaction.

In such a model, when the second transaction is sent to the P2P network to be propagated and recorded in the blockchain, one of the conditions for validity applied at each node will be that the unlocking script meets all of the one or more conditions defined in the locking script of the first transaction. Another will be that the output of the first transaction has not already been redeemed by another, earlier valid transaction. Any node that finds the second transaction invalid according to any of these conditions will not propagate it nor include it for mining into a block to be recorded in the blockchain.

An alternative type of transaction model is an account-based model. In this case each transaction does not define the amount to be transferred by referring back to the UTXO of a preceding transaction in a sequence of past transactions, but rather by reference to an absolute account balance. The current state of all accounts is stored by the miners separate to the blockchain and is updated constantly. A transaction of an account-based model can also include smart contract which runs at each node at the same time as validating the transaction.

A transaction in either model can include a knowledge proof. "Knowledge proof" or "proof of knowledge" is a term of art referring to any test that a party knows some piece of data, e.g. call it d. As an example in the case of an output-based transaction model, the locking script in the output of one transaction $Tx_1$ can include a hash puzzle. If an input of a second transaction $Tx_2$ points to this output of $Tx_1$, then the unlocking script in that input of $Tx_2$ will have to solve the hash puzzle in order to successfully redeem the output of $Tx_1$. The hash puzzle comprises a hash value h, being a hash of d, i.e. $h=H_{puz}(d)$. The puzzle also comprises a piece of script that, when run at a node together with the unlocking script of $Tx_2$, will take a data value d' purporting to be d from the unlocking script of $Tx_2$, hash it with the hash function $H_{puz}$, and compare with the hash value h included in the locking script of $Tx_1$. I.e. it checks whether $h=H_{puz}(d')$ and will only unlock the output of $Tx_1$ if the result of the comparison is yes (or "true" in the terminology of the art). Thus the beneficiary of $Tx_2$ can only unlock the output of $Tx_1$ if d is included in the unlocking script of $Tx_2$ to prove knowledge of d.

An issue with using the conventional hash puzzle alone is that an unscrupulous miner or other node could observe d in the unlocking script of $Tx_2$, then create and mine (or publish)

his own version Tx$_2$* of Tx$_2$, paying himself in the output of Tx$_2$* instead of the intended recipient (e.g. Bob) as in Tx$_2$. The existing way to avoid this is to additionally include a "pay-to-public key hash" (P2PKH) requirement in the locking script of Tx$_1$. In addition to the knowledge proof for d, this requires a cryptographic signature of the intended payee to be included in the unlocking script of Tx$_2$.

A hash puzzle and P2PKH can also be implemented using a smart contract in an account-based model, rather than the locking and unlocking scripts of an output-based model.

As will be familiar to a person skilled in the art, a cryptographic signature can be generated based on a private key V and verified based on a corresponding public key P of a private-public key pair. Given a signature generated by applying the private key V to a message m, it is possible for another party to verify using P that the signature was generated using V, without that party knowing V (hence verifying a signature itself is another form of knowledge proof in its own right).

One form of algorithm for this is an elliptic curve digital signature algorithm (ECDSA) which operates based on elliptic curve cryptography (ECC). In this case P and V are related by:

$$P = V \cdot G$$

where P is a two-element vector (P$_x$, P$_y$), V is a scalar, and G is a two element vector (G$_x$, G$_y$) representing a predetermined point on a two-dimensional elliptic curve (the "generator point"). The operation "·" is the scalar elliptic curve multiplication—a known form of operation that translates from one point on an elliptic curve to another.

The ECDSA signature is a tuplet (r, s) consisting of two elements commonly known in the art as the r-part (r) and the s-part (s) respectively. The signature (r, s) is generated by applying the private key V to a message m. In the case of a transaction for recordal on a blockchain, m will be a part of the transaction and the signature will be tagged onto the transaction in addition to that part in the clear, to enable that transaction to be validated. For instance in an output-based model, the signature signs a part of Tx$_2$ and is included in the locking script of Tx$_2$ in order to unlock the output of Tx$_1$. The signed part typically includes the output(s) of the transaction so these cannot be changed without invalidating the signature and therefore the transaction.

Whatever transaction model is used, the signature (r, s) is computed as:

$$r = [R]_x, \text{ where } R = k \cdot G$$

$$s = k^{-1}(H_{sig}(m) + rV) \bmod n$$

where [R]$_x$ denotes the x-coordinate of the two element vector R=(R$_x$, R$_y$). k is known as the ephemeral key. It is selected from a set [1,n−1], typically at random, where n is a prime modulus and [1,n−1] is the set of real integers in the range 1 to n−1 inclusive. H$_{sig}$ is a hash function which could be the same or a different form of hash function compared to the hash function H$_{puz}$ used in the hash puzzle.

Given knowledge of the signature (r, s), the message m, and the public key P, it is possible for any party who does not know the private key V to verify that the signature was generated using the private key to V to the message m. This is done by computing:

$$R' = H_{sig}(m) s^{-1} \cdot G + r s^{-1} \cdot P$$

and verifying that [R']$_x$=r. The signature is valid only if this is true, but is not valid otherwise. This can be taken as a verification that the party associated with the public key P was indeed the signer of the message.

SUMMARY

In a blockchain network, the proof-of-work required to mine a transaction into a block is an inherent feature of the node protocol applied by each of the mining nodes in the network. However, it is recognized herein that it may be desirable to add an additional "layer 2" proof-of-work (i.e. layered on top of the basic node protocol). Particularly, in accordance with the present disclosure, this can be achieved by setting a challenge in Tx$_1$ based on the r-part of an ECDSA signature, in a variant of type of puzzle that is termed herein an "r-puzzle".

According to one aspect disclosed herein, there is provided a computer-implemented method comprising, at a verifying nodes of a blockchain network: obtaining a first transaction which comprises runnable code; receiving a second transaction which includes information comprising at least a submitted instance of an r-part and an s-part of a first ECDSA signature, and further comprising a nonce; and running the code from the first transaction. The code is configured to verify that H$_{PoW}$(f(r, d)) meets a predetermined condition defined in the code, and to return a result of true on condition thereof, where r is the submitted instance of the r-part, d is the nonce, H$_{PoW}$ is a hash function, and f is a function combining r and d.

In optional embodiments, the r-puzzle set in the code of the first transaction may further include a challenge requiring the second transaction to include a specified value of the r-part. Thus as well as the proof-of-work, the r-puzzle can also be used to implement a knowledge proof based on the r-part of the signature.

There is an issue with using a hash puzzle as the knowledge proof, when combined with P2PKH to avoid the possible vulnerability discussed in the Background whereby a node could otherwise see d and swap it into a new version of the second transaction which pays the node operator instead of the prover. That is, while the P2PKH ensures the payment is only made to the party who knew d in the first place, it also means that the output of Tx$_1$ is tied to a specific predetermined recipient or set of recipients (it is possible to specify alternative conditions which could include alternative recipients, but they still have to be pre-identified).

As recognized herein, it would be desirable to allow a transaction that is redeemable by any unspecified party who can prove knowledge of a particular secret value, but in a manner which avoids revealing that value. For instance, say Alice wants to set up a first transaction that can be unlocked by anyone to whom she gives a secret key, but she does not want to pre-specify who those parties are. E.g. the first transaction may pay someone to accept delivery of some article such as a letter or parcel on Alice's behalf, and/or pay the delivery company to deliver the article. The first transaction can be redeemed by a second transaction which proves knowledge of the secret. At the point of ordering the delivery, Alice may set up the first transaction and provide it to the delivery company or publish it to the blockchain (or simply provide the necessary details enabling the delivery company to create the first transaction for example). Thus the delivery company has confidence that the payment will be made once delivery is complete. However, Alice does not want to decide at this stage who will receive the delivery on her behalf. Instead, she provides the secret value only later to one or more trusted parties (e.g. her flatmates Charlie and/or Bob who have now confirmed they will be in on the day of the delivery). This will this enable any of them to sign on her behalf by providing the second transaction demonstrating proof of Alice's secret value.

It will be appreciated this is just one illustrative example. As another example, a transaction could be used indicate consent to the terms of an agreement. Alice may want to set up the agreement now, but then only after the fact decide upon a subset of one or more trusted parties to give signatory authority or power of attorney to sign on her behalf. E.g. at the time of setting up the agreement Alice may have been intending to sign herself, but only later discovers she is losing mental capacity or will be unavailable to sign for some reason, so needs to assign power of attorney to someone else (e.g. in this case Bob and Charlie could be her family members or business associates).

More generally, though not essential to the main PoW idea, it may also be desirable to provide an alternative to a conventional hash puzzle. Particularly, the alternative form of puzzle may enable proof of knowledge of a secret value without revealing that value to the nodes or publishing it on the blockchain, and which is not tied to a particular identity.

To address this, according to optional embodiments disclosed herein, the method may comprise: obtaining a public key wherein the first ECDSA signature signs a message based on a private key corresponding to the public key, the message being a part of the second transaction; and applying an ECDSA verification function to verify the first ECDSA signature received in the second transaction based on the public key and the message, wherein the code is configured to return the result of true on further condition of said verification of the first ECDSA signature. The code may further comprise a reference value corresponding to the r-part of the first ECDSA signature, the reference value being a reference instance of the r-part or a transformation thereof. In this case the code is configured to check that the reference value corresponds to the reference instance of the r-part received in the second transaction, and return the result of true on further condition thereof.

The indication of the r-part included in the code of the first transaction may be a reference instance of the r-part or a transformation thereof, e.g. hash of a component comprising the r-part (where the hashed component could just be equal to the r-part itself or could be concatenated with another data element d, for example). Either way, the code thus sets up an "r-puzzle" which proves that the challenge (e.g. Bob) must have known the ephemeral key k (it is not feasible that the solution could have been provided without knowledge of k). The puzzle advantageously uses the r-part as the basis for this knowledge proof, and does not require the challenge to submit the ephemeral key k to the node nor reveal it in the second transaction (e.g. Tx$_2$). This means, for example, that k can be used by a first party (e.g. Alice) as a kind of ephemeral private key or secret which she can use to assign signatory authority to one or more second parties, such as Bob and/or Charlie. Because the r-puzzle proves knowledge of k without revealing k, a malicious miner or other node cannot create a signature of his/her own to form a valid second transaction Tx$_2$* that would pay out to him/herself instead of the intended beneficiary. Further, because the r-part of a signature in itself is not linked to any identity within the system, this means anyone who knows k can meet the proof. The condition for the validity of the second transaction does not have to be tied by the first transaction to a specific identity. So for example Alice does not have to decide in advance who to lock the first transaction to. E.g. she could provide the delivery company with the details to set up the first transaction, then decide later who to give signatory authority to accept the parcel on her behalf.

More generally than any of the above, the scope of the present disclosure may extend to any "layer 2" proof-of-work, whereby code in a transaction is used to layer an additional proof-of-work puzzle on top of the inherent proof-of-work already performed by miners in a blockchain.

Hence according to another aspect disclosed herein, there is provided computer-implemented method comprising, at a verifying node of a blockchain network: obtaining a first transaction which comprises runnable code; receiving a second transaction which includes information comprising at least a first part and a nonce; and running the code from the first transaction, the code being configured to verify that $H_{PoW}(f(q, d))$ meets a predetermined condition defined in the code, and to return a result of true on condition thereof, where q is the first part, d is the nonce, $H_{PoW}$ is a hash function, and $f$ is a function combining r and d.

BRIEF DESCRIPTION OF THE DRAWINGS

To assist understanding of embodiments of the present disclosure and to show how such embodiments may be put into effect, reference is made, by way of example only, to the accompanying drawings in which:

FIG. 5 is a schematically illustrates an example set of transactions, FIGS. 6A-6D schematically illustrate some of the principles behind an elliptic curve digital signature algorithm (ECDSA), FIG. 7 is a schematic illustration of one possible implementation of a type of knowledge proof referred to herein as an r-puzzle (or synonymously an r-challenge), FIG. 9 is a schematic illustration of another possible implementation of an r-puzzle, FIG. 10 is a schematic illustration of yet another possible implementation of an r-puzzle, FIG. 13 is a step-by-step script analysis of an example implementation of a locking and unlocking script for one form of r-puzzle, and FIGS. 14A-D schematically illustrate some examples of a form of r-puzzle that imposes an additional proof-of-work on top of the inherent proof-of-work already done by miners as part of the underlying blockchain protocol.

DETAILED DESCRIPTION OF EMBODIMENTS

In some cryptographic schemes a verifier may require convincing that a person (called a prover or challenge) has some piece of information in what is called a knowledge proof. Naively, this may be done by providing the piece of information directly to the verifier. Alternatively the prover may be required to perform a calculation that is dependent on the piece of information. Preferably the calculation involved is such that the verifier him/herself does not need to know the piece of information in order to set the challenge, and nor does the piece of information need to be revealed to the verifier in order to verify that the prover knows the piece of information). For a computational method, a verification calculation must be performed on the input data. A straightforward way of proving knowledge of a secret value is through use of a cryptographic hash function due to its features of preimage and collision resistance. This hash method can be easily integrated in many blockchain applications as hash functions form a fundamental part of their private key-public key cryptosystem. This type of knowledge proof is so prolific in blockchain applications that is typically referred to as a hash puzzle.

In UTXO-based blockchains, the solution to a hash puzzle (the preimage of the hashed value) can be set as a spending conditions so the verification is performed by the miner as part of the transaction verification. However, in this approach the transaction must also require a signature using a particular private key, as otherwise a miner receives the hash puzzle solution prior to inclusion of the transaction within the block. This would give a malicious miner the opportunity to create a spending transaction with an output directed to an address belonging to the miner.

In the present disclosure, a knowledge proof is provided that circumvents this issue while still allowing for the validation to be performed by the miner (or a forwarding node). To do this, the knowledge proof is connected to an ephemeral key corresponding to an elliptic curve digital signature algorithm (ECDSA) signature. As the cryptographic primitives used in this algorithm are native to many blockchains, it can be readily integrated into the current infrastructure.

Example System Overview

Figure 1:
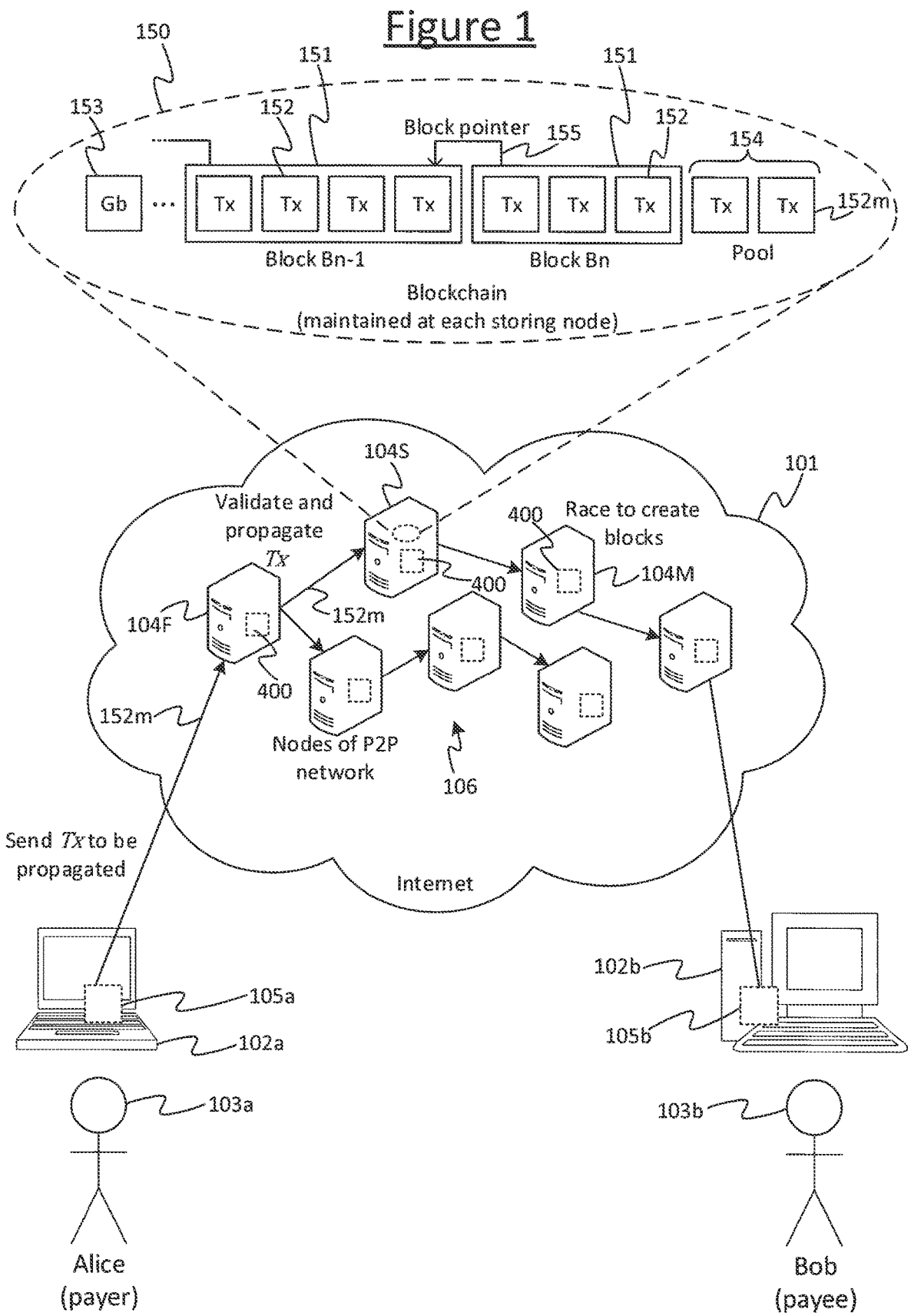
FIG. 1 is a schematic block diagram of a system for implementing a blockchain.

FIG. 1 shows an example system 100 for implementing a blockchain 150. The system 100 comprises a packet-switched network 101, typically a wide-area internetwork such as the Internet. The packet-switched network 101 comprises a plurality of nodes 104 arranged to form a peer-to-peer (P2P) overlay network 106 within the packet-switched network 101. Each node 104 comprises computer equipment of a peers, with different ones of the nodes 104 belonging to different peers. Each node 104 comprises processing apparatus comprising one or more processors, e.g. one or more central processing units (CPUs), accelerator processors, application specific processors and/or field programmable gate arrays (FPGAs). Each node also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

The blockchain 150 comprises a chain of blocks of data 151, wherein a respective copy of the blockchain 150 is maintained at each of a plurality of nodes in the P2P network 160. Each block 151 in the chain comprises one or more transactions 152, wherein a transaction in this context refers to a kind of data structure. The nature of the data structure will depend on the type of transaction protocol used as part of a transaction model or scheme. A given blockchain will typically use one particular transaction protocol throughout. In one common type of transaction protocol, the data structure of each transaction 152 comprises at least one input and at least one output. Each output specifies an amount representing a quantity of a digital asset belonging to a user 103 to whom the output is cryptographically locked (requiring a signature of that user in order to be unlocked and thereby redeemed or spent). Each input points back to the output of a preceding transaction 152, thereby linking the transactions.

At least some of the nodes 104 take on the role of forwarding nodes 104F which forward and thereby propagate transactions 152. At least some of the nodes 104 take on the role of miners 104M which mine blocks 151. At least some of the nodes 104 take on the role of storage nodes 104S (sometimes also called "full-copy" nodes), each of which stores a respective copy of the same blockchain 150 in their respective memory. Each miner node 104M also maintains a pool 154 of transactions 152 waiting to be mined into blocks 151. A given node 104 may be a forwarding node 104, miner 104M, storage node 104S or any combination of two or all of these.

In a given present transaction 152j, the (or each) input comprises a pointer referencing the output of a preceding transaction 152i in the sequence of transactions, specifying that this output is to be redeemed or "spent" in the present transaction 152j. In general, the preceding transaction could be any transaction in the pool 154 or any block 151. The preceding transaction 152i need not necessarily exist at the time the present transaction 152j is created or even sent to the network 106, though the preceding transaction 152i will need to exist and be validated in order for the present transaction to be valid. Hence "preceding" herein refers to a predecessor in a logical sequence linked by pointers, not necessarily the time of creation or sending in a temporal sequence, and hence it does not necessarily exclude that the transactions 152i, 152j be created or sent out-of-order (see discussion below on orphan transactions). The preceding transaction 152i could equally be called the antecedent or predecessor transaction.

The input of the present transaction 152j also comprises the signature of the user 103a to whom the output of the preceding transaction 152i is locked. In turn, the output of the present transaction 152j can be cryptographically locked to a new user 103b. The present transaction 152j can thus transfer the amount defined in the input of the preceding transaction 152i to the new user 103b as defined in the output of the present transaction 152j. In some cases a transaction 152 may have multiple outputs to split the input amount between multiple users (one of whom could be the original user 103a in order to give change). In some cases transaction can also have multiple inputs to gather together the amounts from multiple outputs of one or more preceding transactions, and redistribute to one or more outputs of the current transaction.

The above may be referred to as an "output-based" transaction protocol, sometimes also referred to as an unspent transaction output (UTXO) type protocol (where the outputs are referred to as UTXOs). A user's total balance is not defined in any one number stored in the blockchain, and instead the user needs a special "wallet" application 105 to collate the values of all the UTXOs of that user which are scattered throughout many different transactions 152 in the blockchain 151.

An alternative type of transaction protocol may be referred to as an "account-based" protocol, as part of an account-based transaction model. In the account-based case, each transaction does not define the amount to be transferred by referring back to the UTXO of a preceding transaction in a sequence of past transactions, but rather by reference to an absolute account balance. The current state of all accounts is stored by the miners separate to the blockchain and is updated constantly. In such a system, transactions are ordered using a running transaction tally of the account (also called the "position"). This value is signed by the sender as part of their cryptographic signature and is hashed as part of the transaction reference calculation. In addition, an optional data field may also be signed the transaction. This data field may point back to a previous transaction, for example if the previous transaction ID is included in the data field.

With either type of transaction protocol, when a user 103 wishes to enact a new transaction 152j, then he/she sends the new transaction from his/her computer terminal 102 to one of the nodes 104 of the P2P network 106 (which nowadays are typically servers or data centres, but could in principle be other user terminals). This node 104 checks whether the transaction is valid according to a node protocol which is applied at each of the nodes 104. The details of the node protocol will correspond to the type of transaction protocol being used in the blockchain 150 in question, together forming the overall transaction model. The node protocol typically requires the node 104 to check that the cryptographic signature in the new transaction 152j matches the expected signature, which depends on the previous transaction 152i in an ordered sequence of transactions 152. In an output-based case, this may comprise checking that the cryptographic signature of the user included in the input of the new transaction 152j matches a condition defined in the output of the preceding transaction 152i which the new transaction spends, wherein this condition typically comprises at least checking that the cryptographic signature in the input of the new transaction 152j unlocks the output of the previous transaction 152i to which the input of the new transaction points. In some transaction protocols the condition may be at least partially defined by a custom script included in the input and/or output. Alternatively it could simply be a fixed by the node protocol alone, or it could be due to a combination of these. Either way, if the new transaction 152j is valid, the current node forwards it to one or more others of the nodes 104 in the P2P network 106. At least some of these nodes 104 also act as forwarding nodes 104F, applying the same test according to the same node protocol, and so forward the new transaction 152j on to one or more further nodes 104, and so forth. In this way the new transaction is propagated throughout the network of nodes 104.

In an output-based model, the definition of whether a given output (e.g. UTXO) is spent is whether it has yet been validly redeemed by the input of another, onward transaction 152j according to the node protocol. Another condition for a transaction to be valid is that the output of the preceding transaction 152i which it attempts to spend or redeem has not already been spent/redeemed by another valid transaction. Again if not valid, the transaction 152j will not be propagated or recorded in the blockchain. This guards against double-spending whereby the spender tries to spend the output of the same transaction more than once. An account-based model on the other hand guards against double-spending by maintaining an account balance. Because again there is a defined order of transactions, the account balance has a single defined state at any one time.

In addition to validation, at least some of the nodes 104M also race to be the first to create blocks of transactions in a process known as mining, which is underpinned by "proof of work". At a mining node 104M, new transactions are added to a pool of valid transactions that have not yet appeared in a block. The miners then race to assemble a new valid block 151 of transactions 152 from the pool of transactions 154 by attempting to solve a cryptographic puzzle. Typically this comprises searching for a "nonce" value such that when the nonce is concatenated with the pool of transactions 154 and hashed, then the output of the hash meets a predetermined condition. E.g. the predetermined condition may be that the output of the hash has a certain predefined number of leading zeros. A property of a hash function is that it has an unpredictable output with respect to its input. Therefore this search can only be performed by brute force, thus consuming a substantive amount of processing resource at each node 104M that is trying to solve the puzzle.

The first miner node 104M to solve the puzzle announces this to the network 106, providing the solution as proof which can then be easily checked by the other nodes 104 in the network (once given the solution to a hash it is straightforward to check that it causes the output of the hash to meet the condition). The pool of transactions 154 for which the winner solved the puzzle then becomes recorded as a new block 151 in the blockchain 150 by at least some of the nodes 104 acting as storage nodes 104S, based on having checked the winner's announced solution at each such node. A block pointer 155 is also assigned to the new block 151n pointing back to the previously created block 151n-1 in the chain. The proof-of-work helps reduce the risk of double spending since it takes a large amount of effort to create a new block 151, and as any block containing a double spend is likely to be rejected by other nodes 104, mining nodes 104M are incentivised not to allow double spends to be included in their blocks. Once created, the block 151 cannot be modified since it is recognized and maintained at each of the storing nodes 104S in the P2P network 106 according to the same protocol. The block pointer 155 also imposes a sequential order to the blocks 151. Since the transactions 152 are recorded in the ordered blocks at each storage node 104S in a P2P network 106, this therefore provides an immutable public ledger of the transactions.

Note that different miners 104M racing to solve the puzzle at any given time may be doing so based on different snapshots of the unmined transaction pool 154 at any given time, depending on when they started searching for a solution. Whoever solves their respective puzzle first defines which transactions 152 are included in the next new block 151n, and the current pool 154 of unmined transactions is updated. The miners 104M then continue to race to create a block from the newly defined outstanding pool 154, and so forth. A protocol also exists for resolving any "fork" that may arise, which is where two miners 104M solve their puzzle within a very short time of one another such that a conflicting view of the blockchain gets propagated. In short, whichever prong of the fork grows the longest becomes the definitive blockchain 150.

In most blockchains the winning miner 104M is automatically rewarded with a special kind of new transaction which creates a new quantity of the digital asset out of nowhere (as opposed to normal transactions which transfer an amount of the digital asset from one user to another). Hence the winning node is said to have "mined" a quantity of the digital asset. This special type of transaction is sometime referred to as a "generation" transaction. It automatically forms part of the new block 151n. This reward gives an incentive for the miners 104M to participate in the proof-of-work race. Often a regular (non-generation) transaction 152 will also specify an additional transaction fee in one of its outputs, to further reward the winning miner 104M that created the block 151n in which that transaction was included.

Due to the computational resource involved in mining, typically at least each of the miner nodes 104M takes the form of a server comprising one or more physical server units, or even whole a data centre. Each forwarding node 104M and/or storage node 104S may also take the form of a server or data centre. However in principle any given node 104 could take the form of a user terminal or a group of user terminals networked together.

The memory of each node 104 stores software 400 configured to run on the processing apparatus of the node 104 in order to perform its respective role or roles and handle transactions 152 in accordance with the node protocol. It will be understood that any action attributed herein to a node 104 may be performed by the software 400 run on the processing apparatus of the respective computer equipment. The node software 400 may be implemented in one or more applications at the application layer, or a lower layer such as the operating system layer or a protocol layer, or any combination of these. Also, the term "blockchain" as used herein is a generic term that refers to the kind of technology in general, and does not limit to any particular proprietary blockchain, protocol or service.

Also connected to the network 101 is the computer equipment 102 of each of a plurality of parties 103 in the role of consuming users. These act as payers and payees in transactions but do not necessarily participate in mining or propagating transactions on behalf of other parties. They do not necessarily run the mining protocol. Two parties 103 and their respective equipment 102 are shown for illustrative purposes: a first party 103a and his/her respective computer equipment 102a, and a second party 103b and his/her respective computer equipment 102b. It will be understood that many more such parties 103 and their respective computer equipment 102 may be present and participating in the system, but for convenience they are not illustrated. Each party 103 may be an individual or an organization. Purely by way of illustration the first party 103a is referred to herein as Alice and the second party 103b is referred to as Bob, but it will be appreciated that this is not limiting and any reference herein to Alice or Bob may be replaced with "first party" and "second "party" respectively.

The computer equipment 102 of each party 103 comprises respective processing apparatus comprising one or more processors, e.g. one or more CPUs, GPUs, other accelerator processors, application specific processors, and/or FPGAs. The computer equipment 102 of each party 103 further comprises memory, i.e. computer-readable storage in the form of a non-transitory computer-readable medium or media. This memory may comprise one or more memory units employing one or more memory media, e.g. a magnetic medium such as hard disk; an electronic medium such as an SSD, flash memory or EEPROM; and/or an optical medium such as an optical disc drive. The memory on the computer equipment 102 of each party 103 stores software comprising a respective instance of at least one client application 105 arranged to run on the processing apparatus. It will be understood that any action attributed herein to a given party 103 may be performed using the software run on the processing apparatus of the respective computer equipment 102. The computer equipment 102 of each party 103 comprises at least one user terminal, e.g. a desktop or laptop computer, a tablet, a smartphone, or a wearable device such as a smartwatch. The computer equipment 102 of a given party 103 may also comprise one or more other networked resources, such as cloud computing resources accessed via the user terminal.

The client application 105 may be initially provided to the computer equipment 102 of any given party 103 on suitable computer-readable storage medium or media, e.g. downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc.

The client application 105 comprises at least a "wallet" function. This has two main functionalities. One of these is to enable the respective user party 103 to create, sign and send transactions 152 to be propagated throughout the network of nodes 104 and thereby included in the blockchain 150. The other is to report back to the respective party the amount of the digital asset that he or she currently owns. In an output-based system, this second functionality comprises collating the amounts defined in the outputs of the various 152 transactions scattered throughout the blockchain 150 that belong to the party in question.

Note: whilst the various client functionality may be described as being integrated into a given client application 105, this is not necessarily limiting and instead any client functionality described herein may instead be implemented in a suite of two or more distinct applications, e.g. interfacing via an API, or one being a plug-in to the other. More generally the client functionality could be implemented at the application layer or a lower layer such as the operating system, or any combination of these. The following will be described in terms of a client application 105 but it will be appreciated that this is not limiting.

The instance of the client application or software 105 on each computer equipment 102 is operatively coupled to at least one of the forwarding nodes 104F of the P2P network 106. This enables the wallet function of the client 105 to send transactions 152 to the network 106. The client 105 is also able to contact one, some or all of the storage nodes 104 in order to query the blockchain 150 for any transactions of which the respective party 103 is the recipient (or indeed inspect other parties' transactions in the blockchain 150, since in embodiments the blockchain 150 is a public facility which provides trust in transactions in part through its public visibility). The wallet function on each computer equipment 102 is configured to formulate and send transactions 152 according to a transaction protocol. Each node 104 runs software 400 configured to validate transactions 152 according to a node protocol, and in the case of the forwarding nodes 104F to forward transactions 152 in order to propagate them throughout the network 106. The transaction protocol and node protocol correspond to one another, and a given transaction protocol goes with a given node protocol, together implementing a given transaction model. The same transaction protocol is used for all transactions 152 in the blockchain 150 (though the transaction protocol may allow different subtypes of transaction within it). The same node protocol is used by all the nodes 104 in the network 106 (though it many handle different subtypes of transaction differently in accordance with the rules defined for that subtype, and also different nodes may take on different roles and hence implement different corresponding aspects of the protocol).

As mentioned, the blockchain 150 comprises a chain of blocks 151, wherein each block 151 comprises a set of one or more transactions 152 that have been created by a proof-of-work process as discussed previously. Each block 151 also comprises a block pointer 155 pointing back to the previously created block 151 in the chain so as to define a sequential order to the blocks 151. The blockchain 150 also comprises a pool of valid transactions 154 waiting to be included in a new block by the proof-of-work process. Each transaction 152 comprises a pointer back to a previous transaction so as to define an order to sequences of transactions (N.B. sequences of transactions 152 are allowed to branch). The chain of blocks 151 goes all the way back to a genesis block (Gb) 153 which was the first block in the chain. One or more original transactions 152 early on in the chain 150 pointed to the genesis block 153 rather than a preceding transaction.

When a given party 103, say Alice, wishes to send a new transaction 152j to be included in the blockchain 150, then she formulates the new transaction in accordance with the relevant transaction protocol (using the wallet function in her client application 105). She then sends the transaction 152 from the client application 105 to one of the one or more forwarding nodes 104F to which she is connected. E.g. this could be the forwarding node 104F that is nearest or best connected to Alice's computer 102. When any given node 104 receives a new transaction 152j, it handles it in accordance with the node protocol and its respective role. This comprises first checking whether the newly received transaction 152j meets a certain condition for being "valid", examples of which will be discussed in more detail shortly. In some transaction protocols, the condition for validation may be configurable on a per-transaction basis by scripts included in the transactions 152. Alternatively the condition could simply be a built-in feature of the node protocol, or be defined by a combination of the script and the node protocol.

On condition that the newly received transaction 152j passes the test for being deemed valid (i.e. on condition that it is "validated"), any storage node 104S that receives the transaction 152j will add the new validated transaction 152 to the pool 154 in the copy of the blockchain 150 maintained at that node 104S. Further, any forwarding node 104F that receives the transaction 152j will propagate the validated transaction 152 onward to one or more other nodes 104 in the P2P network 106. Since each forwarding node 104F applies the same protocol, then assuming the transaction 152j is valid, this means it will soon be propagated throughout the whole P2P network 106.

Once admitted to the pool 154 in the copy of the blockchain 150 maintained at one or more storage nodes 104, then miner nodes 104M will start competing to solve the proof-of-work puzzle on the latest version of the pool 154 including the new transaction 152 (other miners 104M may still be trying to solve the puzzle based on the old view of the pool 154, but whoever gets there first will define where the next new block 151 ends and the new pool 154 starts, and eventually someone will solve the puzzle for a part of the pool 154 which includes Alice's transaction 152j). Once the proof-of-work has been done for the pool 154 including the new transaction 152j, it immutably becomes part of one of the blocks 151 in the blockchain 150. Each transaction 152 comprises a pointer back to an earlier transaction, so the order of the transactions is also immutably recorded.

Different nodes 104 may receive different instances of a given transaction first and therefore have conflicting views of which instance is 'valid' before one instance is mined into a block 150, at which point all nodes 104 agree that the mined instance is the only valid instance. If a node 104 accepts one instance as valid, and then discovers that a second instance has been recorded in the blockchain 150 then that node 104 must accept this and will discard (i.e. treat as invalid) the unmined instance which it had initially accepted.

UTXO-Based Model

Figure 2:
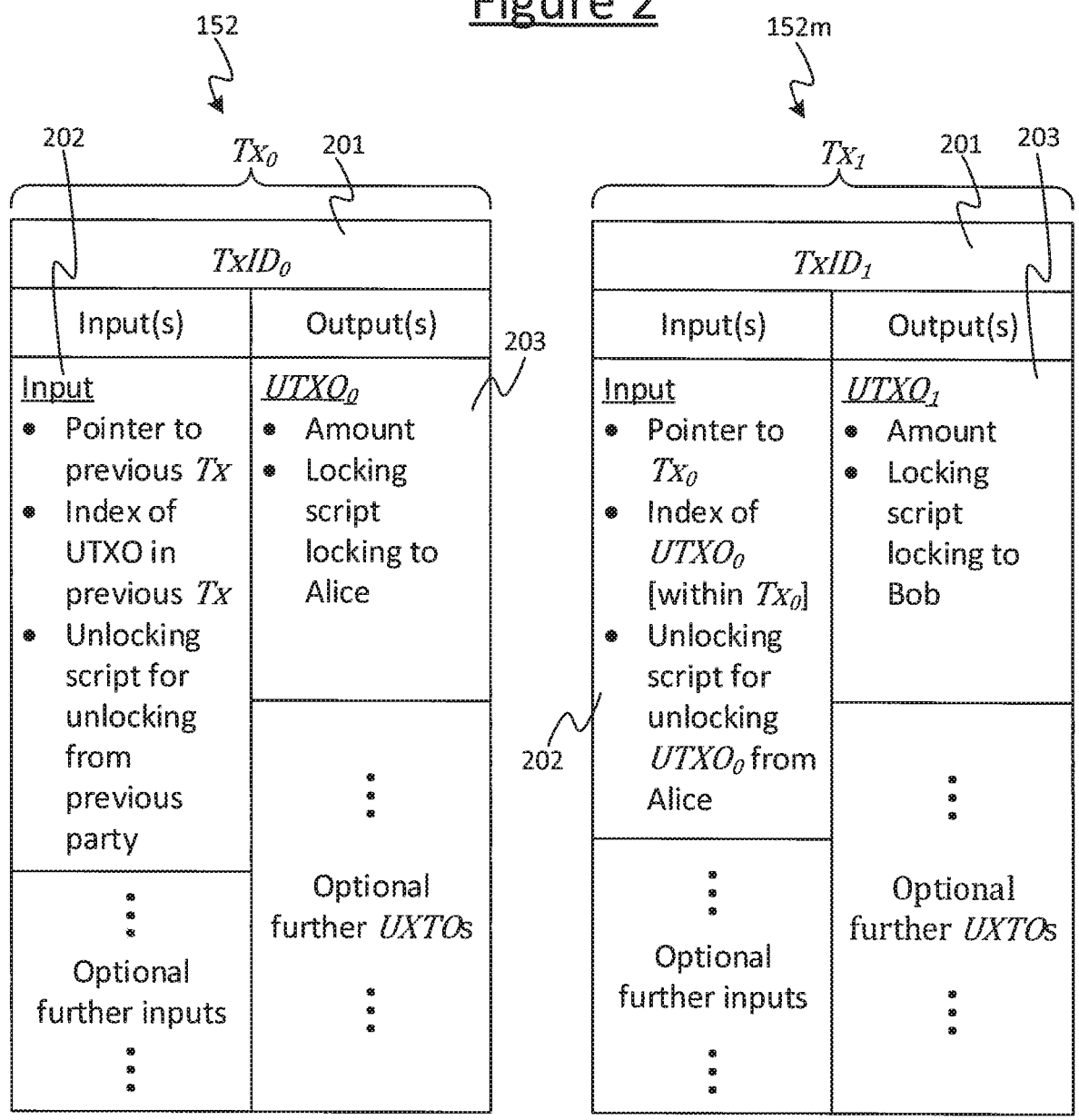
FIG. 2 schematically illustrates some examples of transactions which may be recorded in a blockchain.

FIG. 2 illustrates an example transaction protocol. This is an example of an UTXO-based protocol. A transaction 152 (abbreviated "Tx") is the fundamental data structure of the blockchain 150 (each block 151 comprising one or more transactions 152). The following will be described by reference to an output-based or "UTXO" based protocol. However, this not limiting to all possible embodiments.

In a UTXO-based model, each transaction ("Tx") 152 comprises a data structure comprising one or more inputs 202, and one or more outputs 203. Each output 203 may comprise an unspent transaction output (UTXO), which can be used as the source for the input 202 of another new transaction (if the UTXO has not already been redeemed). The UTXO specifies an amount of a digital asset (a store of value). It may also contain the transaction ID of the transaction from which it came, amongst other information. The transaction data structure may also comprise a header 201, which may comprise an indicator of the size of the input field(s) 202 and output field(s) 203. The header 201 may also include an ID of the transaction. In embodiments the transaction ID is the hash of the transaction data (excluding the transaction ID itself) and stored in the header 201 of the raw transaction 152 submitted to the miners 104M.

Say Alice 103a wishes to create a transaction 152j transferring an amount of the digital asset in question to Bob 103b. In FIG. 2 Alice's new transaction 152j is labelled "$Tx_1$". It takes an amount of the digital asset that is locked to Alice in the output 203 of a preceding transaction 152i in the sequence, and transfers at least some of this to Bob. The preceding transaction 152i is labelled "$Tx_0$" in FIG. 2. $Tx_0$ and $Tx_1$ are just an arbitrary labels. They do not necessarily mean that $Tx_0$ is the first transaction in the blockchain 151, nor that Tx/is the immediate next transaction in the pool 154. $Tx_1$ could point back to any preceding (i.e. antecedent) transaction that still has an unspent output 203 locked to Alice.

The preceding transaction $Tx_0$ may already have been validated and included in the blockchain 150 at the time when Alice creates her new transaction $Tx_1$, or at least by the time she sends it to the network 106. It may already have been included in one of the blocks 151 at that time, or it may be still waiting in the pool 154 in which case it will soon be included in a new block 151. Alternatively $Tx_0$ and $Tx_1$ could be created and sent to the network 102 together, or $Tx_0$ could even be sent after $Tx_1$ if the node protocol allows for buffering "orphan" transactions. The terms "preceding" and "subsequent" as used herein in the context of the sequence of transactions refer to the order of the transactions in the sequence as defined by the transaction pointers specified in the transactions (which transaction points back to which other transaction, and so forth). They could equally be replaced with "predecessor" and "successor", or "antecedent" and "descendant", "parent" and "child", or such like. It does not necessarily imply an order in which they are created, sent to the network 106, or arrive at any given node 104. Nevertheless, a subsequent transaction (the descendent transaction or "child") which points to a preceding transaction (the antecedent transaction or "parent") will not be validated until and unless the parent transaction is validated. A child that arrives at a node 104 before its parent is considered an orphan. It may be discarded or buffered for a certain time to wait for the parent, depending on the node protocol and/or miner behaviour.

One of the one or more outputs 203 of the preceding transaction $Tx_0$ comprises a particular UTXO, labelled here $UTXO_0$. Each UTXO comprises a value specifying an amount of the digital asset represented by the UTXO, and a locking script which defines a condition which must be met by an unlocking script in the input 202 of a subsequent transaction in order for the subsequent transaction to be validated, and therefore for the UTXO to be successfully redeemed. Typically the locking script locks the amount to a particular party (the beneficiary of the transaction in which it is included). I.e. the locking script defines an unlocking condition, typically comprising a condition that the unlocking script in the input of the subsequent transaction comprises the cryptographic signature of the party to whom the preceding transaction is locked.

The locking script (aka scriptPubKey) is a piece of code written in the domain specific language recognized by the node protocol. A particular example of such a language is called "Script" (capital S). The locking script specifies what information is required to spend a transaction output 203, for example the requirement of Alice's signature. Unlocking scripts appear in the outputs of transactions. The unlocking script (aka scriptSig) is a piece of code written the domain specific language that provides the information required to satisfy the locking script criteria. For example, it may contain Bob's signature. Unlocking scripts appear in the input 202 of transactions.

So in the example illustrated, $UTXO_0$ in the output 203 of $Tx_0$ comprises a locking script [Checksig $P_A$] which requires a signature Sig $P_A$ of Alice in order for $UTXO_0$ to be redeemed (strictly, in order for a subsequent transaction attempting to redeem $UTXO_0$ to be valid). [Checksig $P_A$] contains the public key $P_A$ from a public-private key pair of Alice. The input 202 of $Tx_1$ comprises a pointer pointing back to $Tx_1$ (e.g. by means of its transaction ID, $TxID_0$, which in embodiments is the hash of the whole transaction $Tx_0$). The input 202 of $Tx_1$ comprises an index identifying $UTXO_0$ within $Tx_0$, to identify it amongst any other possible outputs of $Tx_0$. The input 202 of $Tx_1$ further comprises an unlocking script <Sig $P_A$> which comprises a cryptographic signature of Alice, created by Alice applying her private key from the key pair to a predefined portion of data (sometimes called the "message" in cryptography). What data (or "message") needs to be signed by Alice to provide a valid signature may be defined by the locking script, or by the node protocol, or by a combination of these.

When the new transaction $Tx_1$ arrives at a node 104, the node applies the node protocol. This comprises running the locking script and unlocking script together to check whether the unlocking script meets the condition defined in the locking script (where this condition may comprise one or more criteria). In embodiments this involves concatenating the two scripts:

<Sig $P_A$><$P_A$>‖[Checksig $P_A$]

where "‖" represents a concatenation and "< . . . >" means place the data on the stack, and "[ . . . ]" is a function comprised by the unlocking script (in this example a stack-based language). Equivalently the scripts may be run one after the other, with a common stack, rather than concatenating the scripts. Either way, when run together, the scripts use the public key $P_A$ of Alice, as included in the locking script in the output of $Tx_0$, to authenticate that the locking script in the input of $Tx_1$ contains the signature of Alice signing the expected portion of data. The expected portion of data itself (the "message") also needs to be included in $Tx_0$ order to perform this authentication. In embodiments the signed data comprises the whole of $Tx_0$ (so a separate element does to need to be included specifying the signed portion of data in the clear, as it is already inherently present).

The details of authentication by public-private cryptography will be familiar to a person skilled in the art. Basically, if Alice has signed a message by encrypting it with her private key, then given Alice's public key and the message in the clear (the unencrypted message), another entity such as a node 104 is able to authenticate that the encrypted version of the message must have been signed by Alice. Signing typically comprises hashing the message, signing the hash, and tagging this onto the clear version of the message as a signature, thus enabling any holder of the public key to authenticate the signature. Note therefore that any reference herein to signing a particular piece of data or part of a transaction, or such like, can in embodiments mean signing a hash of that piece of data or part of the transaction.

If the unlocking script in $Tx_1$ meets the one or more conditions specified in the locking script of $Tx_0$ (so in the example shown, if Alice's signature is provided in $Tx_1$ and authenticated), then the node 104 deems $Tx_1$ valid. If it is a storage node 104S, this means it will add it to the pool of transactions 154 awaiting proof-of-work. If it is a forwarding node 104F, it will forward the transaction $Tx_1$ to one or more other nodes 104 in the network 106, so that it will be propagated throughout the network. Once $Tx_1$ has been validated and included in the blockchain 150, this defines $UTXO_0$ from $Tx_0$ as spent. Note that $Tx_1$ can only be valid if it spends an unspent transaction output 203. If it attempts to spend an output that has already been spent by another transaction 152, then $Tx_1$ will be invalid even if all the other conditions are met. Hence the node 104 also needs to check whether the referenced UTXO in the preceding transaction $Tx_0$ is already spent (has already formed a valid input to another valid transaction). This is one reason why it is important for the blockchain 150 to impose a defined order on the transactions 152. In practice a given node 104 may maintain a separate database marking which UTXOs 203 in which transactions 152 have been spent, but ultimately what defines whether a UTXO has been spent is whether it has already formed a valid input to another valid transaction in the blockchain 150.

If the total amount specified in all the outputs 203 of a given transaction 152 is greater than the total amount pointed to by all its inputs 202, this is another basis for invalidity in most transaction models. Therefore such transactions will not be propagated nor mined into blocks 151.

Note that in UTXO-based transaction models, a given UTXO needs to be spent as a whole. It cannot "leave behind" a fraction of the amount defined in the UTXO as spent while another fraction is spent. However the amount from the UTXO can be split between multiple outputs of the next transaction. E.g. the amount defined in $UTXO_0$ in $Tx_0$ can be split between multiple UTXOs in $Tx_1$. Hence if Alice does not want to give Bob all of the amount defined in $UTXO_0$, she can use the remainder to give herself change in a second output of $Tx_1$, or pay another party.

In practice Alice will also usually need to include a fee for the winning miner, because nowadays the reward of the generation transaction alone is not typically sufficient to motivate mining. If Alice does not include a fee for the miner, $Tx_0$ will likely be rejected by the miner nodes 104M, and hence although technically valid, it will still not be propagated and included in the blockchain 150 (the miner protocol does not force miners 104M to accept transactions 152 if they don't want). In some protocols, the mining fee does not require its own separate output 203 (i.e. does not need a separate UTXO). Instead any different between the total amount pointed to by the input(s) 202 and the total amount of specified in the output(s) 203 of a given transaction 152 is automatically given to the winning miner 104. E.g. say a pointer to $UTXO_0$ is the only input to $Tx_1$, and $Tx_1$ has only one output $UTXO_1$. If the amount of the digital asset specified in $UTXO_0$ is greater than the amount specified in $UTXO_1$, then the difference automatically goes to the winning miner 104M. Alternatively or additionally however, it is not necessarily excluded that a miner fee could be specified explicitly in its own one of the UTXOs 203 of the transaction 152.

Alice and Bob's digital assets consist of the unspent UTXOs locked to them in any transactions 152 anywhere in the blockchain 150. Hence typically, the assets of a given party 103 are scattered throughout the UTXOs of various transactions 152 throughout the blockchain 150. There is no one number stored anywhere in the blockchain 150 that defines the total balance of a given party 103. It is the role of the wallet function in the client application 105 to collate together the values of all the various UTXOs which are locked to the respective party and have not yet been spent in another onward transaction. It can do this by querying the copy of the blockchain 150 as stored at any of the storage nodes 104S, e.g. the storage node 104S that is closest or best connected to the respective party's computer equipment 102.

Note that the script code is often represented schematically (i.e. not the exact language). For example, one may write [Checksig $P_A$] to mean [Checksig $P_A$]=OP_DUP OP_HASH160 <H($P_A$)> OP_EQUALVERIFY OP_CHECKSIG. "OP . . . " refers to a particular opcode of the Script language. OP_CHECKSIG (also called "Checksig") is a Script opcode that takes two inputs (signature and public key) and verifies the signature's validity using the Elliptic Curve Digital Signature Algorithm (ECDSA). At runtime, any occurrences of signature ('sig') are removed from the script but additional requirements, such as a hash puzzle, remain in the transaction verified by the 'sig' input. As another example, OP_RETURN is an opcode of the Script language for creating an unspendable output of a transaction that can store metadata within the transaction, and thereby record the metadata immutably in the blockchain 150. E.g. the metadata could comprise a document which it is desired to store in the blockchain.

The signature $P_A$ is a digital signature. In embodiments this is based on the ECDSA using the elliptic curve secp256k1. A digital signature signs a particular piece of data. In embodiments, for a given transaction the signature will sign part of the transaction input, and all or part of the transaction output. The particular parts of the outputs it signs depends on the SIGHASH flag. The SIGHASH flag is a 4-byte code included at the end of a signature to select which outputs are signed (and thus fixed at the time of signing).

The locking script is sometimes called "scriptPubKey" referring to the fact that it comprises the public key of the party to whom the respective transaction is locked. The unlocking script is sometimes called "scriptSig" referring to the fact that it supplies the corresponding signature. However, more generally it is not essential in all applications of a blockchain 150 that the condition for a UTXO to be redeemed comprises authenticating a signature. More generally the scripting language could be used to define any one or more conditions. Hence the more general terms "locking script" and "unlocking script" may be preferred.

Optional Side Channel

Figure 3:
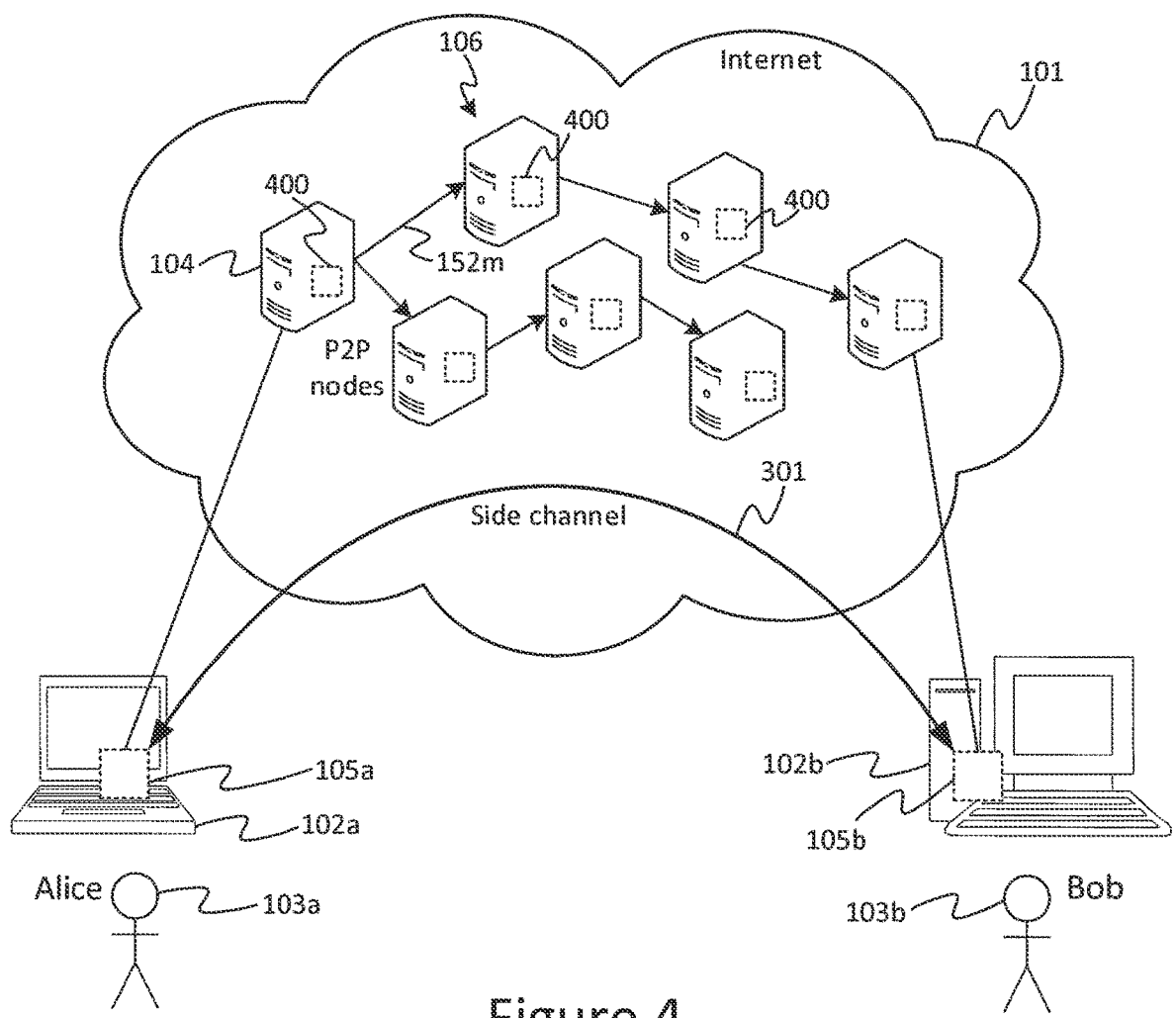
FIG. 3 is another schematic block diagram of a system for implementing a blockchain.

FIG. 3 shows a further system 100 for implementing a blockchain 150. The system 100 is substantially the same as that described in relation to FIG. 1 except that additional communication functionality is involved. The client application on each of Alice and Bob's computer equipment 102a, 120b, respectively, comprises additional communication functionality. That is, it enables Alice 103a to establish a separate side channel 301 with Bob 103b (at the instigation of either party or a third party). The side channel 301 enables exchange of data separately from the P2P network. Such communication is sometimes referred to as "off-chain". For instance this may be used to exchange a transaction 152 between Alice and Bob without the transaction (yet) being published onto the network P2P 106 or making its way onto the chain 150, until one of the parties chooses to broadcast it to the network 106. Alternatively or additionally, the side channel 301 may be used to exchange any other transaction related data, such as keys, negotiated amounts or terms, data content, etc.

The side channel 301 may be established via the same packet-switched network 101 as the P2P overlay network 106. Alternatively or additionally, the side channel 301 may be established via a different network such as a mobile cellular network, or a local area network such as a local wireless network, or even a direct wired or wireless link between Alice and Bob's devices 1021, 102b. Generally, the side channel 301 as referred to anywhere herein may comprise any one or more links via one or more networking technologies or communication media for exchanging data "off-chain", i.e. separately from the P2P overlay network 106. Where more than one link is used, then the bundle or collection of off-chain links as a whole may be referred to as the side channel 301. Note therefore that if it is said that Alice and Bob exchange certain pieces of information or data, or such like, over the side channel 301, then this does not necessarily imply all these pieces of data have to be send over exactly the same link or even the same type of network.

Node Software

Figure 4:
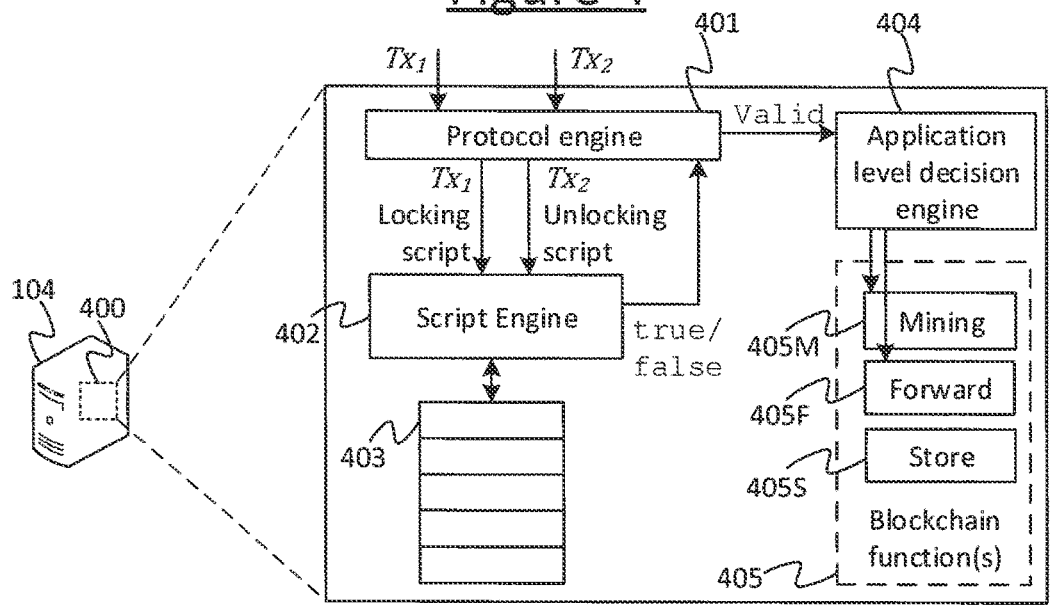
FIG. 4 is a schematic block diagram of a piece of node software for processing transaction in accordance with a node protocol of an output-based model.

FIG. 4 illustrates an example of the node software 400 that is run on each node 104 of the P2P network 106, in the example of a UTXO- or output-based model. The node software 400 comprises a protocol engine 401, a script engine 402, a stack 403, an application-level decision engine 404, and a set of one or more blockchain-related functional modules 405. At any given node 104, these may include any one, two or all three of: a mining module 405M, a forwarding module 405F and a storing module 405S (depending on the role or roles of the node). The protocol engine 401 is configured to recognize the different fields of a transaction 152 and process them in accordance with the node protocol. When a transaction 152m ($Tx_m$) is received having an input pointing to an output (e.g. UTXO) of another, preceding transaction 152m-1 ($Tx_{m-1}$), then the protocol engine 401 identifies the unlocking script in $Tx_m$ and passes it to the script engine 402. The protocol engine 401 also identifies and retrieves $Tx_{m-1}$ based on the pointer in the input of $Tx_m$. It may retrieve $Tx_{m-1}$ from the respective node's own pool 154 of pending transactions if $Tx_{m-1}$ is not already on the blockchain 150, or from a copy of a block 151 in the blockchain 150 stored at the respective node or another node 104 if $Tx_{m-1}$ is already on the blockchain 150. Either way, the script engine 401 identifies the locking script in the pointed-to output of $Tx_{m-1}$ and passes this to the script engine 402.

The script engine 402 thus has the locking script of $Tx_{m-1}$ and the unlocking script from the corresponding input of $Tx_m$. For example $Tx_1$ and $Tx_2$ are illustrated in FIG. 4, but the same could apply for any pair of transactions, such as $Tx_0$ and $Tx_1$, etc. The script engine 402 runs the two scripts together as discussed previously, which will include placing data onto and retrieving data from the stack 403 in accordance with the stack-based scripting language being used (e.g. Script).

By running the scripts together, the script engine 402 determines whether or not the unlocking script meets the one or more criteria defined in the locking script—i.e. does it "unlock" the output in which the locking script is included? The script engine 402 returns a result of this determination to the protocol engine 401. If the script engine 402 determines that the unlocking script does meet the one or more criteria specified in the corresponding locking script, then it returns the result "true". Otherwise it returns the result "false".

In an output-based model, the result "true" from the script engine 402 is one of the conditions for validity of the transaction. Typically there are also one or more further, protocol-level conditions evaluated by the protocol engine 401 that must be met as well; such as that the total amount of digital asset specified in the output(s) of $Tx_m$ does not exceed the total amount pointed to by the input(s), and that the pointed-to output of $Tx_{m-1}$ has not already been spent by another valid transaction. The protocol engine 401 evaluates the result from the script engine 402 together with the one or more protocol-level conditions, and only if they are all true does it validate the transaction $Tx_m$. The protocol engine 401 outputs an indication of whether the transaction is valid to the application-level decision engine 404. Only on condition that $Tx_m$ is indeed validated, the decision engine 404 may select to control one or both of the mining module 405M and the forwarding module 405F to perform their respective blockchain-related function in respect of $Tx_m$. This may comprise the mining module 405M adding $Tx_m$ to the node's respective pool 154 for mining into a block 151, and/or the forwarding module 405F forwarding $Tx_m$ to another node 104 in the P2P network 106. Note however that in embodiments, while the decision engine 404 will not select to forward or mine an invalid transaction, this does not necessarily mean that, conversely, it is obliged to trigger the mining or the forwarding of a valid transaction simply because it is valid. Optionally, in embodiments the decision engine 404 may apply one or more additional conditions before triggering either or both of these functions. E.g. if the node is a mining node 104M, the decision engine may only select to mine the transaction on condition that the transaction is both valid and leaves enough of a mining fee.

Note also that the terms "true" and "false" herein do not necessarily limit to returning a result represented in the form of only a single binary digit (bit), though that is certainly one possible implementation. More generally, "true" can refer to any state indicative of a successful or affirmative outcome, and "false" can refer to any state indicative of an unsuccessful or non-affirmative outcome. For instance in an account-based model (not illustrated in FIG. 4), a result of "true" could be indicated by a combination of an implicit, protocol-level) validation of a signature by the node 104 and an additional affirmative output of a smart contract (the overall result being deemed to signal true if both individual outcomes are true).

Example Transaction Set

FIG. 5 illustrates a set of transactions 152 for use in accordance with embodiments disclosed herein. The set comprises: a zeroth transaction $Tx_0$, a first transaction $Tx_1$, and a second transaction $Tx_2$. Note that "zeroth", "first" and "second" are just convenient labels. They do not necessarily imply that these transactions will be placed immediately one after another in a block 151 or the blockchain 150, nor that the zeroth transaction is the initial transaction in a block 151 or the blockchain 150. Nor do these labels necessarily imply anything about the order their transactions are sent to the network 106. They refer only to a logical series in that the output of one transaction is pointed to by the input of the next transaction. Remember that in some systems it is possible to send a parent to the network 106 after its child (in which case the "orphan" child will be buffered for a period at one or more nodes 104 while waiting for the parent to arrive).

The zeroth transaction $Tx_0$ may also be referred to as the source transaction for the present purposes, in that it acts as a source of an amount of the digital asset which is locked to Alice 103*a*. The first transaction $Tx_1$ may also be referred to as the challenge transaction or puzzle transaction for the present purposes. It acts as an intermediary for conditionally transferring the amount of digital asset from the source transaction $Tx_0$ in dependence on the second transaction $Tx_2$ providing a solution to the r-puzzle. The second transaction $Tx_2$ may also be referred to as the proving transaction, or spending transaction, as it is the transaction that will provide the solution to the r-puzzle set in the first transaction $Tx_1$ and lock the resulting payment to the prover (or potentially a beneficiary on behalf of whom the prover is acting). Embodiments may be described by way of example whereby the prover (second party) happens to be Bob, but as will be appreciated based on the discussion later, the r-puzzle in fact allows any second party to be the prover regardless of identity as long as they provide a valid signature solving the r-puzzle.

As shown in FIG. 5, the source transaction $Tx_0$ comprises at least one output $203_0$ (e.g. output 0 of $Tx_0$) which specifies an amount of the digital asset, and which further comprises a locking script locking this output to Alice 103*a*. This means that the locking script of the source transaction $Tx_0$ requires at least one condition to be met, which is that the input of any transaction attempting to unlock the output (and therefore redeem the amount of the digital asset) must include a cryptographic signature of Alice (i.e. using Alice's public key) in its unlocking script. In this sense the amount defined in the output of $Tx_0$ may be said to be owned by Alice. The output may be referred to as a UTXO. It is not particularly material for the present purposes which output of which preceding transaction the inputs of $Tx_0$ point back to (as long as they are sufficient to cover the total output(s) of $Tx_0$).

In the present case the transaction unlocking the output of the source transaction $Tx_0$ is the first transaction $Tx_2$ (the challenge transaction). Therefore $Tx_2$ has at least one input $202_1$ (e.g. input 0 of $Tx_2$) which comprises a pointer to the relevant output of $Tx_0$ (output 0 of $Tx_0$ in the illustrated example), and which further comprises an unlocking script configured to unlock the pointed-to output of $Tx_0$ according to the condition defined in the locking script of that output, which requires at least a signature of Alice. The signature required from Alice by the locking script of $Tx_0$ is required to sign some part of $Tx_2$. In some protocols the part of $Tx_1$ that needs to be signed can be a setting defined in the unlocking script of $Tx_1$. E.g. this may be set by the SIG HASH flag, which is one byte that is appended to the signature, so in terms of data the unlocking script appears as: <Sig $P_A$><sighashflag><$P_A$>. Alternatively the part that needs to be signed could simply be a fixed or default part of $Tx_1$. Either way, the part to be signed typically excludes the unlocking script itself, and may exclude some or all of the inputs of $Tx_1$. The signed part of $Tx_1$ will however include at least the output $203_1$ containing the r-puzzle (see below, Output 0 of $Tx_1$ in this example).

The first transaction $Tx_1$ has at least one output $203_1$ (e.g. output 0 of $Tx_1$, which again the output may be referred to as a UTXO). The output of the first transaction $Tx_1$ is not locked to any one party. Like $Tx_0$ it has at least one output (e.g. output 0 of $Tx_1$) which specifies an amount of digital asset to be transferred onwards, and which further comprises a locking script defining what is required to unlock that output and hence redeem this amount. However, this locking script allows its output to be unlocked by any party providing a solution to the r-puzzle.

The second transaction (spending transaction) $Tx_2$ has at least one input $202_2$ (e.g. input 0 of $Tx_2$) which comprises a pointer to the above-mentioned output of $Tx_1$ (Output 0 of $Tx_1$, in the example shown), and which also comprises an unlocking script configured to unlock said output of $Tx_1$ based on meeting the one or more requirements of the unlocking condition defined in the locking script of $Tx_1$. In accordance with embodiments disclosed herein, the unlocking condition includes at least a requirement that the corresponding unlocking script includes a solution to the r-puzzle. The r-puzzle comprises a challenge defined in the locking script of $Tx_1$ based on the r-part of an elliptical curve cryptography (ECC) signature, which can be met by any party (in this case happening to be Bob) including their signature (or at least the s-part thereof) in the unlocking script of $Tx_2$. Note that unlike the locking script of $Tx_0$, any party's signature can be used to unlock the locking condition in $Tx_1$, as long as it is a valid signature that meets the r-challenge (i.e. r-puzzle). Examples of this will be discussed in more detail shortly. Bob is simply chosen as an example of the prover or second party here, but the r-puzzle in fact allows any second party to be the prover, e.g. Charlie, Dora, Ezekiel, etc. In some embodiments, the unlocking condition in $Tx_1$ could also be made conditional on one or more further conditions, e.g. requiring a signature of Alice to be included in the unlocking script of $Tx_2$ as well.

The second transaction $Tx_2$ has at least one output $202_2$ (e.g. Output 0 of $Tx_2$) which specifies an amount of the digital asset to transfer to Bob, and a locking script locking this to Bob (i.e. it would require a further, onward transaction including Bob's signature in the unlocking script to spend). In this sense the output of the target transaction $Tx_2$ can be said to be owned by Bob. This output may again be referred to as a UTXO.

The part of $Tx_2$ signed by the prover's signature (e.g. Sig $P_B$ if it is Bob) will include at least this output $203_2$, i.e. the output locking the payment to the prover (Output 0 of $Tx_2$ in this example).

In embodiments, it is possible that the locking script in the output $203_1$ of $Tx_1$ defines multiple alternative conditions for unlocking the output, e.g. multiple alternative r-puzzles. In this case the unlocking script in the input $202_2$ of $Tx_2$ unlocks the output of $Tx_1$ if it meets any one of the alternative unlocking conditions.

The zeroth (i.e. source) transaction $Tx_0$ may be generated by Alice, the prover (e.g. Bob) or a third party. It will typically require the signature of the preceding party from whom Alice obtained the amount defined in the input of $Tx_0$. It may be sent to the network 106 by Alice, Bob, the preceding party, or another third party.

The first transaction (i.e. challenge transaction) $Tx_1$ may also be generated by Alice, the prover (e.g. Bob) or a third party. Since in embodiments it requires Alice's signature, it may be generated by Alice. Alternatively it may be generated by Bob or a third party as a template then sent to Alice to sign, e.g. being sent over the side channel 301. Alice can then send the signed transaction to the network 106 herself, or send it to Bob or a third party for them to forward to the network 106, or just send her signature for Bob or the third party to assemble into the signed $Tx_1$ and forward to the network 106. Any off-chain exchanges prior to sending $Tx_1$ to the network 106 may be performed over the side channel 301.

The second transaction (i.e. proving or spending transaction) $Tx_2$ may be generated by Alice, the prover (e.g. Bob) or a third party. As the first version requires the prover's signature and/or data, it may be generated by Bob. Alternatively it may be generated as a template by Alice or a third party then sent to Bob to sign, e.g. being sent to Bob over the side channel 301. Bob can then send the signed transaction to the network 106 himself, or send it to Alice or a third party for them to forward to the network 106, or just send his signature and for Alice or the third party to assemble into the signed $Tx_2$ and forward to the network.

It will be appreciated that there are various locations at which the different elements of a transaction can be generated and assembled, and various ways for it to be sent onwards directly or vicariously to the ultimate destination of the P2P network 106. The scope of implementation of the disclosed techniques is not limited in any of these respects.

It will also be appreciated that phrases such as "by Alice", "by Bob" and "by a third party" herein may be used as a short-hand for "by the computer equipment 102a of Alice 103a", "by the computer equipment 102b of Bob 103b", and "by computer equipment of the third party", respectively. Also, note again that the equipment of a given party could comprise one or more user devices used by that party, or server resources such as cloud resources employed by that party, or any combination of these. It does not necessarily limit the actions to being performed on a single user device.

Elliptical Curve Digital Signature Algorithms (ECDSAs)

Public key cryptography is used as a basis for securing transactions in a number of different blockchain architectures. Uses of public key cryptography include public key encryption and digital signature schemes. Public key cryptography is founded on the principle that certain functions are easy to compute but hard to reverse without some special knowledge. Such a function is called a trapdoor function and the special knowledge needed to reverse it is referred to as a trapdoor of that function. Easy to compute means it is computationally feasible to compute the trapdoor function for a given input (or set of inputs) in a reasonable time frame, and hard to reverse that it is computationally infeasible to infer that input (or those inputs) from the result without knowledge of the trapdoor.

In the context of public key cryptography, a key pair means a public key (which can be made freely available to anyone) and a corresponding private key (which is assumed to be secret in the sense that it is only known to a specific entity or group). The public key defines a trapdoor function and the corresponding private key is the trapdoor needed to reverse that function.

In a public key encryption context, encryption is based on the trapdoor function (i.e. encryption is performed in the "forward direction"), whereas decryption is based on the reversal the trapdoor function (i.e. decryption is performed in the "reverse direction") which is only feasible when the trapdoor is known.

In a digital signature context, signature verification is performed in the forward direction, using the public key, and signature generation is performed in the reverse direction and can only feasibly be performed using the private key.

In a blockchain context, digital signatures based on public key cryptography are used as a basis for cryptographically signing transactions and verifying transaction signatures.

ECC is a form of public key cryptography which harnesses the mathematical properties of elliptical curves, and has various benefits over other cryptographic schemes such as DSA (Digital Secure Algorithm).

The "Elliptic Curve Digital Signature Algorithm" (ECDSA) refers to a class of digital signature schemes which use ECC as a basis for digital signature generation and verification. Certain principles of the ECDSA are outlined below.

In mathematical terminology, ECC exploits the algebraic structure of elliptic curves over finite fields of prime order. A finite field means a finite set of elements and a set of associated operations of multiplication, addition, subtraction and division which satisfy the normal rules of arithmetic (associativity, commutativity etc.) when applied to the elements in the set. That is to say, operations which need not be addition, multiplication etc. in the "normal" sense, but which do behave in essentially the same way.

Elliptic Curve Operations:

In the context of ECC, the addition, subtraction and multiplication operations are, respectively, elliptic curve point addition, denoted "+" herein, elliptic curve point subtraction, denoted "−" herein, and elliptic curve scalar multiplication, denoted "·" herein. The addition and subtraction operations are each applied to two points on an elliptic curve and return a third point on the elliptic curve; however, the multiplication operation is applied to a scalar and a single point on an elliptic curve, and returns a second point on the elliptic curve. Division is, by contrast, defined on scalars.

Figure 6B:
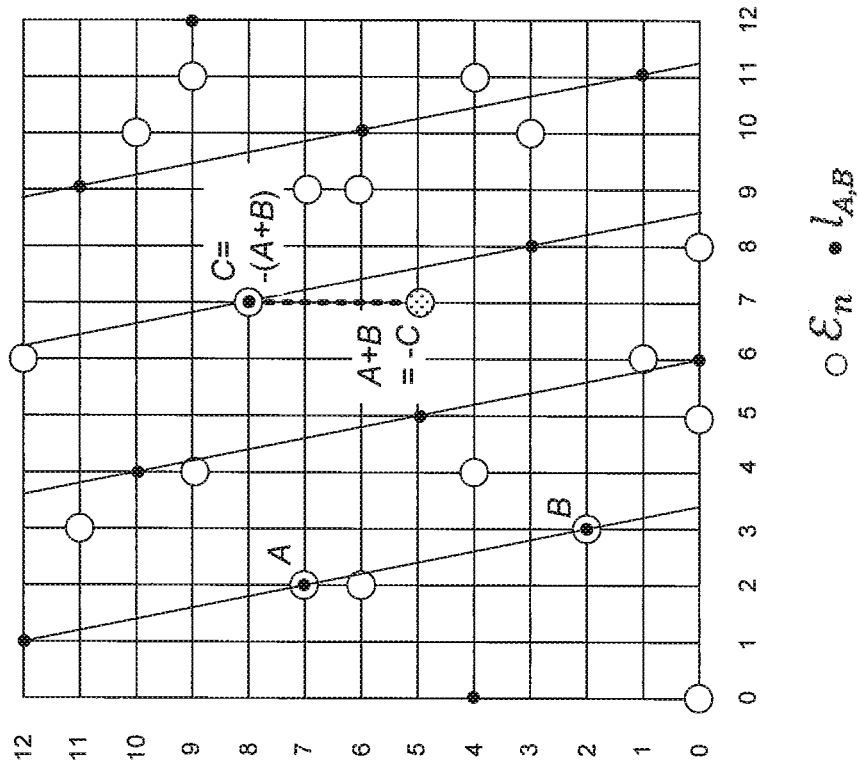
Figure 6A:
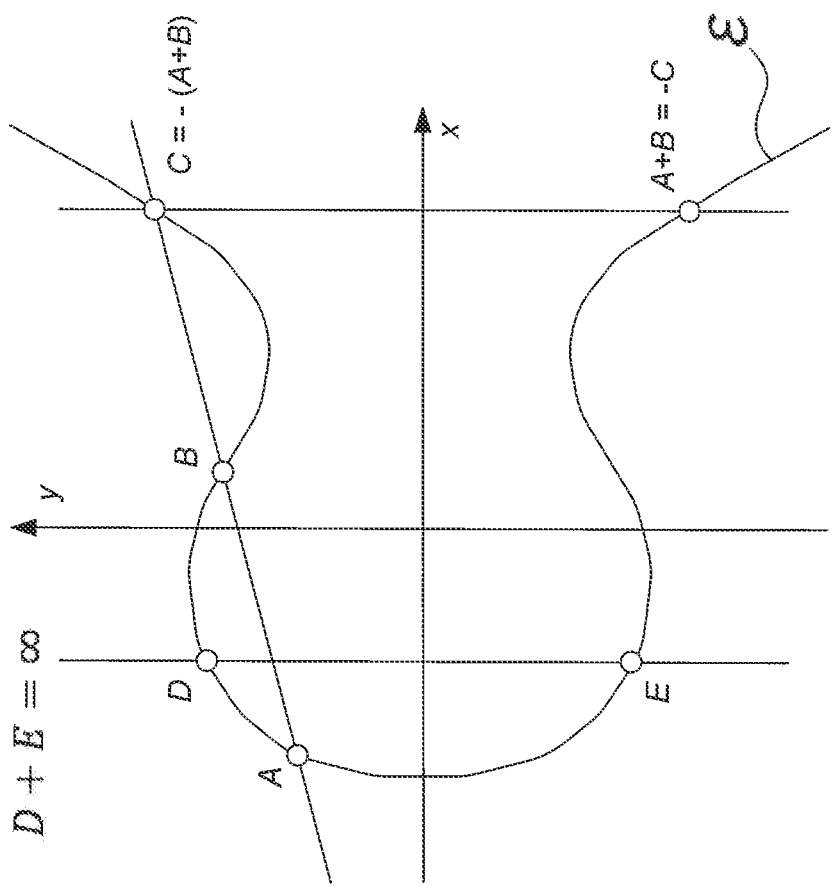

For the purposes of illustration, FIG. 6A shows an elliptic curve $\varepsilon$ in $\mathbb{R}^2$, $\mathbb{R}^2$ being the set of all real-valued two-dimensional coordinates and $(x, y) \in \mathbb{R}^2$ denoting an element of $\mathbb{R}^2$. The elliptical curve $\varepsilon$ is the set of points which satisfy the following equation:

$$\varepsilon: y^2 = x^3 + ax + b$$

Addition: A mathematical property of $\varepsilon$ is that, given any two points A, B on the elliptic curve $\varepsilon$, a line intersecting A and B will re-intersect $\varepsilon$ and one additional point only, denoted C; the elliptic curve addition of A and B, i.e. A+B, is defined as the "reflection" of C: taking the horizontal line which intersects C, the reflection of C is the other point on the elliptic curve intersected by that line. This definition hold for the case A=B, with the modification that C is now the point at which the tangent to $\varepsilon$ at A re-intersects $\varepsilon$. This definition is made to hold for the case that the line intersecting two points is vertical by defining a point at infinity, denoted $\infty$, as a point on the elliptic curve and at which any vertical line intersects the elliptic curve (e.g. the points labelled D and E are vertically horizontally aligned, hence D+E=$\infty$).

Subtraction/additive inverse: The above definition of reflection applies to any point, and provides the definition of elliptic curve point subtraction: A−B is the sum of A with the reflection of B. The reflection of B is more formally referred to as the "additive inverse" of B, which in turn is denoted −B. Using this notation, elliptic curve subtraction can be defined in mathematical notation as:

$$A - B = A + (-B).$$

Hence, in FIG. 6B, C=−(A+B) and (A+B)=−C. Note also that, under this definition, D=−E, which reflects a general rule of the algebraic structure, namely that the elliptic point addition of any point on the elliptic curve with its additive inverse is the point at infinity, i.e.

$$A + (-A) = \infty \; \forall A \in \varepsilon$$

The point at infinity $\infty$ is more formally referred to as an "identity element" (note both the parallel with and the deviation from normal arithmetic: in normal arithmetic, the sum of any number a with its additive inverse −a is 0, with 0 being the identity element for normal arithmetic). Another property of the identity element, $\infty$ which mirrors normal arithmetic, is that A+$\infty$=A for any point A on $\varepsilon$ including $\infty$ itself (analogous to the statement a+0=0 for any real number a)

Multiplication: From the definition of elliptic curve point addition, the definition of elliptic curve scalar multiplication follows: the multiplication of an elliptic curve point A with an integer v is defined as:

$$v \cdot A = \underbrace{A + \ldots + A}_{v \; times}.$$

That is, as v elliptic curve point additions of A with itself.

Note: elliptic curve scalar multiplication is also referred to in the art as elliptic curve point multiplication. Those two terms have the same meaning in the present disclosure.

Division/multiplicative Inverse: The operation of division is defined with respect to scalars: given a scalar v, its "multiplicative inverse" is defined at the scalar $v^{-1}$ such that:

$$vv^{-1} = 1.$$

FIG. 6A provides an intuitive visualization of the above operations, in which E is defined over an infinite field comprising all real-numbers $\mathbb{R}$.

FIG. 6B more closely represents how the above operations are actually applied in the context of ECC, as it shows an elliptic curve $\varepsilon_n$ defined by the equation:

$$\varepsilon_n: y^2 = x^3 + ax + b \bmod p$$

where p is a prime number (the prime modulus) and mod denotes the modulo operation. The set of points which satisfy the above equation is finite, and all but one of those points are represented in FIG. 6B as white circles; the remaining point is the identity element $\infty$. The prime number p forms part of the definition of the elliptic curve, and can be freely chosen. For the elliptic curve to have good cryptographic properties, p should be sufficiently large. For example, a 256 bit p is specified in certain blockchain models.

The subscript "n", by contrast, is referred to herein as the order of the group formed by the elliptic curve points under the point addition defined above (as shorthand, this may be called the order of the elliptic curve $\varepsilon_n$)—see below.

In other words, n is the order of the group, and p is the order of the field. There will be n elliptic curve points in total. Each point on the elliptic curve is represented by two numbers/coordinates (x,y), where x and y are all in the range—(p−1), . . . 0, . . . , (p−1).

It can be seen that $\varepsilon_n$ in FIG. 6B exhibits a horizontal symmetry which is analogous to that of $\varepsilon$ in FIG. 6A, which is a general property of elliptic curves over prime files, hence the definition of the additive inverse of a point on $\varepsilon_n$ still holds. Some points have no horizontally-aligned counterpoint (e.g. (0,0)) and such points are their own additive inverse.

The "line" $l_{A,B}$ intersecting two points A and B on $\varepsilon_n$ becomes a finite set of points, represented by smaller black circles, satisfying analogous geometric requirements, and the definition of elliptic curve scalar multiplication still holds. Analogous with FIG. 6A, FIG. 6B shows the point A+B=−C, which is the additive inverse of the point C=−(A+B) at which the line $l_{A,B}$ re-intersects $\varepsilon_n$.

The elliptic curve addition A+B=−C of any two points on $\varepsilon_n$ can be defined algebraically by the following equations:

$$A=(x_A,y_A),$$

$$B=(x_B,y_B),$$

$$C=(x_C,y_C)=-(A+B),$$

$$x_C=(\lambda^2-x_A-x_B) \bmod p,$$

$$y_C=(\lambda(x_C-x_A)+y_A) \bmod p,$$

$$=(\lambda(x_C-x_B)+y_B) \bmod p,$$

where $$\lambda=(y_A-y_B)(x_A-x_B)^{-1} \bmod p \text{ if } A \neq B,$$

and $$\lambda=(2y_A)^{-1}(3x_A^2+a) \bmod p \text{ if } A=B.$$

For the purposes of the above, the definition of the multiplicate inverse $v^{-1}$ of an integer v is modified as:

$$v^{-1}v \equiv 1 (\bmod p).$$

That is, the multiplicate inverse of the integer v is the modular inverse of v mod p.

The case of B=−A is special, and resolved by the introduction of the identity element ∞—as noted, in that case A+B=A+(−A)=∞. The case of B=∞ is also a special case, resolved as noted above as A+∞=A.

The definition of elliptic curve scalar multiplication adopts this definition of elliptic curve addition and otherwise remains the same.

In other contexts, the definition of the multiplicative inverse $v^{-1}$ of a scalar v with respect is:

$$v^{-1}v \equiv 1 (\bmod n).$$

It will be clear in context whether a multiplicative inverse is defined with respect to mod n or mod p.

In practice, to identify whether a number should be treated as mod n or mod p, the following checks may be applied:
1. Is the number representing a coordinate of an EC point?
   a. If yes, then mod p
2. Is the number to be used to multiply an EC point?
   a. If yes, then mod n Note that, there are occasions where both checks give positive answer, in which case that the number has to be mod p and mod n.

Elliptic Curve Cryptography (ECC)

Elliptic curve arithmetic provides unique capabilities in obscuring a secret value and forms the basis of many contemporary cryptographic systems. In particular, reversing scalar multiplication of elliptic curve points over finite fields is an intractable problem (it is computationally infeasible to perform).

A private key V takes the form of an integer, and the corresponding public key P is a point P on the elliptic curve $\varepsilon_n$ derived from a "generator point" G, which is also a point on the elliptic curve $\varepsilon_n$, as:

$$P = V \cdot G = \underbrace{G + \ldots + G}_{V \text{ times}}$$

where '·' denotes elliptic curve scalar multiplication on the elliptic curve $\varepsilon_n$ defined by a, b and n (the elliptic curve parameters).

For a sufficiently large V, actually performing V elliptic curve additions to derive P is hard, i.e. computationally infeasible. However, if V is known, then P can be computed much more efficiently by exploiting the algebraic properties of the elliptic curve operations. An example of an efficient algorithm that can be used to compute P is the "double and add" algorithm—crucially, this can only be implemented if V is known.

Conversely, if V is not known, then there is no computationally feasible way of deriving V (i.e. reversing the scalar multiplication) even if both G and P are known (this is the so-called "discrete-logarithm problem"). An attacker could attempt to "brute force" P by starting from G and repeatedly performing elliptic curve point additions until he gets to P; at that point, he would know V to be the number of elliptic curve point additions he had to perform; but that turns out to be computationally infeasible. Hence, V satisfies the requirements of a trapdoor in the above sense.

In ECC, the public key P, generator key G and elliptic curve $\varepsilon_n$ are public and assumed to be known, whereas the private key V is secret.

Elliptic Curve Digital Signature Verification Algorithm (ECDSA)

In a blockchain system, a user or other entity will typically hold a private key V that is used to prove their identity and the corresponding public key P would be calculated by:

$$P=V \cdot G$$

The private key V can be used sign a piece of data m ("the message") using the ECDSA.

Further details of the ECDSA may for example be found in the following, which is incorporated herein by reference in its entirety: "RFC 6979-Deterministic Usage of the Digital Signature Algorithm (DSA) and Elliptic Curve Digital Signature Algorithm (ECDSA)", Tools.ietf.org, 2019.

Figure 6D:
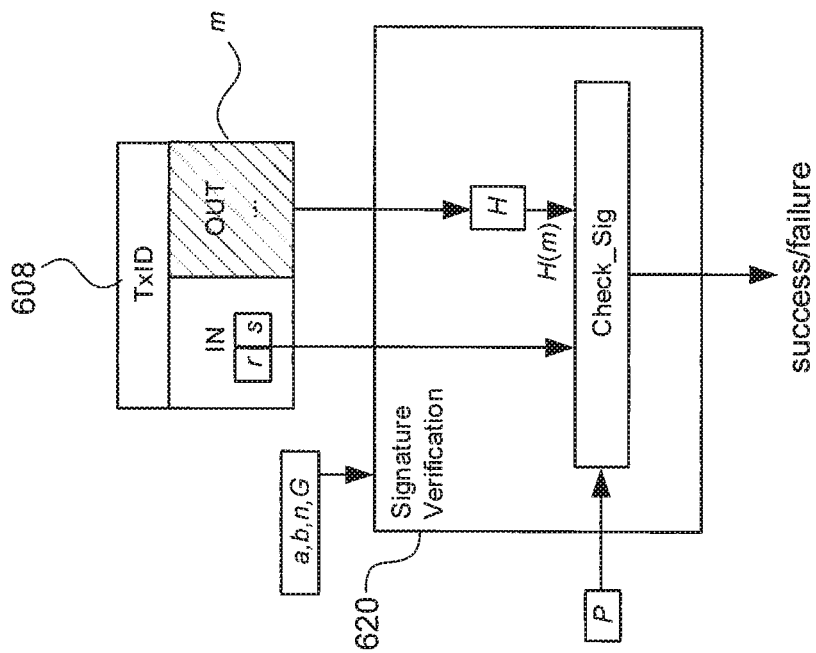
Figure 6C:
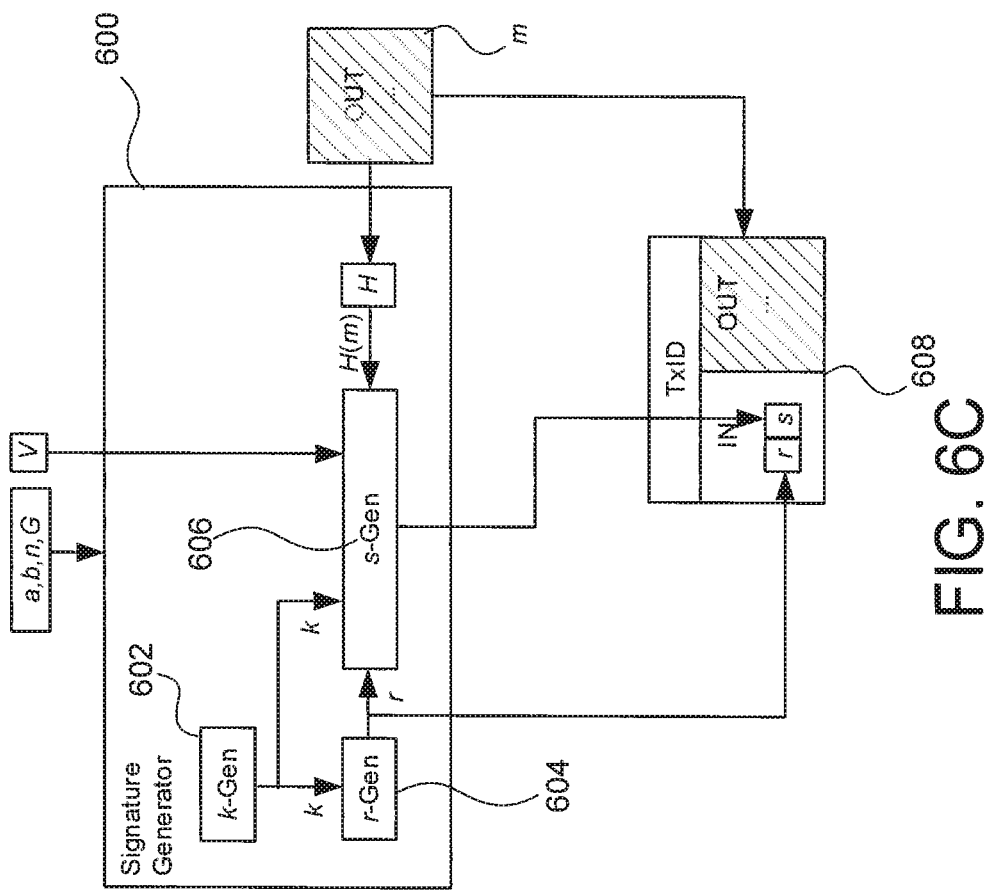

FIG. 6C shows a schematic functional block diagram of a signature generation function (signature generator 600 which generates an ECDSA signature (r, s) for a public key-private key pair (V, P). The EDSA signature is a pair of values, referred to herein as the r-part (r) and s-part (s) respectively.

The signature generation is based on the same elliptic curve $\varepsilon_n$ and generator point G used to derived the public key P, hence the elliptic curve parameters a, b and n and the generator point G are shows as inputs to the signature generator 600.

An ephemeral key generator 602 of the signature generator 600 generates an "ephemeral" key $k \in [1, n-1]$, i.e. in the range from 1 to n−1 inclusive.

An r-part generator 604 calculates a corresponding public ephemeral key from k as follows:

$$R=k \cdot G$$

and then take the x-coordinate (with $[\ ]_x$ denoting the process of taking the x coordinate of an elliptic curve point) of the calculated point:

$$r=[R]_x$$

which is the r-part of the signature.

As s-part generator 606 calculates an s-part of signature (s) using the modular inverse $k^{-1}$ of k mod n (i.e. such that $k^{-1}k \equiv 1$ (mod n)—see above) and a hash of the message m, denoted H(m) (truncated if necessary) as follows:

$$s=k^{-1}(H(m)+rV) \bmod n$$

In the present example, the message m comprises data to be included in a transaction 608 (one or more transaction outputs in the present example). This may be referred to as the process of signing the message m, and the message m may be referred to as a signed part of the transaction.

The message m and the signature (r, s), in turn, form part of the transaction 608. In the present example, the signature (r, s) in included in an input of the transaction 608 as part of an unlocking script.

FIG. 6D shows a schematic functional block diagram of a signature verification function (signature verifier) 620 for verifying the transaction 608. The calculations performed by the signature verifier 620 are based on the same elliptic curve $\varepsilon_n$ and generator point G which, as noted, are public.

Whilst the signature requires the private key Vas input, that is, one requires knowledge of it in order to generate a valid signature, only the signature pair (r, s), the message m, and the public key P are needed to validate the signature (r, s). In order to verify the signature, the signature verifier 620 hashes the signed part of the transaction m (applying the same hash function H as used to generate the signature (r, s)). The verification process is then performed using the following calculation:

$$R'=H(m)s^{-1} \cdot G + rs^{-1} \cdot P$$

The signature is valid (i.e. the signature verification will succeed) if and only if $[R']=r$, otherwise it is invalid (i.e. the signature verification fails). In the present example, r denotes the r-part of the signature included in the transaction 608.

The public key P used in the signature verification process could for example be specified in the locking script of a preceding transaction. The signature verification is performed, in that case, using the public key specified in the locking script of the preceding transaction, and the signed part m and the signature (r, s) of the (later) transaction 608—and will fail unless the signature (r, s) has been generated based the private key V corresponding to the public key P specified in the preceding transaction and the signed part m of the later transaction 608. Hence, only the person who holds the private key V can claim the output of the preceding transaction (typically by including their own public key in the output of the later transaction 608), and the signed part m of the later transaction 608 cannot be altered without invalidating the signature (r, s).

R-Puzzle

The following describes a new form of knowledge proof based on an ECDSA. By way of illustration, the challenger is a first party Alice who sets up the r-puzzle in a first transaction $Tx_1$, either by creating and publishing $Tx_1$ to the P2P blockchain network 106 herself, or by providing the necessary details to a third party for them to assemble into $Tx_1$ and publish. The verifier (the party who actually runs the proof) is the operator of a node 104 of the network, e.g. a miner. The solution to the r-puzzle is provided by publishing $Tx_2$ to the network 106. The prover can be any second party as the r-puzzle is not inherently tied to identity, but by way of example the below may be described in terms of a scenario where the prover happens to be Bob. The prover may create and publish $Tx_2$ himself, or provide the necessary details to a third party for them to assemble into $Tx_2$ and publish Cryptographic hash functions provide a means of deterministically obscuring an input where a small change in the input leads to an unpredictable change in the output. Conventional hash functions include MD5, RIPEMD-160, SHA-1, and SHA-256 [5], each of which provide collision resistance (extremely small probability of finding two inputs that produce the same output) and pre-image resistance (given a hash value h=H(d) it's extremely difficult to find the input d).

A conventional hash-puzzle can be set up as follows. The idea is to set up a first transaction $Tx_1$ which allows its output to be redeemed by a second transaction $Tx_2$ on condition that the second transaction $Tx_2$ includes some specific piece of data in its input.

In a blockchain transaction, the first party (Alice) could naively create a non-standard transaction $Tx_1$ using a hash value h within the locking script as:

OP_HASH160<h>OP_EQUALVERIFY where $h=H_{puz}(d)$ and $H_{puz}$ is a hash function used in the puzzle (in the above example, according to the locking script this hash function has to be HASH160, but in other implementations another form of hash function could be used). To redeem the UTXO in which this locking script is included will require the hash puzzle solution in the unlocking script of a subsequent transaction. As such, the spending transaction $Tx_2$ for a second party with address Addr_Bob would be constructed with an unlocking script which need only contain d.

| TxID$_2$ | |
|---|---|
| Input | Output |
| 0. TxID1<br>Unlocking script:<br><d> | 0. Address:<br>Addr_Bob<br>Amount:<br>{VALUE} | where $TxID_i$ is the transaction ID of $Tx_i$. The locking script says: take the data valued from unlocking script in the input of $Tx_2$, hash it, and check whether that equals the hash value h included in the locking script in the output of $Tx_1$. Hence the output it is unlocked by providing d in the unlocking script of $Tx_2$.

In this naïve example, after having seen the user's transaction with the hash puzzle solution in $Tx_2$, the miner who first receives this transaction can maliciously reject the transaction and create a new, malleated version $Tx_2^*$ with the same solution to the hash puzzle, but changing the output to their own address Addr_Miner. The malicious miner can then try to mine $Tx_2^*$ into a block 151 him/herself, and if they succeed before $Tx_2$ gets mined then the miner will receive the payment instead of Bob.

| TxID$_2$* | |
| --- | --- |
| Input | Output |
| 1. TxID1<br>Unlocking script:<br>⟨d⟩ | 1. Address:<br>Addr_Miner<br>Amount:<br>{VALUE} |

Digital signatures are commonly used in blockchain transactions to prove ownership and redeem unspent transaction outputs (UTXOs). This enables an output of a transaction such as Tx$_1$ to be locked to a specific party. The most common example is a pay-to-public-key-hash (P2PKH) transaction where the output of the transaction is locked to a particular hash of a public key (which also acts as the address of that party). The locking script for a public key P is:

OP_DUP OP_HASH160 ⟨$h_p$⟩ OP_EQUALVERIFY
　OP_CHECKSIG where $h_p = H_{sig}(P)$ and $H_{sig}$ is a hash function used in the signature (in the above example, according to the locking script this hash function has to be HASH160, but in other implementations another form of hash function could be used). In order to be able to use this UTXO as an input to another transaction, one would have to provide an unlocking script with a valid ECDSA signature using P:

⟨sig⟩ ⟨P⟩

The entire string (unlocking+locking script) is evaluated by the miner, which checks that the correct public key is provided and that the signature is valid and corresponds to P. The locking script basically says: take the public key P from the unlocking script in the input of Tx$_2$, hash it, and check whether that equals the hash value $h_p$ included in the locking script in the output of Tx$_1$; and also verify the signature sig using the public key P from the unlocking script of Tx$_2$ based on an ECDSA verification function, given knowledge of the signed part of Tx$_2$. The ECDSA verification function is invoked by the OP_CHECKSIG opcode.

Hence the output can only be unlocked by providing, in the unlocking script of Tx$_2$, a valid signature sig signed based on the private key V corresponding to P.

Putting this together with the hash puzzle, the above-mentioned vulnerability can be rectified by requiring a digital signature from the intended recipient, along with the hash puzzle solution. The locking script would be constructed as:

OP_HASH160 ⟨h⟩ OP_EQUALVERIFY OP_DUP
　OP_HASH160 ⟨$h_p$⟩ OP_EQUALVERIFY
　OP_CHECKSIG and the corresponding unlocking script would have to be:

⟨sig⟩ ⟨P⟩ ⟨d⟩.

However, this restricts who will be able to redeem it to the owner of the public key P. It is recognized herein that this may not be desirable in some applications, e.g. where Alice wishes to retain the ability to designate signatory authority only after setting up the puzzle.

It is recognized herein that hash puzzle functionality can be emulated by exploiting the r-part in an ECDSA signature, which may be an ephemeral random value. The ECDSA signature consists of two main parts, r and s. As seen above, $r=[k \cdot G]_x$. In place of a conventional hash puzzle h=H(d), the intractability of inverting elliptic curve addition can form an analogous puzzle called herein an r-puzzle. To solve the puzzle, one would need to obtain the solution value k, where k is the ephemeral key corresponding to r.

With conventional hash puzzles, the risk is revealing d onto the blockchain when solving the puzzle. However, with the r-puzzle, k is never revealed. Instead r is revealed and from r along with the signature, the knowledge of k can be proved.

To emulate hash puzzle functionality, the creator of the r-puzzle may first hash some other pre-image data to get the value k, since k must be a fixed size whereas the pre-image data of a hash puzzle can be any length (and one property of a hash function is that it outputs a value of a fixed length regardless of the length of the input data). For example, if using private/ephemeral keys that are 256 bits long, then the pre-image data to the r-puzzle should be hashed to get k. Alternatively however, some suitable-length value of k could just be selected and used as the secret value directly in its own right (i.e. there is no need to derive it from some other, preceding pre-image).

This method can be used with any blockchain system that uses ECDSA signatures for spending. By way of illustration, the following will describe an example implementation in a UTXO-based model. In the scripting language, the OP_CHECKSIG opcode requires a signature and a public key on the stack (with the public key on the top of the stack and the signature immediately below it). For the r-puzzle, the script is configured to check that the r value in the signature provided is the same one used for the r-puzzle challenge. In other words, the script will not only check that the signature is valid on the public key (through OP_CHECKSIG), it will also make sure that the signature is created using the r value of the r-puzzle, which is to be published on the blockchain beforehand.

Some example implementations of an r-puzzle are now discussed with reference to FIGS. 7 to 10. In each case the prover, e.g. Bob, has created a signature (r, s) by signing a part of Tx$_2$. A signature of this form may also sometimes be referred to as "sig". In the context of cryptographic signatures, the signed part is also called the "message" (m). The signed part (message) m includes at least the output 203$_2$ of Tx$_2$ which will lock the resulting payment to Bob. If there is more than one output, m may comprise some or all of the outputs. m may also include other parts such as the locktime if used. However it will typically exclude the unlocking script itself (and of course must at least exclude the signature itself). The part of Tx$_2$ to be signed as the message m could be set by Sighash, or could be a default, or a fixed feature of the protocol.

Perhaps the simplest implementation of an r-puzzle is shown in FIG. 7. The locking script in Tx$_1$ comprises a reference instance or the r-part, labelled here r'. In this method, the unlocking script in Tx$_2$ need only contain at least the s-part (s) of Bob's signature. It may also include the public key P corresponding to the private key V which Bob used to sign m. The locking script of Tx$_1$ is configured so as, when run by the script engine 402 at a node 104, to take s and P from the unlocking script of Tx$_2$ and perform the following operations:

$$R' = H_{sig}(m) s^{-1} \cdot G + r' s^{-1} \cdot P, \text{ and} \qquad \text{I)}$$

$$\text{check}[R']_x = r', \qquad \text{II)}$$

where r' is taken from the locking script of Tx$_1$, and s and m are taken from the unlocking script of Tx$_2$. Bob's public Key P may also be taken from the unlocking script $Tx_2$, or it may be known by other means. $H_{sig}$ is a hash function that was used to hash m in generating the first ECDSA signature. It may be any form of hash function. Whatever form it takes, the form (type) of this hash function may be assumed to be predetermined and known at both ends. G is a fixed, publicly known vector value.

The locking script is configured to return the result of "true" on condition that said check is true, but to return a result of "false" otherwise. In the UTXO case, a true (i.e. successful) outcome of running the locking together with the unlocking script is a requirement for validity of the transaction. Thus the validity of the $Tx_2$ can be used as a proxy for the outcome of the r-puzzle. Or put another way, the validity of $Tx_2$ is conditional on providing the solution to the r-puzzle. I.e. if Bob does not pass the r-puzzle, his transaction $Tx_2$ will not be propagated over the network 106 nor recorded in the blockchain 150 (and any payment defined in the output of $Tx_1$ will not be redeemed).

Figure 8:
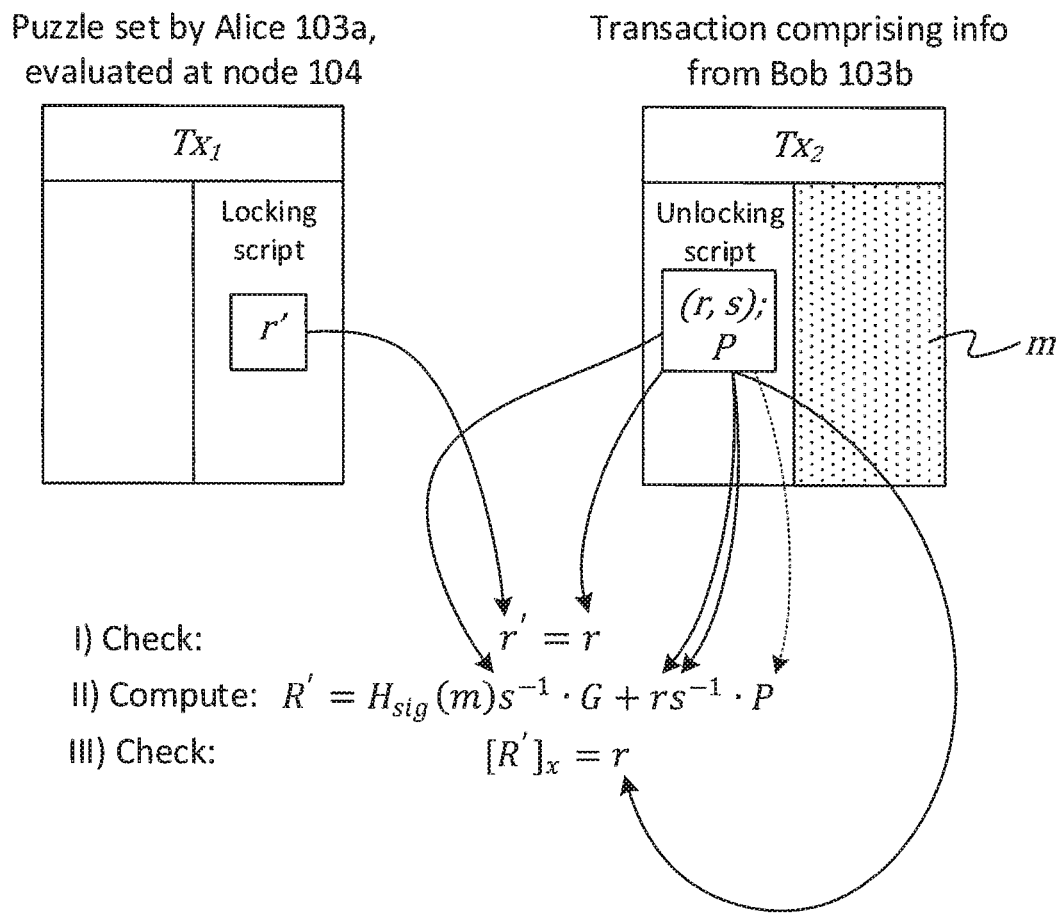
FIG. 8 is a schematic illustration of another possible implementation of an r-puzzle.

Whilst the example of FIG. 7 may be simplest in a mathematical sense, this does not necessarily mean it is simplest to integrate with any given node protocol or scripting language. If the spender only provides <s> and <P> in the unlocking script as opposed to <r, s> and <P>, then the script must account for this. Operations I)-II) are not the operations of a standard Checksig type opcode. The OP_CHECKSIG op-code expects the signature to be in DER format so if only the <s> value is provided in the unlocking script then there will need to be some additional op-codes in the locking script (OP_CAT to concatenate etc.) in order to produce a valid signature in DER format. FIG. 8, described shortly, shows an alternative example that, whilst involving an extra step mathematically speaking, in fact integrates more simply with scripting languages such as Script that already have a dedicated opcode for invoking an ECDSA signature verification based on r and s both being taken from the input of $Tx_2$.

Note also: it is not essential to include P in $Tx_2$ in all possible embodiments. In fact, from knowledge of the message m and (r, s), or in this case (r', s), it is possible to compute two possible values P and –P of the public key (but not to know which is which). Two verifications can then be used identify which is the correct one, or alternatively a one bit flag can be included in $Tx_2$ to signal which of the two possible solutions to use. This latter approach is currently used in some account-based protocols. However, it tends not to be used in current UTXO-based protocols where the scripting language (e.g. Script) has not op-code for the operation to compute P and –P from (r, s) and m. Nonetheless, the possibility should not be excluded that one could be introduced or that the operation could simply be explicitly coded into the locking script. Another possibility is that Alice already knows or has access to P or receives it over the side channel 301. However that would require a separate look-up to map P to $Tx_2$.

Another example implementation is shown in FIG. 8. Here the r-puzzle requires that the unlocking script of $Tx_2$ explicitly includes a submitted instance r of the r-part. The locking script of $Tx_1$ comprises a test for the r-part, the test comprising a reference instance r' of the r-part to be compared against the submitted instance r. In this method, the unlocking script in $Tx_2$ must contain at least the r-part (r) and the s-part (s) of Bob's signature. It may also include the public key P corresponding to the private key V which Bob used to sign m. The locking script of $Tx_1$ is configured so as, when run by the script engine 402 at a node 104, to take r, s and P from the unlocking script of $Tx_2$ and perform the following operations:

$$\text{check } r'=r, \text{ and} \qquad \text{I)}$$

$$\text{compute } R'=H_{sig}(m)s^{-1}\cdot G+rs^{-1}\cdot P, \text{ and} \qquad \text{II)}$$

$$\text{check}[R']_x=r; \qquad \text{III)}$$

where r' is taken from the locking script of $Tx_1$, and s, r and m are taken from the unlocking script of $Tx_2$. Bob's public Key P may also be taken from the unlocking script $Tx_2$, or it may be known by other means, such as by being derived from (r, s) and m or (r, s) and m as discussed previously.

The locking script is configured to return the result of "true" on condition that the checks in both steps I) and III) are true, but to return the result of "false" otherwise. Again in the UTXO based case, this enables the validity of the transaction to be determined in dependent on the outcome of the r-puzzle knowledge proof. Note that the numerals I-III do not necessarily imply an order. The check I) could be performed before or after II)-III), though III) does have to be performed after II).

In the method of FIG. 8, steps II) and III) alone are the conventional operations performed by the ECDSA verification function. In most protocols they can therefore be invoked by a dedicated opcode such as the existing Checksig opcode (OP_CHECKSIG) in Script. Step I) can be coded separately into the locking script using general purpose opcodes (an example is given shortly). It is also not excluded that steps II) and III) could in principle be explicitly encoded using general purpose opcodes instead of using a dedicated opcode such as Checksig.

In one example transaction protocol, transaction ECDSA signatures use the ASN.1 (Abstract Syntax Notation One) DER (Distinguished Encoding Rules) encoding format, as shown in FIG. 12. The first byte field contains the flag 0x30 denoting the ASN.1 sequence number. The next byte field contains the length of the sequence in hexadecimal. The third byte field contains the flag 0x02 denoting an ASN.1 integer. After that, the r value of the ECDSA signature is contained in the next 32 or 33 bytes. The field should be 32 bytes however if the first byte of r is greater than 0x7f (the first bit is a one), then an addition byte of zeros is added in front of the r value, making it 33 bytes long. This is done as a result of the DER format encoding which interprets the first bit of the integer as the sign. The extra byte of zeros is added to the beginning of the value so that it is not interpreted as a negative value. The same thing is done of the s value of the ECDSA signature. Finally, a one-byte field, hash-type (ht), is added to the DER encoding which corresponds to the type of bitcoin signature in the transaction (SIGHASH_ALL, SIGHASH_NONE, etc.).

Consider the case where Alice (A) wants to create an r-puzzle transaction in which anyone who obtains the solution to the puzzle can spend. To achieve this, she will create a new transaction $Tx_1$ like the one shown below. The inputs section includes the unlocking script of the previous transaction $Tx_0$ being spent. For simplicity, assume it to be a standard P2PKH that is spent using Alice's signature and public key. The outputs section includes the locking script (script pub key), or in other words the r-puzzle challenge. As shown in FIG. 12, signatures may use the DER encoding format in some protocols, so the script must extract the value of r from the encoded signature and then check that it is equal to 〈r〉. After that, the script must check that the signature is valid on the public key. A more detailed description of how the script works is shown in FIG. 5. The op-codes in bold are essentially just a way of extracting r from the signature.

| TxID1 | |
|---|---|
| Inputs | Outputs |
| Any spending inputs | OP_DUP OP_3 OP_SPLIT OP_NIP OP_1 OP_SPLIT OP_SWAP OP_SPLIT OP_DROP ⟨r⟩ OP_EQUALVERIFY OP_SWAP OP_CHECKSIG |

The corresponding unlocking script is shown below, where the signature $sig_r$ uses r and the spender Bob (B) can compute the signature using any private/public keypair. Note that $sig_r$ is (r, s).

⟨$P_B$⟩ ⟨$sig_r$⟩

FIG. 13 shows a step-by-step script analysis.

The ephemeral key k may be generated by Alice and given to Bob (and optionally one or more other potential provers). Alternatively k may be generated by Bob and given to Alice to set an r-puzzle that only Bob can solve (or anyone Bob chooses to share k with). In either case, the prover Bob must trust the sender Alice not to spend the transaction herself since she knows the solution (k) to the r-puzzle. To prevent this, the prover Bob could create the puzzle and then send the r value to Alice for her to use when creating the R-puzzle transaction. After that, Bob can redeem the output at a later date using any private/public keypair, as long as he keeps the value k, which is the solution to the r-puzzle and can be seen as a form of key. On the other hand, in some cases the fact that Alice knows k can be an advantageous feature. For example this can be used to create a private key puzzle, and through that a generalised atomic swap.

FIG. 9 shows another example of an r-puzzle, which may be termed herein a "pay to r-puzzle hash" (P2RPH), by analogy with pay to public key hash (P2PKH). For added security and privacy, the r value can be hashed before being placed in $Tx_1$ (which will be propagated thorough the nodes 104 of the network 106 and placed on the blockchain 150). Similar to P2PKH, where only a hash of the public key is on the blockchain instead of the public key itself, the same can be done with R-puzzles.

Here the r-puzzle again requires that the unlocking script of $Tx_2$ includes a submitted instance r of the r-part. The locking script of $Tx_1$ again comprises a test for the r-part, but this time in the form of a compressed instance of the r-part in the form of a hash of r', i.e. h=H(r'). This will be compared against the submitted instance r. In this method, the unlocking script in $Tx_2$ must again contain at least the r-part (r) and the s-part (s) of Bob's signature. It may also include the public key P corresponding to the private key V which Bob used to sign m. The locking script of $Tx_1$ is configured so as, when run by the script engine 402 at a node 104, to take r, s and P from the unlocking script of $Tx_2$ and perform the following operations:

check that $h=H_{puz}(r)$, and      I)

compute $R'=H_{sig}(m)s^{-1}\cdot G+rs^{-1}\cdot P$, and      II)

check$[R']_x=r$;      III)

where h is taken from the locking script of $Tx_1$, and s, r and m are taken from the unlocking script of $Tx_2$. The hash value $h=H_{puz}(r)$ where $H_{puz}$ is the hash function used in the hash-of-r puzzle. It may be any form of hash function. It may be the same or a different form of hash function to $H_{sig}$. Whatever form it takes, the form of $H_{puz}$ may be assumed to be predetermined and known at both ends. Bob's public Key P may also be taken from the unlocking script $Tx_2$, or it may be known by other means, such as by being derived from (r, s) and m or (r, s) and m as discussed previously.

The locking script is configured to return the result of "true" on condition that the checks in both steps I) and III) are true, but to return the result of "false" otherwise. The check I) could be performed before or after II)-III), though III) does have to be performed after II).

Also, again just as in the case of FIG. 8, steps II) and III) alone are the conventional operations performed by the ECDSA verification function. In most protocols they can therefore be invoked by a dedicated opcode such as the existing Checksig opcode (OP_CHECKSIG) in Script. Step I) can be coded separately into the locking script using general purpose opcodes.

An example of the locking script in the transaction challenge $Tx_1$ is shown below:

| TxID1 | |
|---|---|
| Inputs | Outputs |
| Any spending inputs | OP_DUP OP_3 OP_SPLIT OP_NIP OP_1 OP_SPLIT OP_SWAP OP_SPLIT OP_DROP OP_HASH160 ⟨h⟩ OP_EQUALVERIFY OP_SWAP OP_CHECKSIG |

Any type of hash function could have been used which is consistent between both parties, the sender and the receiver. However, staying consistent with the P2PKH standard, we use OP_HASH160, a double hash of SHA-256 and then RIPEMD-160.

The corresponding unlocking script is shown below (the same as in the previous section), where the signature $sig_r$ uses r and the spender Bob (B) can compute the signature using any private/public keypair:

⟨$P_B$⟩ ⟨$sig_r$⟩

The example of FIG. 9 is thus just like FIG. 8 except that it uses a hash of the r-part as the basis of the r-challenge instead of an untransformed instance of r.

Note that in any of these cases, it is not excluded that the unlocking script of $Tx_1$ could impose additional criteria for a "true" outcome. E.g. an example would be a locktime or a requirement for an additional signature.

An example use case of any of the above techniques is as a general knowledge challenge. Consider any challenge that has some solution k, or some solution that can be hashed to k. Alice can then create an R-puzzle that is coupled to the puzzle. Namely, she can define $r=[k\cdot G]_x$.

As an example, Alice is a maths professor. She can construct an r-puzzle transaction $Tx_1$, where the underlying k value is the solution to a maths question which students are incentivised to solve. Whoever works out the solution can use that to create a signature (r, s), where r will match the value in the locking script, hence, claim the reward. The signature not only provides authenticity but also acts a knowledge proof of the solution without revealing the solution to anyone else. R-puzzles thus provide a secure mechanism to prove the knowledge of some solution or information in general without the risk of exposing it. It elegantly reuses signatures required in unlocking scripts and allows whoever finds the solution to claim the reward with privacy, as any public key P can be used.

This scheme can also be used as a form of token or digital ticket. For example, an event organiser can issue different values of k as digital tickets to the attendees. When an attendee wants to attend the event, they can prove knowledge of the secret token through the use of the r-puzzle.

As another example use case, an r-puzzle can be used as a signatory authorisation scheme, where one party can delegate the right to sign to another party. Consider an r-puzzle transaction $Tx_1$ that can only be unlocked if a signature with an r value that matches the locking script is provided. This implies that only a person who knows the value k, where $[k \cdot G]_x = r$ can produce a such signature. However, if the person passes on the knowledge of k to someone else, then this is effectively authorizes the other person to sign on his or her behalf.

For example, suppose Alice wants to receive a delivery. She is worried that she might not be there to accept the delivery. She gives both Bob and Charlie a copy of k so that they can accept the delivery on her behalf. If Dave is delivering the parcel, she must get a signature with the expected r value to release the parcel to Bob.

In a scenario like this, k can be thought of as acting as an ephemeral private key, and r as an ephemeral public key; analogous to V and P respectively, except that k and r are not linked to a particular identity.

Joint Value R-Puzzle

As an extension to the hashed R-puzzle (P2RPH) of FIG. 9, it is possible to include an extra value d concatenated with r before hashing (to get $h = H_{puz}(r\|d)$). In that case, the prover (e.g. Bob) must not only solve the r-puzzle, but also know r. An example implementation of this is shown in FIG. 10.

The locking script of $Tx_1$ is configured so as, when run by the script engine 402 at a node 104, to take r, s, P and d from the unlocking script of $Tx_2$ and perform the following operations:

$$\text{check } h_{joint} = H_{puz}(r\|d), \text{ and} \qquad \text{I)}$$

$$\text{compute } R' = H_{sig}(m)s^{-1} \cdot G + rs^{-1} \cdot P, \text{ and} \qquad \text{II)}$$

$$\text{check } [R']_x = r; \qquad \text{III)}$$

where r‖d represents a concatenation of r and d in either order (r first or d first). An example of the locking script in the challenge transaction $Tx_1$ is shown below:

| TxID | |
|---|---|
| Inputs | Outputs |
| Any spending inputs | OP_DUP OP_3 OP_SPLIT OP_NIP OP_1 OP_SPLIT OP_SWAP OP_SPLIT OP_DROP OP_2 OP_ROLL OP_CAT OP_HASH160 ⟨ $h_{joint}$ ⟩ OP_EQUALVERIFY OP_OVER OP_CHECKSIGVERIFY OP_CHECKSIG |

The corresponding unlocking script is shown below (the same as in the previous section except with d included). The signature $sig_r P_B$ uses r and the prover Bob (B) can compute the signature using any private/public keypair.

⟨$sig'$⟩ ⟨$P_B$⟩ ⟨$d$⟩ ⟨$sig_r$⟩

The extra signature sig' is an added feature for security (see the section on optional security features later). However this need not be required in all possible embodiments.

An example use case would be a CLTV Linked R-Puzzle. In this case, the data value d can be a time value t which is linked to a CLTV (Check Lock Time Verify) transaction output. The motivation behind this is to hide the time t that the output cannot be spent before within the P2RPH hash and link it to an R-Puzzle. In that case, the prover (e.g. Bob) must not only solve the r-puzzle, but also know t and wait until the specific time to spend it. An example of the locking script in the transaction is shown below:

| TxID1 | |
|---|---|
| Inputs | Outputs |
| Any spending inputs | OP_DUP OP_3 OP_SPLIT OP_NIP OP_1 OP_SPLIT OP_SWAP OP_SPLIT OP_DROP OP_2 OP_ROLL OP_CHECKLOCKTIMEVERIFY OP_CAT OP_HASH160 ⟨ $h_{joint}$ ⟩ OP_EQUALVERIFY OP_OVER OP_CHECKSIGVERIFY OP_CHECKSIG |

The corresponding unlocking script is shown below, where the signature $sig_r P_B$ uses r and the spender Bob (B) can compute the signature using any private/public keypair.

⟨$sig'$⟩ ⟨$P_B$⟩ ⟨$t$⟩ ⟨$sig_r$⟩

The extra signature sig' is an added feature for security (see the section on optional security features later). However this need not be required in all possible embodiments.

The above has been described in terms of a concatenation. However, it is also possible to generalize this to some function $f(r, d)$. For example $f$ could be an addition of r and d, e.g. implemented as <r> <d> OP_ADD.

R-Puzzle Proof-of-Work

As a variant of the joint value puzzle above, the value d received in the proving transaction $Tx_2$ can be used as a nonce value in a form of PoW (proof-of-work) puzzle. The spender must not only solve the r-puzzle, but also do the work to find a nonce value which results in a hash of a certain difficulty, target. In other words, a check in script for the below equation, or a value with more leading zeros than target.

$$H_{puz}(r\|nonce) < target$$

Note: in general a given hash function could be a single elementary hash function or a composition of two or more constituent hash functions. For instance in embodiments $H_{puz} = H[H(\ldots)]$. In a common blockchain mining protocol the transaction header is hashed twice in the proof-of-work. Hence to mimic this, in embodiments of the r-puzzle PoW disclosed herein $r\|d$ may also be hashed twice. However this is optional and in other embodiments $H_{puz}$ could just be a single hash.

Preferably this check is combined with at least a regular ECDSA signature verification performed on the signature tuple (r, s) received in $Tx_2$ in order to verify that the r value used in the proof-of-work corresponds to the signature. The locking script and unlocking script, when run together, then only output a result of "true" if both checks are met, i.e. the nonce together with r meets the target, and the signature is verified.

In this case, the locking script of $Tx_1$ is configured so as, when run by the script engine 402 at a node 104, to take r, s, P and the nonce from the unlocking script of $Tx_2$ and perform the following operations:

check $H_{PoW}(r\|d) < target$ compute $R' = H_{sig}(m)s^{-1} \cdot G + rs^{-1} \cdot P$, and check that $[R']_x = r$ where $r\|d$ represents a concatenation of r and d in either order (r first or d first), and d is the nonce. This is illustrated in FIG. 14A. In general, $H_{PoW}$ could be the same or a different form of hash function to $H_{sig}$ and/or $H_{PoW}$.

The corresponding locking script in the transaction $Tx_1$ is shown below:

| TxID | |
|---|---|
| Inputs | Outputs |
| Any spending inputs | OP_DUP OP_3 OP_SPLIT OP_NIP OP_1 OP_SPLIT OP_SWAP OP_SPLIT OP_DROP OP_2 OP_ROLL OP_CAT OP_SHA256 OP_SHA256 ⟨target⟩ OP_LESSTHAN OP_VERIFY OP_OVER OP_CHECKSIGVERIFY OP_CHECKSIG |

The corresponding unlocking script is shown below (the same as in the previous section except with a nonce and the data value d), where the signature $sig_r P_B$ uses r and the spender Bob (B) can compute the signature using any private/public keypair.

⟨$sig'$⟩⟨$P_B$⟩⟨nonce⟩⟨$sig_r$⟩

The extra signature sig' is an optional added feature for security (see the section on optional security features later). However this need not be required in all possible embodiments.

Note that the nonce here is a different nonce than used in the inherent, underlying proof-of-work performed by mining nodes on their pool of transactions 154 in order to mine transactions into blocks 151 according to the basic node protocol obeyed by all nodes 104. The disclosed technique therefore layers an additional proof-of-work, to be performed by the prover (e.g. Bob), on top of the basic blockchain protocol. In order for Bob to redeem the output, he must not only know the value of k, but also do some proof-of-work to get a valid nonce value as well.

An example use case would be if the challenger, Alice, would only like the prover (Bob) to be able to receive the amount of digital assets defined in the output of $Tx_1$ after a certain time (since proof-of-work takes time). This could be used as an alternative to the locktime.

Another example would be proof of computation ability. Alice would like to identify who has the most computational power available. She creates a PoW r-puzzle. Whoever solves it first spends the output and demonstrates that they have the greatest hash power. In this context, it may also be useful if they can link their identity to the solution using their public key P or another $P_2$ (see next section). Alice may then choose to use some further services of the winner that require this computational power.

In general the value of k needed to generate the r-part of the solution may be given to the prover by Alice or a third party, or may be given to Alice by the prover (or one of the potential proves). For instance in the proof of computational ability example, Alice or a third party may distribute k to one or more potential provers to enable them to participate in the challenge.

Note that in the above example locking script, the locking script does not include a check of what r value is used. This is not essential to verify the proof-of-work itself.

Figure 14C:
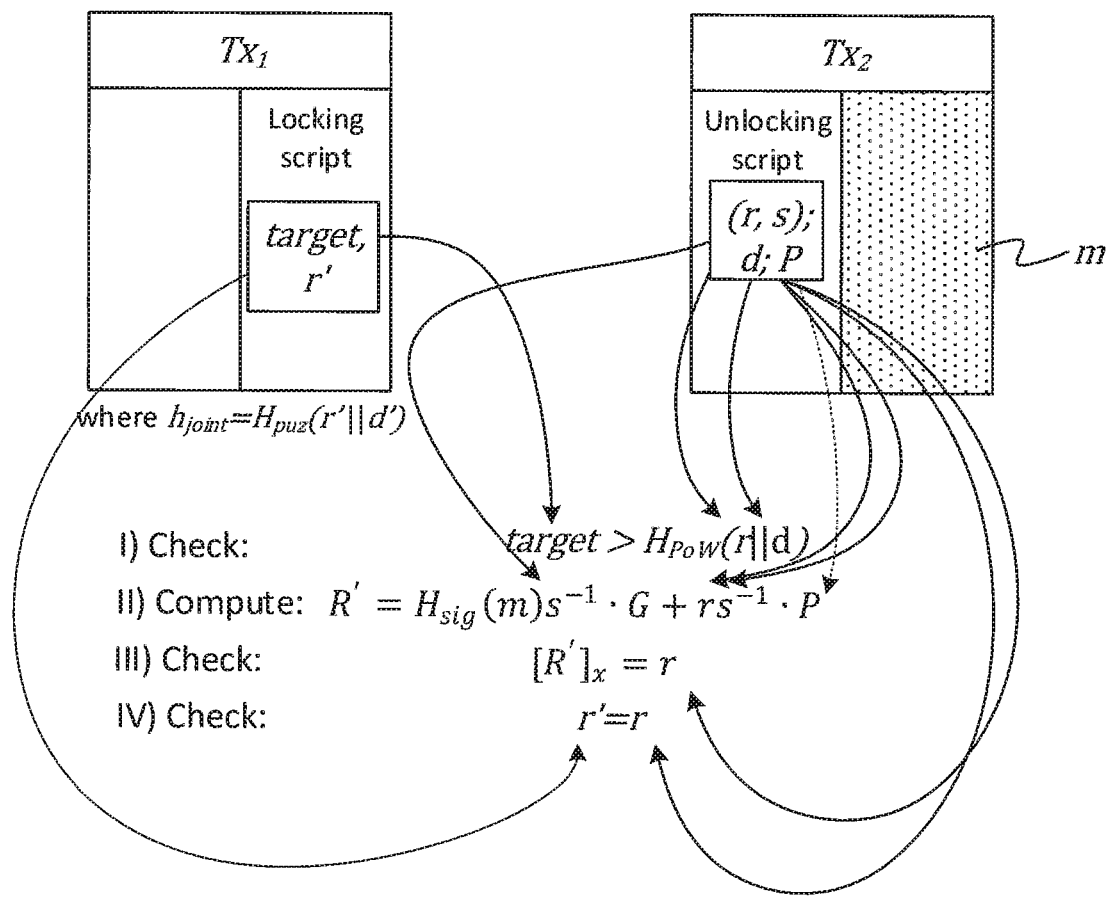
Figure 14D:
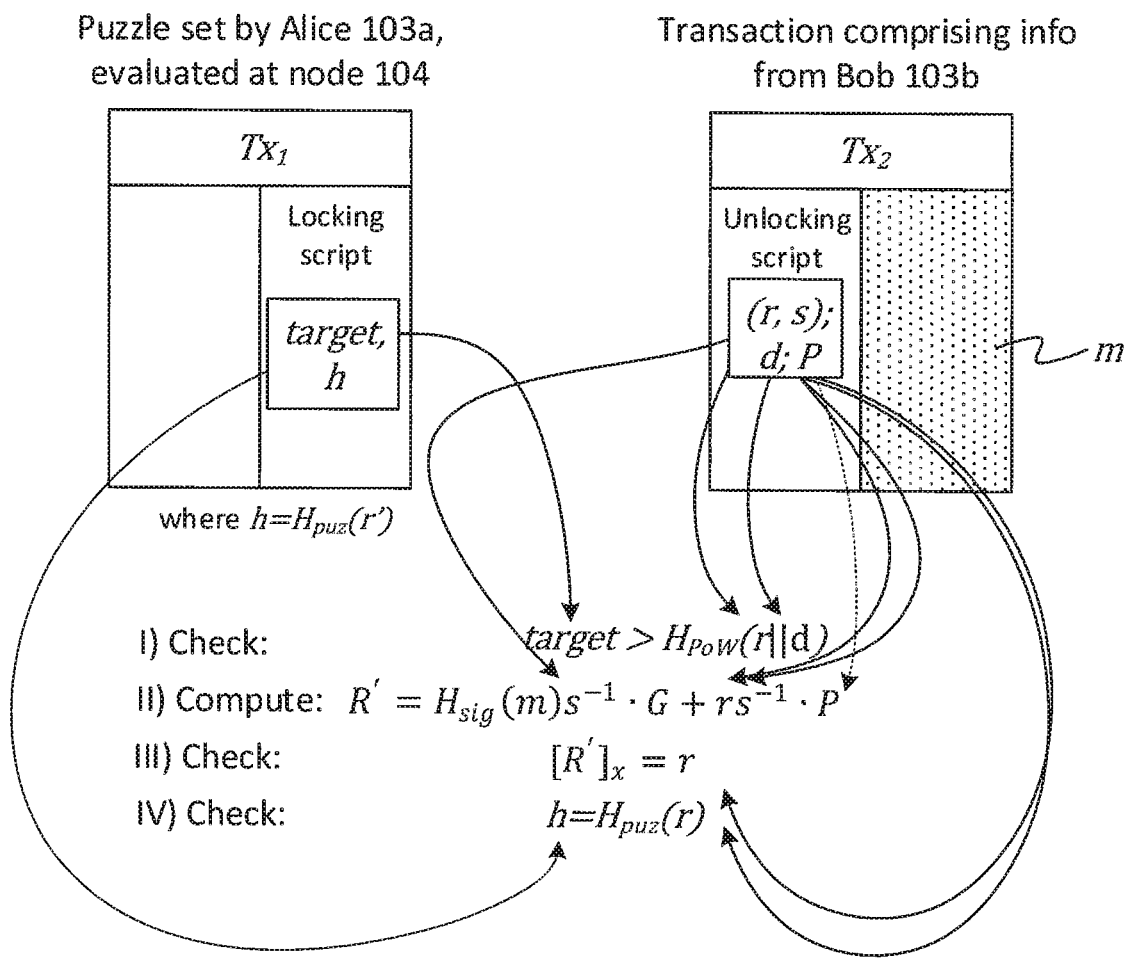

Optionally however, in embodiments the unlocking script will include some extra code (not shown) to check which r value is used. This may be done by combining the PoW r-puzzle described above with any of the checks described in relation to FIGS. 7 to 9, for example. FIG. 14B shows the combination of the r-puzzle proof-of-work with the verification of FIG. 7. FIG. 14C shows the combination of the r-puzzle proof-of-work with the verification of FIG. 8. FIG. 14C shows the combination of the r-puzzle proof-of-work with the verification of FIG. 9. In these cases, locking script and unlocking script, when run together, then only output a result of "true" if all the checks are met. Note that the numerals I), III) and IV) herein do not imply that a particular order to he checks is essential, and in general the checks can be performed in any order relative to one another, In other embodiments, there can be an advantage not having a reference value for the r-part in the locking script. The will allow anyone to provide a solution without others stealing it. The idea is that a prover can choose a k value, and work out r. The prover then goes through all possible values of d. If none of them works, the prover could try different k. After finding the pair r and d, the prover can construct a signature with r as its r-part.

A fixed r' (or hash of r') in the locking script will on the other hand will require the prover to solve the r-puzzle first or being given the k value, which is not desirable in this case.

The above has been described in terms of a concatenation. However, in any version of the r-puzzle proof of work, it is also possible to generalize this to some function $f(r, d)$. For example $f$ could be an addition of r and d, e.g. implemented as <r> <d> OP_ADD. Also, the condition to be met by $f(r, d)$ is not limited to the hash being less than a target value or having at least a predetermined number of leading zeros. In general any condition could be used for the proof-of-work, e.g. that the hash of $f$ is greater than a target, or within a predetermined range, for example. Furthermore, similar comments apply about the prover's public key P as these made above, i.e. P could be received in $Tx_2$ or derived from the r-part and s-part, or received via some other means.
Optional Security Feature #1

If a signature based on k gets published, then anyone who knows the value of k can derive the value of the secret key V used to create the signature. This can be done by solving for V in the signature equation below.

$$s=k^{-1}(H(m)+rV) \bmod n$$

Solving for $V$ we Get:

$$V=r^{-1}(sk-H(m)) \bmod n$$

This does not pose significant risks as in many cases the receiver of the transaction is the only one who knows k. In other cases, the spender must be wary never to re-use the private key V which was used to sign the solution to the R-puzzle. Good security practice dictates that it is preferable for a user never re-use public/private keypairs (P, V), but rather always use a fresh new public/private keypair when receiving new money.

In principle, the public-private key pair (P, V) is "permanent". That is, it can be used many times. The use of the random ephemeral key k should ensure this. However, there have been incidents where the random number generator was poorly implemented.

If one signs two different messages using the same ephemeral key k and the same private key, then one can derive the private key V from the two signatures. I.e. given (r, s) and k, one can work out V, where $r=[k \cdot G]_x$ and V is the private key to the public key P used in the signature. If the random number generator fails during the signing process, it may generate the same random number as last time, hence leaking the private key to the public. To address the problem, people start to avoid reusing public keys instead of fixing random number generators.

In the present case, if Alice knows k, but she does not know V, the private key to Bob's public key. When Alice passes on k to Bob. Bob will be able to solve the r-puzzle by providing (r, s) using his private key. When Alice sees the signature, as she knows k, she will be able to derive V. This might not be desirable for Bob. Therefore Bob should preferably avoid re-using (P, V).

However, an issue with this is that Bob's public key P can then not be used as a persistent means of identifying Bob.

To address this, according to embodiments disclosed herein, Bob may include an additional signature $sig_2$ of Bob in $Tx_2$ using a separate private key $V_2$ having a corresponding public key $P_2$. He also includes $P_2$ in along with the extra signature. There are thus two types of public-private key pairs. The first type is those which are generated on the fly for one-time use. The other type is those which are generated according to some extra protocols, e.g., HD wallet. Bob can use the first type of key pair for r puzzle signature, and use the second type for the second signature.

Alice can then use this further public key to look up an identity of Bob, e.g. a proper name, username, or network address of Bob, based on a mapping between the public key and the identity. The mapping could for example be made available in a public database mapping public keys to identities, or the mapping could simply be pre-agreed between Alice and Bob (e.g. stored privately on Alice's computer equipment 102a).

Consider again the signatory authority use case. For example, Alice wants to receive a delivery but might not be available accept the delivery herself. She gives both Bob and Charlie a copy of k so that they can accept the delivery on her behalf. Dave is delivering the parcel. He must get a signature with the expected r value. Now imagine that for his records or regulatory compliance, Dave also needs to verify the identity of the receiver.

Suppose Bob is there to accept the delivery. If Bob produces his public key and a signature based on k, then both Alice and Charlie will be able to work out Bob's private key V. This is not an issue if the public key is designed for one time use only. However, it will not be ideal if Bob needs this public key to prove his identity in the future.

To address this issue, embodiments may include in $Tx_2$ one more signature that is independent of the r-puzzle from Bob which can be used to identify Bob. For example, the extra signature and the corresponding public key $P_2$ can be added to an OP_RETURN output (an unspendable output) in the same transaction that Dave accepts. An alternative is to include an extra OP_CHECKSIG in the locking script of the r-puzzle transaction. By browsing the transaction and the public key used for the extra signature, Alice can tell who has signed on her behalf.

In some other cases, there can be concerns that the value k might be leaked prior to use. To address this, Alice can add a P2PKH to an r-puzzle transaction to make it securer. Suppose Alice would like to delegate her signing right to Bob. Alice obtains a one-time public key k from Bob and creates an r-puzzle transaction that not only specifies the r value but also specifies the extra public key $P_2$.

In order for Alice herself to be able to sign as well, optionally Alice can create a 1-out-of-2 MultiSig. An example of the locking script is given below:

| TxID | |
|---|---|
| Inputs | Outputs |
| Any spending inputs | OP_DUP OP_3 OP_SPLIT OP_NIP OP_1 OP_SPLIT OP_SWAP OP_SPLIT OP_DROP 〈 r 〉 OP_EQUALVERIFY OP_OVER OP_CHECKSIGVERIFY OP_CHECKSIGVERIFY OP_1 〈 Alice's PK 〉 〈 Bob's PK 〉 OP_2 OP_CHECKMULTISIG |

Note that the r-Puzzle provides more flexibility as Alice can choose when to pass the solution of the r-puzzle, i.e., the signing right, to Bob. She can decide to pass on or not to pass on even after the transaction is mined.

If k is leaked, then people can discover the private key that is used to sign the signature with the leaked k. However there is another private key $V_2$: the private key that is linked to the public key that can be used to identity Bob. For the output to be compromised, the attacker has to obtain two independent secrets which is much more unlikely than compromising only one of them.

Note, in the above example, the locking script of $Tx_2$ is locked to Bob's extra public key $P_2$ by means of a conventional P2PKH (to be unlocked by the extra signature, not the one used in the r-puzzle). The r-puzzle technique allows an additional choice for users. In some applications it may be desired to use the r-puzzle so that prover is allowed to meet the challenge, regardless of identity. In some other applications on the other hand, the combination of hash puzzle and P2PKH may still be desirable, and the r-puzzle can optionally be used in conjunction with that. This will be discussed in more detail later.

If however the extra signature corresponding to $P_2$ is required for identity look-up and/or security, but without the locking script of $Tx_1$ being tied in advance to the identity of a particular prover as in a P2PKH, then the above locking script can be adapted accordingly.

That is, it can simply include a Checksig on the extra signature, but not an OP_EQUALVERIFY on the corresponding public key $P_2$.

Optional Security Feature #2

Another potential security vulnerability in the above method is signature forgeability. This may be exploited by a miner trying to claim the funds (similar to with the hash puzzle). A miner who receives the transaction (from a spender) can change the transaction to send the funds to himself while using the same signature that the spender used in the original transaction. This is done as follows:

Let $P=V \cdot G$ be the public/private keypair used to sign the original transaction denoted by m to get a signature (r, s) such that:

$r=[k \cdot G]_x$, and $s=k^{-1}(H(m)+rV) \bmod n$.

To spend that transaction, the spender will use the following unlocking script:

⟨$p$⟩ ⟨$r,s$⟩

The miner who receives this transaction can change the transaction into a new one denoted by m' which sends the funds to himself using the following new unlocking script:

⟨$p'$⟩ ⟨$r,s$⟩ where $P'=V' \cdot G$ is the public/private keypair such that:

$V'=V+r^{-1}[H(m)-H(m')]$, and $P'=P+r^{-1}[H(m)-H(m')] \cdot G$.

Note that the miner does not need to know V' (since they do not know V). The verification process is done using the following calculation:

$R'=H(m)s^{-1} \cdot G+rs^{-1} \cdot P$

The signature is valid if and only if $(R')_x=r$, otherwise it is invalid.

With the new transaction m' and the new unlocking script, the verification process is as follows:

$R' = H(m')s^{-1} \cdot G + rs^{-1} \cdot P'$ $= H(m')s^{-1} \cdot G + rs^{-1} \cdot \{P + r^{-1}[H(m) - H(m')] \cdot G\}$ $= rs^{-1} \cdot P + H(m)s^{-1} \cdot G$ $= r$ (Note that the primed notation has a different meaning here than earlier—primed in this context does not refer to a reference instance.)

To address this potential vulnerability, embodiments may include another extra signature sig' in the unlocking script on another message $m_{sighash}$ which a miner will not be able to provide unless they know the secret key V. In that case the unlocking script would be:

⟨$sig'$⟩ ⟨$p$⟩ ⟨$sig_r$⟩ sig' may be a signature on a different message $m_{sighash}$ so to change the message we just use a different sighash flag than the original one (for example SIGHASH_NONE instead of SIGHASH_ALL which is the default flag). Also, sig' must use a different value of r so that it does not leak the private key (since the private key can be derived from two signatures which use the same ephemeral key). Finally, the transaction would need to include another OP_CHECKSIG at the end as shown below.

| TxID | |
| --- | --- |
| Inputs | Outputs |
| Any spending inputs | OP_DUP OP_3 OP_SPLIT OP_NIP OP_1 OP_SPLIT OP_SWAP OP_SPLIT OP_DROP ⟨r⟩ OP_EQUALVERIFY OP_OVER OP_CHECKSIGVERIFY OP_CHECKSIG |

This must use the same public key P as the r-puzzle, so that only someone who knows the private key V to the public key P can create another signature, and the attack above is then not possible.

The attacker is trying to replace the public key with another public key to which the attacker has no knowledge of the private key. To prevent this attack, the challenge also asks for the knowledge of the private key. In this case, one signature is not enough. Therefore, two signatures are required. Both signatures are considered as a proof of the knowledge of the same private key. This is secure as the challenge insists that they will have different ephemeral keys.

P2PKH+P2PRPH

The same way the R-Puzzle is used as a knowledge proof, a P2PKH output is also a knowledge proof of knowledge of the private key which corresponds to the public key in the P2PKH output. This is done by essentially replacing the puzzle k with the private key $V_{puzzle}$ that maps to the public key $P_{puzzle}=V_{puzzle} \cdot G$ in the P2PKH output. In embodiments of the r-puzzle, the knowledge proof is accompanied by a public key that can be chosen by the prover and can be used to link to an identity. In a P2PKH, the usual spending signature and public key (which prove knowledge of the secret puzzle) must be accompanied by another signature and public key to link to a specific identity. Trivially, the prover could add another signature and public key to the P2PKH unlocking which corresponds to another OP_CHECKSIG to the locking script as shown below.

| TxID | |
| --- | --- |
| Inputs | Outputs |
| Any spending inputs | OP_DUP OP_HASH160 ⟨H($P_{puzzle}$)⟩ OP_EQUALVERIFY OP_CHECKSIGVERIFY OP_CHECKSIG |

The corresponding unlocking script is shown below:

⟨sig $P_{ID}$⟩ ⟨$P_{ID}$⟩ ⟨sig $P_{puzzle}$⟩ ⟨$P_{puzzle}$⟩

Note that there is no cryptographic link between ⟨sig$P_{ID}$⟩ ⟨$P_{ID}$⟩ and the puzzle or even the transaction. A miner and anyone can actually replace them with another signature on another public key, a bit similar to the way miner can intercept an open hash puzzle. A miner or interceptor cannot change the message to send the funds to themselves (as with the open hash puzzle case). However there is nothing to stop them from replacing ⟨sig$P_{ID}$⟩ ⟨$P_{ID}$⟩ with their own to make it look like it were linked with their own identity.

Based on techniques disclosed herein on the other hand, it is possible to use both P2PKH and P2RPH together in the same script to force a cryptographic link on the second signature so that it cannot be intercepted and replaced as with the case above.

| TxID | |
|---|---|
| Inputs | Outputs |
| Any spending inputs | OP_DUP OP_HASH160 ⟨H($P_{puzzle}$)⟩ OP_EQUALVERIFY OP_CHECKSIGVERIFY OP_DUP OP_3 OP_SPLIT OP_NIP OP_1 OP_SPLIT OP_SWAP OP_SPLIT OP_DROP OP_HASH160 ⟨H($r_{puzzle}$)⟩ OP_EQUALVERIFY OP_SWAP OP_CHECKSIG |

In the locking script, $P_{puzzle}=V_{puzzle} \cdot G$ while $r=[R]_x=[V_{puzzle} \cdot G]_x$ so that they are fundamentally equivalent. They will not actually be equal since the public key can either be compressed or uncompressed, and either way it will be prepended by a prefix. It would also be possible to explicitly add the prefix to the script when extracting the r value from the signature to make ⟨H($P_{puzzle}$)⟩=⟨H($r_{puzzle}$)⟩ as seen below. However, this doesn't really achieve much benefit.

| TxID | |
|---|---|
| Inputs | Outputs |
| Any spending inputs | OP_DUP OP_HASH160 ⟨H($P_{puzzle}$)⟩ OP_EQUALVERIFY OP_CHECKSIGVERIFY OP_DUP OP_3 OP_SPLIT OP_NIP OP_1 OP_SPLIT OP_SWAP OP_SPLIT OP_DROP OP_PUSHDATA1 (r – prefix) OP_SWAP OP_CAT OP_HASH160 ⟨H($r_{puzzle}$)⟩ OP_EQUALVERIFY OP_SWAP OP_CHECKSIG |

(Note that where H( . . . ) is referred to in triangular brackets < > in the schematic representation of the locking script, this is actually intended to refer to the value of the hash, not the hash function. The triangular brackets < > mean place this value on the stack.)

The corresponding unlocking script for both transactions is shown below:

⟨$P_{ID}$⟩ ⟨$r_{puzzle}, s$⟩ ⟨sig $P_{puzzle}$⟩ ⟨$P_{puzzle}$⟩

Alternative Implementation in an Account-Based Model

Figure 11:
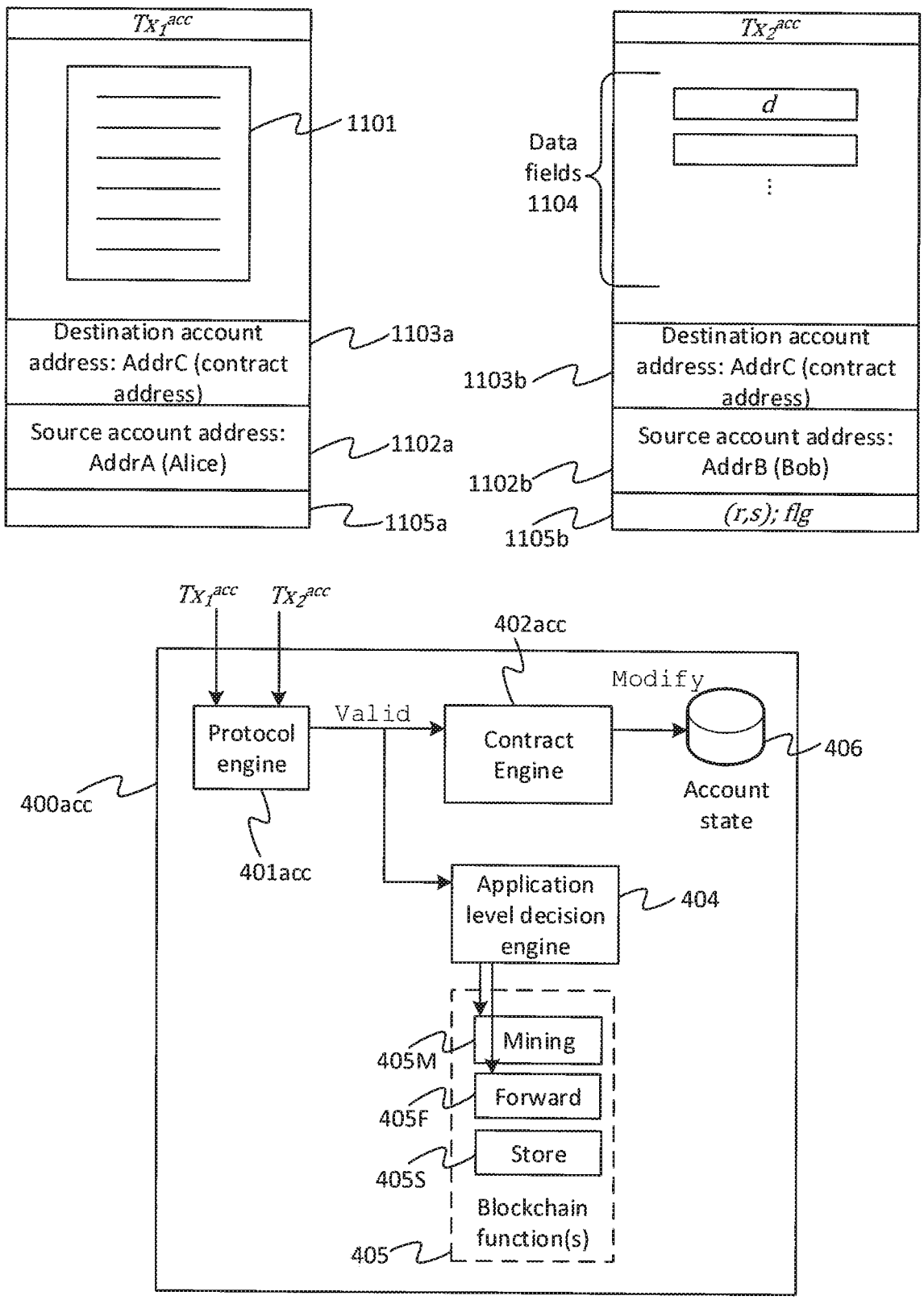
FIG. 11 is a schematic block diagram of a piece of node software for processing transactions in accordance with a node protocol of an account-based model, FIG. 12 schematically illustrates an example format for an ECDSA signature.

The above has largely been described in terms of an implementation in an output-based model (e.g. UTXO-based model). However it will be appreciated this is not limiting. FIG. 11 illustrates a possible alternative implementation using an account-based model.

In short, in an account-based model, the r-puzzle functionality can be included in a smart contract function which is called by the users. One party can set the r-puzzle value (or hashed r-puzzle value) in the smart contract and then the other party would then provide the signature to the smart contract afterwards.

In a UTXO blockchain architecture, the requirements embodied in the unlocking script of a first transaction must be fulfilled by the locking script of a second transaction in order for the second transaction to be accepted as valid and recorded in the blockchain. In the present context, this is beneficial as it leverages the work which has already been done by miners as part of the transaction validation process. As a concrete example in the present context, the fact that a transaction has been added to the blockchain implies that it has been verified by nodes throughout the blockchain network, which in turn implies that its locking script fulfils some specific useful requirements. An interested party does not need to check for themselves whether those requirements are satisfied—they can simply assume those requirements to be satisfied by virtue of the fact that the transaction has been recoded successfully in the blockchain. This stems from the fact that the script must return a result of "true" on completion in order for the transaction to be valid (there may be other requirements for the transaction to be valid), and if the script returns a result of "false" (which, according to the terminology used herein, includes the case where the script fails e.g. because an OP_VERIFY opcode terminates the script), the transaction is invalid.

However, in other blockchain models (e.g. certain account-based architectures), this interdependency between transaction validity and the result of running transaction code is not necessarily mirrored. For example, in certain smart contract blockchains, transactions may be valid and thus accepted for recordal on the blockchain provided they meet a set of "basic" validity requirements imposed by the blockchain protocol. Hence the second transaction may still be accepted as valid and recorded in the blockchain even if it does not satisfy some requirement embodied in the code of the first transaction. The code of the first transaction may for example be smart contract code.

Assuming the second transaction is addressed to a smart contract account created by the first transaction, it is then down to the smart contract code to determine how to respond to that transaction—it could for example ignore it (or otherwise return a result of false) if some requirement is not met, whereas if that requirement is correct, it can reward the prover with a quantity of digital asset deducted from the balance of the smart contract account and credited (or otherwise return a result of true). In a sense, this abstracts "agent-level" processing by smart contracts (agents), i.e. coded explicitly in smart contract code, from "protocol-level" processing performed "implicitly" by nodes i.e. processing that is performed on a transaction determine whether it meets the requirements of validity imposed by a blockchain protocol on which the blockchain network operates. Hence, in such blockchain architectures, a "valid/invalid" decision by a node at the protocol level in respective of a transaction may be decoupled from a "true/false" result returned in respect of that transaction at the agent level by a smart contract, in that a transaction may be determined to be valid at the protocol level but nonetheless return a result of false at the agent level.

This is in contrast to a UTXO architecture, in which the script returning a result of "true" is required for the transaction to be valid; the transaction is invalid if the script terminates or completes leaving anything other than true on the stack (either of those outcomes constitutes a result of "false" as that term is used herein).

One of the basic requirements for transaction validity may be that the transaction includes a valid signature. Hence, whilst in the above UTXO examples, a signature is verified by the code of a challenge transaction itself (e.g. using a OP_CHECKSIG opcode which verified the signature and returns true/false for the signature verification or an OP_CHECKSIGVERIFY opcode which checks the signature in the same way and additionally verifies the result is true, with the script terminating if it is not), in alternative blockchain architectures the signature may be verified by the processing node implicitly in the above sense, which may avoid the need to code the signature check in the transaction code itself.

As a concrete example in the present context, a transaction may be deemed valid at the protocol level e.g. because it comprises a valid signature, but still return a result of false at the application-level e.g. because some other requirement is not satisfied.

FIG. 11 shows an alternative of the node software 400 for processing transactions in accordance with an account-based model, the node software being labelled here 400acc. An instance of this node software 400acc may be implemented at each of the nodes 104 of an account-based version of the network 106. The account-based node software 400acc comprises an account-based protocol engine 401acc, a contract engine 402acc (somewhat analogous to the script engine 402), an application-level decision engine 404, and a set of one or more blockchain-related functional modules 405. At any given node 104, these may include any one, two or all three of: a mining module 405M, a forwarding module 405F and a storing module 405S (depending on the role or roles of the node). The protocol engine 401acc is configured to recognize the different fields of a transaction and process them in accordance with the node protocol. The node software 400acc also maintains an account state 406 of each of a plurality of accounts in memory of the respective node 104. These could for example include the accounts of Alice, the prover (e.g. Bob), and/or another party to be debited or credited depending on the contract to be enacted between Alice and the prover. The contract engine 402acc is arranged to modify the account state depending on the outcome of a smart contract received in a transaction. Smart contracts are also referred to as "agents".

FIG. 11 also shows a pair of transactions $Tx_1^{acc}$ and $Tx_2^{acc}$ which may implement the same or similar r-puzzle functionality as described above in relation to FIGS. 7 to 10. Each comprises a source account address 1102 (in a source address field) and a destination account address 1103 (in a destination address field). The first transaction $Tx_1^{acc}$ comprises a source account address 1102a and a destination account address 1103a. The second transaction $Tx_2^{acc}$ comprises a source account address 1102b and a destination account address 1103b. The first transaction $Tx_1^{acc}$ also comprises a smart contract 1101. The smart contract 1101 may include a challenge (puzzle) by Alice. It may be created by Alice or by a third party on behalf of Alice using details provided by Alice. The second transaction $Tx_2^{acc}$ may optionally comprises one or more free data fields 1104 for carrying user-specified payload data. This/these may comprise at least part of the solution to the puzzle provided by the prover, e.g. Bob. The transactions $Tx_1^{acc}$ and $Tx_2^{acc}$ are also signed by Alice and the prover respectively. Each transaction also comprises a signature 1105a, 1105b of the respective party.

The transactions are broadcast over the network 106. When the protocol engine 401acc receives each transaction it implicitly verifies whether or not the signature 1105 is valid. I.e. this is an inherent feature of the protocol engine 401acc and does not need to be specified in the smart contract 1101. The protocol engine 401acc thus validates each transaction for forwarding and/or mining at least on condition that the respective signature is valid. It may also require one or more additional conditions for validity to be met. If valid, the application-level decision engine 404 can select whether to control the mining module 405M and/or forwarding module 405F to mine and/or forward the transaction respectively.

In such an account-based model, Alice, Bob and the smart contract itself are assigned separate accounts, with different account addresses. A transaction is said to be sent "to" the address in its destination address field, "from" the address in its source address field. In order to create an account for a smart contract, a transaction containing bytecode for the smart contract is uploaded to the blockchain in a transaction. For such an account-creating transaction, the destination address 1103 in the destination field should be an address which has never been used before in the blockchain, and once the transaction has been accepted, that address becomes the address of the newly-created smart contract account. Thereafter, a further transaction can be sent to that address in order to "call" the smart contract, i.e. cause the bytecode of the smart contract to be run in dependence on the further transaction. The "destination" address 1103 acts as an intermediary address for enacting the contract—Alice sends $TX_1^{acc}$ to that address to create the smart contract which specifies one or more requirements; Bob sends $TX_2^{acc}$ to that same address in order to call the smart contract, which in turn causes the smart contract to verify whether or not $TX_2^{acc}$ satisfies those specified requirements. The "source" address 1102 specifies an account of a user that is party to the contract—in the case that the smart contract determines that $TX_2^{acc}$ does meet the specified requirements, the smart contract can be configured to deduct an amount of digital asset from its own account balance, and cause the balance of the account having the source address 1102b in $Tx_2^{acc}$ (i.e. Bob's account) to be credited by that amount (intuitively, by sending $TX_2^{acc}$, Bob effectively asks the smart contract (as identified in the destination address field) to credit his account (as identified in the source address field).

When the protocol engine 401 acc receives $X_2^{acc}$, then on condition that it is valid, it will look for an account which matches the destination address 1103b in $TX_2^{acc}$. Assuming $Tx_1^{acc}$ has been processed and is valid, that account will exist by virtue of $TX_1^{acc}$ and will be associated with the smart contract code provided in $TX_1$. In response, the protocol engine 401acc controls the contract engine 402acc to run the smart contract 1101 from $Tx_1^{acc}$, taking data from one or more fields of the smart contract as operand data, depending on what criteria are defined in the contract. The operand data may for example comprise the data from one or more of the free data fields 1104, and/or the signature from the signature field 1105b. On condition that the operand data from $Tx_2^{acc}$ meets the one or more criteria defined in the smart contract 1101 of $Tx_1^{acc}$, then the contract engine 402acc modifies the account state 406 of one or more parties (Alice, the prover and/or one or more third parties) in accordance with a modification defined in the smart contract 1101. Otherwise this modification to the account state 406 is not made. Note however that in some account-based systems, the outcome of the smart contract is not a condition for validity of transactions. Hence if $Tx_2^{acc}$ fails to meet the criteria set in the smart contract 1101 of $Tx_1^{acc}$, then $Tx_2^{acc}$ will still be propagated and mined into a block as a record of the failed transaction. It may also still effect a mining fee (hence the protocol engine 401 may still modify the account state 406 of one of the parties and the winning miner).

To implement an r-puzzle, at least some of the r-puzzle functionality can be coded into the smart contract 1101 of $Tx_1^{acc}$, and the solution can be presented in one or more of the data fields 1104 of $Tx_2^{acc}$. For example this could be used to implement the variant of FIG. 7. Optionally, some of the implicit signature verification functionality of the protocol engine 401acc could be exploited, e.g. to implement the one of the variants of FIGS. 8 to 10. In the case of FIGS. 8-10, steps II) and III) may be implicit functions of the protocol engine 401acc when it verifies the signature of $Tx_2^{acc}$ (remember that signature verification per se is an inherent feature of the node protocol implemented by the protocol engine 401acc). Hence it is only required to layer step I) on top of this in the smart contract 1101 of $Tx_1^{acc}$. The smart contract checks whether the outcome of I) is true and whether the protocol engine 401ac indicates that $Tx_2^{acc}$ is valid. If yes to both, then it declares an overall result of "true" for the verification, i.e. Bob has successfully met the challenge set by the r-puzzle. Note that of implementations of FIGS. 8-10, only the data value d in the cases of FIGS. 9 and 10 needs to be included in a free data field 1104. The signature information is included in the signature field 1105b.

A smart contract account also has indexed "data registers" (not shown) which are (logical) data storage elements associated with the account. In the above-outlined UTXO model, values are embedded in the locking script itself, and the same may be true of a particular piece of smart contract code 1101. However, smart contract bytecode of a smart contract may alternatively or additionally be run on data stored in one or more of its account registers. Moreover, it is generally possible to store values in the smart contract account registers after the smart contract account has been created. So, for example, a smart contract account may be created by a challenge transaction $Tx_{1,\alpha}^{acc}$ which contains the smart contract bytecode. A separate "intermediate" transaction $Tx_{1,\beta}^{acc}$ may then be sent to the (now existent) smart contract account, which has the effect of storing a particular value v in a register $R of the smart contract account. The smart contract may be configured to only accept such data from a specified source account address (for example), e.g. the same party who created the smart contract in the first place (Alice). When $Tx_2^{acc}$ is received, the operations performed by the contract engine 402acc (e.g. "access register $R and compare the value to the value in data field $D of $Tx_2^{acc}$") are defined by the smart contract bytecode provided in the challenge transaction $Tx_{1,\alpha}^{acc}$; but the value stored in $R has been set by the intermediate transaction $Tx_{1,\beta}^{acc}$. According to the terminology used herein, $Tx_{1,\alpha}^{acc}$ is still said to be a challenge transaction which sets one or more requirements, only now those requirements may be defined with reference to data provided in one or more intermediate transactions (e.g. $Tx_{1,\beta}^{acc}$).

Thus, in some implementations, the challenge transaction $Tx_{1,\alpha}^{acc}$ may define the operations of the r-puzzle (e.g. compare the r-part of the signature of the proof transaction $Tx_2^{acc}$ with the value in register $R to see if they match etc.) but the value in $R that is compared to the r-part of the proof transaction $Tx_2^{acc}$ may have been set by the intermediate transaction $Tx_{1,\beta}^{acc}$.

Note also: some account-based models do not require the public key P to be included with the signature 1105. Instead the simply include a 1-bit flag, flg. As mentioned, it is possible to derive two possible keys P and −P from (r, s) and the message. The flag flg is used to signal which of these two possible solutions is in fact the public key corresponding to the private key V used by the prover to sign the message in $Tx_2^{acc}$. The protocol engine 401acc this uses (r, s) and flg to derive the prover's public key P instead of receiving it explicitly in $Tx_2^{acc}$. This technique would also be possible in output-based models and is not specific to account-based models, but in the scripting languages used in many current output-based models there happens to be no dedicated opcode for deriving P from r and s, so it would be complex to code this functionality explicitly into the unlocking script using existing, general-purpose opcodes of stack-based language. It is further noted that, certain account-based models derive the source address of the transaction from the public key used to sign that transaction. Hence, the source address is not necessarily encoded separately in the transaction, and in the case that the public key is derived from the signature, this means that the source address may also be indirectly derived from the signature.

CONCLUSION

It will be appreciated that the above embodiments have been described by way of example only.

More generally, according to a first instantiation of the teachings disclosed herein, there is provided a computer-implemented method comprising, at a verifying nodes of a blockchain network: obtaining a first transaction which comprises runnable code; receiving a second transaction which includes information comprising at least a submitted instance of an r-part and an s-part of a first ECDSA signature, and further comprising a nonce; and running the code from the first transaction. The code is configured to verify that $H_{PoW}(f(r, d))$ meets a predetermined condition defined in the code, and to return a result of true on condition thereof, where r is the submitted instance of the r-part, d is the nonce, $H_{PoW}$ is a hash function, and f is a function combining r and d.

In embodiments, according to a second, optional instantiation of the presently disclosed teachings, there may be provided a method according to the first instantiation wherein: $f$ is a concatenation r∥d.

According to a third, optional instantiation of the present disclosure, there may be provided a method according to the second instantiation, wherein: said predetermined condition is that $H_{puz}(r||d)$ is less than a predetermined target value, or that it has at least a predetermined minimum number of leading zeros.

According to a fourth, optional instantiation of the present disclosure, there may be provided a method according to the first, second or third instantiation, comprising: obtaining a public key wherein the first ECDSA signature signs a message based on a private key corresponding to the public key, the message being a part of the second transaction; and applying an ECDSA verification function to verify the first ECDSA signature received in the second transaction based on the public key and the message, wherein the code is configured to return the result of true on further condition of said verification of the first ECDSA signature.

In an output-based model (e.g. UTXO-based model), the ECDSA verification function may be invoked by an opcode in a locking script of an output (e.g. UTXO) of the first transaction. The opcode may invoke an instance of the ECDSA verification function pre-stored on the verifying node. Alternatively, such as in an account-based model, the ECDSA verification function may be an implicit function of the node, which is run automatically as part of the node protocol, rather than needing to be explicitly invoked by the code in the first transaction (which in the account-based case may be a smart contract). As another alternative it is not excluded that the ECDSA verification could be explicitly coded into the code.

According to a fifth, optional instantiation, there may be provided a method according to the fourth instantiation wherein: the code further comprises a reference value corresponding to the r-part of the first ECDSA signature, the reference value being a reference instance of the r-part or a transformation thereof; and the code is configured to check that the reference value corresponds to the reference instance of the r-part received in the second transaction, and return the result of true on further condition thereof.

According to a sixth, optional instantiation, there may be provided a method according to the fifth instantiation wherein: said reference value is a reference instance of the r-part of the ECDSA signature.

According to a seventh, optional instantiation, there may be provided a method according to the sixth instantiation, wherein the code is configured to perform:

check that $H_{PoW}(f(r, d))$ meets the predetermined condition, and said ECDSA verification function performs:

compute $R'=H_{sig}(m)s^{-1} \cdot G + r's^{-1} \cdot P$, and check that $[R']_x = r'$, where r' is the reference instance of the r-part of the first ECDSA signature, s is the s-part of the first ECDSA signature, P is the first public key, m is the part of the second transaction signed by the first ECDSA signature, $H_{sig}$ is a hash function that was used to hash m in generating the first ECDSA signature, G is an elliptic generator point, $[R']_x$ denotes an x-coordinate of R', and "·" denotes an elliptic curve scalar multiplication. In this case the code is configured to return the result of true on condition that both said checks are true, but to return a result of false otherwise.

$H_{PoW}$ is the hash function used in the hash puzzle. $H_{sig}$ is the hash function used in the ECDSA signature and verification. $H_{PoW}$ and $H_{sig}$ may or may not be the same form of hash function.

According to an eighth, optional instantiation, there may be provided a method according to the sixth instantiation, wherein the code is configured to perform:

check that $H_{PoW}(f(r,d))$ meets the predetermined condition, and check that $r'=r$, and wherein the ECDSA verification function performs:

compute $R'=H_{sig}(m)s^{-1} \cdot G + rs^{-1} \cdot P$, and check that $[R']_x = r$, where r is the submitted instance of the r-part of the first ECDSA signature, r' is the reference instance of the r-part of the first ECDSA signature, s is the s-part of the first ECDSA signature, P is the first public key, m is the part of the second transaction signed by the first ECC signature, $H_{sig}$ is a hash function that was used to hash m in generating the first ECDSA signature, G is an elliptic generator point, $[R']_x$ denotes an x-coordinate of R', and "·" denotes an elliptic curve scalar multiplication. In this case the code is configured to return the result of true on condition that all three of said checks are true, but to return the result of false otherwise.

According to a ninth, optional instantiation, there may be provided a method according to the fifth instantiation, wherein: said reference value is a transformation of a reference instance of the r-part of the first ECDSA signature, the code being configured to perform said check that the submitted instance corresponds to the reference value by: performing the same transformation on the submitted instance and comparing to the reference value.

According to a tenth, optional instantiation, there may be provided a method according to the ninth instantiation, wherein: said reference value is a hash value, being a hash of the reference instance of the r-part of the first ECDSA signature.

According to an eleventh, optional instantiation, there may be provided a method according to the tenth instantiation, wherein the code is configured to perform:

check that $H_{PoW}(f(r,d))$ meets the predetermined condition, and check that $h=H_{puz}(r)$, and wherein the ECDSA verification function performs:

compute $R'=H_{sig}(m)s^{-1} \cdot G + rs^{-1} \cdot P$, and check that $[R']_x = r$, where r' is the reference instance of the r-part of the first ECDSA signature, r is the submitted instance of the r-part of the first ECDSA signature, s is the s-part of the first ECDSA signature, h is the hash value, $H_{puz}$ is the hash function that was used to hash r' to generate h, P is the first public key, m is the part of the second transaction signed by the first ECC signature, $H_{sig}$ is a hash function that was used to hash m in generating the first ECDSA signature, G is an elliptic generator point, $[R']_x$ denotes an x-coordinate of and "·" denotes an elliptic curve scalar multiplication. In this case the code is configured to return the result of true on condition that all three of said checks are true, but to return a result of false otherwise.

$H_{puz}$ is the hash function used in the hash puzzle. $H_{puz}$ may or may not be the same form of hash function as $H_{sig}$ and/or $H_{PoW}$.

According to a twelfth, optional instantiation, there may be provided a method according to any of the first to eleventh instantiations, wherein: said obtaining of the first public key comprises receiving the first public key as part of the information in the second transaction.

Alternatively, the information in the second transaction comprises both the s-part and a submitted instance of the r-part of the first ECDSA signature, and said obtaining comprises deriving the first public key from a combination of the s-part and submitted instance of the r-part of the first ECDSA signature.

As another alternative it is not excluded that the obtaining could comprise, for example, receiving the first public key over a side channel in association with the second transaction; or receiving, in the second transaction or over the side channel, an index of the first public key or an identity of an owner of the first public and private keys and using this to look up the first public key.

According to a thirteenth, optional instantiation, there may be provided a method according to any of the first to twelfth instantiations, wherein: the submitted instance of the r-part and s-part of the first ECDSA were generated by a second party using: an ephemeral key given to the second party by a first party or vice versa, and the first private key which is a private key of the second party; and the nonce was also generated by the second party by performing a proof-of-work on computer equipment of the second party.

According to a fourteenth, optional instantiation, there may be provided a method according to the thirteenth instantiation, wherein: $P=V \cdot G$, $k \in [1, n-1]$, $R=k \cdot G$, $r=[R]_x$, and $s=k^{-1}(H_{sig}(m)+rV) \bmod n$, where P is the first public key, V is the first private key, k is the ephemeral key, G is an elliptic generator point, n is a prime modulus (the prime order of the generator point), m is the part of the second transaction signed by the first ECDSA signature, $H_{sig}$ is a hash function that was used to hash m in generating the first ECDSA signature, $[R]_x$ denotes an x-coordinate of R, and "·" denotes an elliptic curve scalar multiplication.

According to a fifteenth, optional instantiation, there may be provided a method according to the thirteenth or fourteenth instantiation, wherein: said receiving of the second transaction comprises receiving the second transaction from the second party.

According to a sixteenth, optional instantiation, there may be provided a method according to any of the thirteenth to fifteenth instantiations, comprising: triggering a service for the first party on condition of the result returned by said code being true.

For instance, the service may have been commissioned by the first party, may be performed on behalf of the first party, and/or or may be performed for the benefit of the first party. The service may be a computerized service and said triggering may comprise automatically triggering the service.

By giving the ephemeral key to the second party ("Bob"), this enables the first party ("Alice") to let Bob sign for the service on her behalf, but without Bob having to reveal the ephemeral key k to the node or have it published on the blockchain. Further, because the process is not tied to any particular private key (or its corresponding public key), this means Alice could also give a copy of the ephemeral key to a third party ("Charlie") and then either of Bob and Charlie can successfully sign for the service. This is possible because the r-part is used as the basis of the challenge, and r-part is not mapped to any particular identity.

According to a seventeenth, optional instantiation, there may be provided a method according to any of the thirteenth to sixteenth instantiations, wherein: the information received in the second transaction comprises a further cryptographic signature of the second party signing a part of the second transaction using a further private key of the second party, the further private key corresponding to a further public key.

The further signature could be an ECC signature or another type, e.g. an RSA signature.

According to an eighteenth, optional instantiation, there may be provided a method according to the seventeenth instantiation, wherein a mapping is available enabling the first party and/or a third party to look-up of an identity of the second party based on the further public key.

E.g. the identity may be a personal name, company name, username or network address of the second party. The third party could be a provider of the afore-mentioned service for example.

According to a nineteenth, optional instantiation, there may be provided a method according to the seventeenth or eighteenth instantiation, wherein: the code is configured to verify the further cryptographic signature using the further public key and return the result of true on further condition that the further cryptographic signature is verified.

According to a twentieth, optional instantiation, there may be provided a method according to any of the seventeenth to nineteenth instantiations, wherein: the information received in the second transaction further comprises a cryptographic signature of the first party signing a part of the second transaction using a private key of the first party.

In embodiments the method may comprise obtaining a public key corresponding to the private key of the first party, wherein the code is configure to verify the cryptographic signature of the second party and return the result of true on further condition that the cryptographic signature of the first party.

In embodiments, a mapping may be available enabling the second party and/or a third party to look-up of an identity of the first party based on the public key of the first party. E.g. the identity of the first party may be a personal name, company name, username or network address of the first party.

According to a twenty-first, optional instantiation, there may be provided a method according to any of the thirteenth to twentieth instantiations, wherein: the information received in the second transaction comprises an additional ECDSA signature having a different value of the r-part than the first ECDSA signature but using the same, first private key as the first ECDSA signature; and the code is configured to verify the additional ECDSA signature using the first public key, and return the result of true on further condition that the additional ECDSA signature is verified.

In embodiments the additional ECDSA signature may sign a different part of the second transaction than the first ECDSA signature.

According to a twenty-second, optional instantiation, there may be provided a method according to any of the first to twenty-first instantiations, wherein: each of the transactions comprises a data structure comprising one or more inputs and one or more outputs, wherein each output comprises a locking script, and each input comprises an unlocking script and a pointer to an output of another transaction; said code is comprised by the locking script of the first transaction, wherein said information received in the second transaction is comprised by the unlocking script in an input of the second transaction, and wherein the pointer in said input of the second transaction points to said output of the first transaction; and the method comprises validating the transaction at least on condition that the code returns said result of true, and in response to said validation, at least one of: including the second transaction in a pool of transactions for mining into one or more blocks by said verifying node, and/or forwarding the second transaction to at least one other of nodes of the blockchain network.

For each of a plurality of transactions including the first and second transactions, at least some of the nodes of the network are configured to propagate each transaction on condition of the transaction being valid, and at least some nodes of the nodes of the network are configured to record each transaction in a copy of at least part of the blockchain on condition of the transaction being valid. The validity of the second transaction is conditional on at least the code returning the result of true.

According to a twenty-third, optional instantiation, there may be provided a method according to any of the first to twenty-first instantiations, wherein: the transactions are configured according to an account-based model, and said code is comprised by a smart contract included in the first transaction.

In embodiments, in either model, the verifying node may be a mining node, a forwarding node, and/or a storage node storing at least part of the blockchain (e.g. a full-copy storage node storing a full copy of the blockchain). In embodiments, said obtaining of the first transaction may comprise receiving at least part of the first transaction from a first party, e.g. the afore-mentioned first party. In embodiments, said obtaining of the first transaction may comprise receiving the first transaction from the first party. Alternatively, in embodiments, said obtaining of the first transaction may comprise formulating the first transaction at the verifying node. In embodiments, said obtaining of the first transaction may comprise receiving at least the reference instance of the r-part from the first party and formulating into the first transaction at said one of the nodes. In embodiments, said obtaining of the first transaction may comprise formulating the first transaction including generating the r-part at the verifying node.

In embodiments, said receiving of the second transaction may comprise receiving the second transaction from a second party, e.g. the afore-mentioned second party. In embodiments, the second transaction was generated at least in part by the second party. In embodiments the second transaction was generated by the second party. In embodiments, said receiving of the second transaction may comprise receiving the second transaction from the second party, either directly or via the first party or a third party. In embodiments, the second transaction was generated by a third party based on at least the s-part of the first ECDSA signature (and in embodiments the submitted instance of the r-part of the first ECDSA signature and/or the data element) being provided to the third party by the second party.

According to a twenty-fourth instantiation of the teachings disclosed herein, there may be provided a computer program embodied on computer-readable storage and configured so as when run on a node of the network to perform the method of any of the first to twenty-third instantiations.

According to a twenty-fifth instantiation of the teachings disclosed herein, there is provided a node of the network, comprising: memory comprising one or more memory units, and processing apparatus comprising one or more processing units; wherein the memory stores code arranged to run on the processing apparatus, the code being configured so as when on the processing apparatus to carry out the method of any of the first to twenty-third instantiations.

According to a twenty-sixth instantiation of the teachings disclosed herein, there is provided a computer-implemented method comprising, at computer equipment of a second party: observing a first transaction which comprises runnable code, the code being configured to verify that $H_{PoW}(f(r, d))$ meets a predetermined condition defined in the code, and to return a result of true on condition thereof, where r is an r-part for an ECDSA signature, d is the nonce, $H_{PoW}$ is a hash function, and f is a function combining r and d, the r-part being specified by a first party; generating the r-part based on an ephemeral key; searching for a value of the nonce d such that $H_{PoW}(f(r, d))$ meets the predetermined condition; formulating a second transaction linked to the first transaction, the second transaction including information comprising at least the r-part and an s-part of a first ECDSA signature, and further comprising the nonce d; and sending the second transaction to be propagated over a blockchain network for recordal in a blockchain.

In embodiments, the method performed at the equipment of the second party may further comprise corresponding to any of the instantiations or other features disclosed herein.

According to a twenty-seventh instantiation of the teachings disclosed herein, there is provided set of transactions for recordal in a blockchain, the set comprising, embodied on a computer-readable medium or media: a first transaction which comprises runnable code; and a second transaction which includes information comprising at least a submitted instance of an r-part and an s-part of a first ECDSA signature, and further comprising a nonce; wherein the code is configured to verify that $H_{PoW}(f(r, d))$ meets a predetermined condition defined in the code, and to return a result of true on condition thereof, where r is the submitted instance of the r-part, d is the nonce, $H_{PoW}$ is a hash function, and f is a function combining r and d.

In embodiments, the first and second transactions may be further configured in accordance with any instantiation or other features disclosed herein.

According to a twenty-eighth instantiation of the teachings disclosed herein, there may be provided computer-implemented method comprising, at a verifying node of a blockchain network: obtaining a first transaction which comprises runnable code; receiving a second transaction which includes information comprising at least a first part and a nonce; and running the code from the first transaction, the code being configured to verify that $H_{PoW}(f(q,d))$ meets a predetermined condition defined in the code, and to return a result of true on condition thereof, where q is the first part, d is the nonce, $H_{PoW}$ is a hash function, and f is a function combining q and d.

Any feature disclosed herein in relation to the r-puzzled based proof-of-work may be generalized to any such "layer-2" proof-of-work.

The first part q could be any predetermined portion of data. It could be any part of the second transaction excluding the nonce.

In embodiments, any features disclosed in connection with the r-puzzle PoW puzzle may also be applied in relation to this more general PoW puzzle. For instance in embodiments f is a concatenation q||d. In embodiments said predetermined condition may be that $H_{puz}(q||d)$ is less than a predetermined target value, or that it has at least a predetermined minimum number of leading zeros.

In embodiments the information received in the second transaction may further comprise a cryptographic signature. The method may comprise: obtaining a public key wherein the cryptographic signature signs a message based on a private key corresponding to the public key, the message being a part of the second transaction. The method may comprise applying a verification function to verify the cryptographic signature received in the second transaction based on the public key and the message, wherein the code is configured to return the result of true on further condition of said verification of the cryptographic signature. In embodiments the public key may be mapped to an identity of a prover. This may be used by a first party to look up the identity of the prover.

According to further instantiations, there may be provided a program, a method performed at the equipment of the second party, or a set of transactions, corresponding to the twenty-eight instantiation.

Other variants or use cases of the disclosed techniques may become apparent to the person skilled in the art once given the disclosure herein. The scope of the disclosure is not limited by the described embodiments but only by the accompanying claims.

The invention claimed is:

1. A computer-implemented method comprising, at a verifying node of a blockchain network:

obtaining a first transaction which comprises runnable code;

receiving a second transaction which includes information comprising at least a submitted instance of an r-part and an s-part of a first Elliptic Curve Digital Signature Algorithm (ECDSA) signature, and further comprising a nonce;

running the code from the first transaction, wherein the code is configured to verify that $H_{PoW}(f(r,d))$ meets a predetermined condition defined in the code, wherein said predetermined condition is that $H_{PoW}(f(r,d))$ is less than or greater than a predetermined target value, is within a predetermined range, or has a predetermined minimum number of leading zeros, and to return a result of true on condition of said verifying that $H_{PoW}(f(r,d))$ meets the predetermined condition defined in the code, where r is the submitted instance of the r-part, d is the nonce, $H_{PoW}$ is a hash function, and f is a function combining r and d.

2. The method of claim 1, wherein f is a concatenation r∥d.

3. The method of claim 1, further comprising:

obtaining a public key wherein the first ECDSA signature signs a message based on a private key corresponding to the public key, wherein the message is a part of the second transaction; and applying an ECDSA verification function to verify the first ECDSA signature received in the second transaction based on the public key and the message, wherein the code is configured to return the result of true on further condition of said verification of the first ECDSA signature.

4. The method of any of claim 3, wherein the code further comprises a reference value corresponding to the r-part of the first ECDSA signature, wherein the reference value is a reference instance of the r-part or a transformation of the r-part; and the code is configured to check that the reference value corresponds to the reference instance of the r-part received in the second transaction, and return the result of true on further condition that the reference value corresponds to the reference instance of the r-part received in the second transaction based on said check.

5. The method of claim 4, wherein said reference value is a reference instance of the r-part of the ECDSA signature.

6. The method of claim 5, wherein the code is configured to perform:

check that $H_{PoW}(f(r,d))$ meets the predetermined condition, and said ECDSA verification function performs:

compute $R'=H_{sig}(m)s^{-1} \cdot G + r' s^{-1} \cdot P$, and check that $[R']_x = r'$, where r' is the reference instance of the r-part of the first ECDSA signature, s is the s-part of the first ECDSA signature, P is the first public key, m is the part of the second transaction signed by the first ECDSA signature, $H_{sig}$ is a hash function that was used to hash m in generating the first ECDSA signature, G is an elliptic generator point, $[R']_x$ denotes an x-coordinate of R', and "·" denotes an elliptic curve scalar multiplication; and wherein the code is configured to return the result of true on condition that both said checks are true, but to return a result of false otherwise.

7. The method of claim 6, wherein the code is configured to perform:

check that $H_{PoW}(f(r,d))$ meets the predetermined condition, and check that r'=r, and wherein the ECDSA verification function performs:

compute $R'=H_{sig}(m)s^{-1} \cdot G + r s^{-1} \cdot P$, and check that $[R']_x = r$, where r is the submitted instance of the r-part of the first ECDSA signature, r' is the reference instance of the r-part of the first ECDSA signature, s is the s-part of the first ECDSA signature, P is the first public key, m is the part of the second transaction signed by a first ECC signature, $H_{sig}$ is a hash function that was used to hash m in generating the first ECDSA signature, G is an elliptic generator point, $[R']_x$ denotes an x-coordinate of R', and "·" denotes an elliptic curve scalar multiplication; and wherein the code is configured to return the result of true on condition that all three of said checks are true, but to return the result of false otherwise.

8. The method of claim 4, wherein said reference value is a transformation of a reference instance of the r-part of the first ECDSA signature, wherein the code is configured to perform said check that the submitted instance corresponds to the reference value by: performing the same transformation on the submitted instance and comparing to the reference value.

9. The method of claim 8, wherein said reference value is a hash value, and wherein the hash value is a hash of the reference instance of the r-part of the first ECDSA signature.

10. The method of claim 9, wherein the code is configured to perform:

check that $H_{PoW}(f(r,d))$ meets the predetermined condition, and check that $h=H_{puz}(r)$, and wherein the ECDSA verification function performs:

compute $R'=H_{sig}(m)s^{-1} \cdot G + r s^{-1} \cdot P$, and check that $[R']_x = r$, where r' is the reference instance of the r-part of the first ECDSA signature, r is the submitted instance of the r-part of the first ECDSA signature, s is the s-part of the first ECDSA signature, h is the hash value, $H_{puz}$ is the hash function that was used to hash r' to generate h, P is the first public key, m is the part of the second transaction signed by the first ECC signature, $H_{sig}$ is a hash function that was used to hash m in generating the first ECDSA signature, G is an elliptic generator point, $[R']_x$ denotes an x-coordinate of R', and "·" denotes an elliptic curve scalar multiplication; and wherein the code is configured to return the result of true on condition that all three of said checks are true, but to return a result of false otherwise.

11. The method of claim 3, wherein said obtaining of the first public key comprises receiving the first public key as part of the information in the second transaction.

12. The method of claim 1, wherein the submitted instance of the r-part and s-part of the first ECDSA were generated by a second party using: an ephemeral key given to the second party by a first party or vice versa, and a first private key which is a private key of the second party; and the nonce was also generated by the second party by performing a proof-of-work on computer equipment of the second party.

13. The method of claim 12, wherein:

$$P=V \cdot G,$$

$$k \in [1, n-1],$$

$$R=k \cdot G,$$

$$r=[R]_x, \text{ and}$$

$$s=k^{-1}(H_{sig}(m)+rV) \bmod n,$$

where P is the first public key, V is the first private key, k is the ephemeral key, n is a prime modulus, G is an elliptic generator point, m is the part of the second transaction signed by the first ECDSA signature, $H_{sig}$ is a hash function that was used to hash m in generating the first ECDSA signature, $[R]_x$ denotes an x-coordinate of R, and "·" denotes an elliptic curve scalar multiplication.

14. The method of claim 12, wherein said receiving of the second transaction comprises receiving the second transaction from the second party.

15. The method of claim 12, comprising triggering a service for the first party on condition that the result returned by said code is true.

16. The method of claim 12, wherein the information received in the second transaction comprises a further cryptographic signature of the second party signing a part of the second transaction using a further private key of the second party, the further private key corresponding to a further public key.

17. The method of claim 16, wherein a mapping is available enabling the first party and/or a third party to look-up of an identity of the second party based on the further public key.

18. The method of claim 16, wherein the code is configured to verify the further cryptographic signature using the further public key and return the result of true on further condition that the further cryptographic signature is verified.

19. The method of claim 16, wherein the information received in the second transaction further comprises a cryptographic signature of the first party signing a part of the second transaction using a private key of the first party.

20. The method of claim 12, wherein:

the information received in the second transaction comprises an additional ECDSA signature having a different value of the r-part than the first ECDSA signature but using the same, first private key as the first ECDSA signature; and the code is configured to verify the additional ECDSA signature using the first public key, and return the result of true on further condition that the additional ECDSA signature is verified.

21. The method of claim 1, wherein each of the transactions comprises a data structure comprising one or more inputs and one or more outputs, wherein each output comprises a locking script, and each input comprises an unlocking script and a pointer to an output of another transaction;

wherein said code is comprised by the locking script of the first transaction, wherein said information received in the second transaction is comprised by the unlocking script in an input of the second transaction, and wherein the pointer in said input of the second transaction points to said output of the first transaction; and the method comprises validating the transaction at least on condition that the code returns said result of true, and in response to said validation, at least one of:

including the second transaction in a pool of transactions for mining into one or more blocks by said verifying node, and/or forwarding the second transaction to at least one other of nodes of the blockchain network.

22. A computer program embodied on a non-transitory computer-readable storage medium and configured so as when run on a node of a blockchain network the blockchain performs the steps of:

obtaining a first transaction which comprises runnable code;

receiving a second transaction which includes information comprising at least a submitted instance of an r-part and an s-part of a first Elliptic Curve Digital Signature Algorithm (ECDSA) signature, and further comprising a nonce;

running the code from the first transaction, wherein the code is configured to verify that $H_{PoW}(f(r,d))$ meets a predetermined condition defined in the code, wherein said predetermined condition is that $H_{PoW}(f(r,d))$ is less than or greater than a predetermined target value, is within a predetermined range, has a predetermined minimum number of leading zeros, or has a predetermined format, and to return a result of true on condition of said verifying that $H_{PoW}(f(r,d))$ meets the predetermined condition defined in the code, where r is the submitted instance of the r-part, d is the nonce, $H_{PoW}$ is a hash function, and f is a function combining r and d.

23. A node of a blockchain network, comprising:

memory comprising one or more memory units, and processing apparatus comprising one or more processing units;

wherein the memory stores code arranged to run on the processing apparatus, wherein the code is configured so as when run on the processing apparatus the processing apparatus performs the steps of:

obtaining a first transaction which comprises runnable code;

receiving a second transaction which includes information comprising at least a submitted instance of an r-part and an s-part of a first Elliptic Curve Digital Signature Algorithm (ECDSA) signature, and further comprising a nonce;

running the code from the first transaction, wherein the code is configured to verify that $H_{PoW}(f(r,d))$ meets a predetermined condition defined in the code, wherein said predetermined condition is that $H_{PoW}(f(r,d))$ is less than or greater than a predetermined target value, is within a predetermined range, has a predetermined minimum number of leading zeros, or has a predetermined format, and to return a result of true on condition of said verifying that $H_{PoW}(f(r,d))$ meets a predetermined condition defined in the code, where r is the submitted instance of the r-part, d is the nonce, $H_{PoW}$ is a hash function, and f is a function combining r and d.

24. A computer-implemented method comprising, at computer equipment of a second party:

observing a first transaction which comprises runnable code, wherein the code is configured to verify that $H_{PoW}(f(r,d))$ meets a predetermined condition defined in the code, wherein said predetermined condition is that $H_{PoW}(f(r,d))$ is less than or greater than a predetermined target value, is within a predetermined range, or has a predetermined minimum number of leading zeros, and to return a result of true on condition of said verifying that $H_{PoW}(f(r,d))$ meets the predetermined condition defined in the code, where r is an r-part for an Elliptic Curve Digital Signature Algorithm (ECDSA) signature, d is the nonce, $H_{PoW}$ is a hash function, and f is a function combining r and d, wherein the r-part is specified by a first party;

generating the r-part based on an ephemeral key;

searching for a value of the nonce d such that $H_{PoW}(f(r,d))$ meets the predetermined condition;

formulating a second transaction linked to the first transaction, the second transaction including information comprising at least the r-part and an s-part of a first ECDSA signature, and further comprising the nonce d; and sending the second transaction to be propagated over a blockchain network for recordal in a blockchain.

* * * * *